(12) United States Patent
Chikazawa et al.

(10) Patent No.: US 7,263,062 B2
(45) Date of Patent: Aug. 28, 2007

(54) TRANSMISSION APPARATUS WITH A FUNCTION TO SWITCH A LINE IN THE EVENT OF A TRANSMISSION FAILURE

(75) Inventors: Tsutomu Chikazawa, Yokohama (JP); Atsushi Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 923 days.

(21) Appl. No.: 09/781,059

(22) Filed: Feb. 9, 2001

(65) Prior Publication Data

US 2002/0024931 A1    Feb. 28, 2002

(30) Foreign Application Priority Data

Aug. 31, 2000    (JP)    ............................. 2000-264126

(51) Int. Cl.
*G01R 31/08*    (2006.01)

(52) U.S. Cl. ...................... 370/224; 370/228; 370/254

(58) Field of Classification Search ........ 370/221–225, 370/254, 404; 340/895.01, 895.05, 827, 340/3.43, 3.44, 825.01; 395/180, 181, 182.01, 395/182.02; 319/1, 2, 3, 4; 709/238–240, 709/242; 398/1–8, 17–19, 33, 43, 59; 714/717

See application file for complete search history.

(56) References Cited

U.S. PATENT DOCUMENTS

| | | | | |
|---|---|---|---|---|
| 5,278,824 A | * | 1/1994 | Kremer | 370/223 |
| 5,442,620 A | * | 8/1995 | Kremer | 370/224 |
| 6,122,250 A | * | 9/2000 | Taniguchi | 370/222 |
| 6,614,754 B1 | * | 9/2003 | Usuba et al. | 370/222 |
| 6,657,969 B1 | * | 12/2003 | Neuendorff et al. | 370/245 |
| 6,738,825 B1 | * | 5/2004 | Bortolotto et al. | 709/238 |

FOREIGN PATENT DOCUMENTS

| | | |
|---|---|---|
| JP | 08-316978 | 11/1996 |
| JP | 09-093278 | 4/1997 |
| JP | 09093278 A * | 4/1997 |

OTHER PUBLICATIONS

GR-1230-CORE, SONET Bidirectinal Lie-switched Ring Equipment Generic Crieia, Dec. 1998, Bellcore, Issue 4, sections 3 and 8.*

* cited by examiner

*Primary Examiner*—Doris H. To
*Assistant Examiner*—Ian N. Moore
(74) *Attorney, Agent, or Firm*—Katten Muchin Rosenman LLP

(57) ABSTRACT

A transmission apparatus to switch a line from a working line to a protection line in the event of a transmission-line failure on the working line. The transmission apparatus includes a classifying unit inputting cross-connect information from an external source and classifying the information into cross-connect categories for each channel; a communication unit gathering the cross-connect categories of each signal-adding or signal-dropping transmission apparatus of a channel and node information identifying the signal-adding or signal-dropping transmission apparatus by communications with an adjacent transmission apparatus for each channel; and a connection-implementation-classifying unit classifying an implementation of a connection between terminals into a corresponding connection category from among connection categories corresponding to a variety of connection implementations in accordance with gathered cross-connect categories of other transmission apparatuses and the cross connect category of the transmission apparatus employed in the station to create a table for executing control to switch a line in the event of failure for each channel.

18 Claims, 61 Drawing Sheets

— Working
------ Protection

A case in which 2 consecutive intermediate stations
drop a signal in the east direction sequentially Data of the second and subsequent
intermediate stations is not collected.

A case in which 2 consecutive intermediate stations drop a signal in the west direction sequentially Data of the second intermediate stations is overwritten by data of this station.

FIG. 18A

A case in which an intermediate station drops a signal and the next intermediate station adds a signal, or an intermediate station adds a signal and the next intermediate station drops a signal

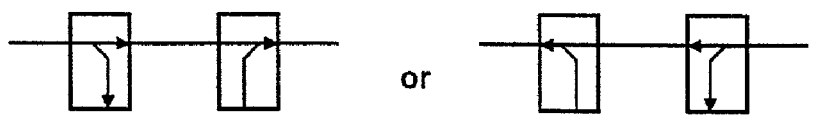

FIG. 18B

A case in which 2 consecutive intermediate stations add a signal sequentially

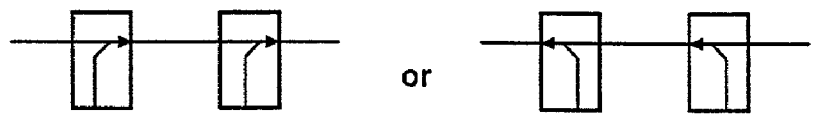

FIG. 18C

A case in which all stations along a transmission line respectively adds, drops, adds and drops a signal sequentally, or drops, adds, drops and adds a signal sequentially.

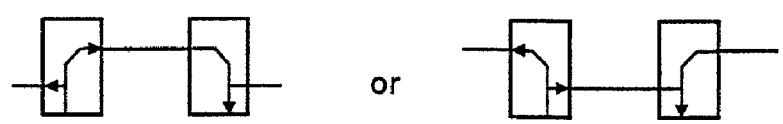

FIG. 20
DCP one-side-end
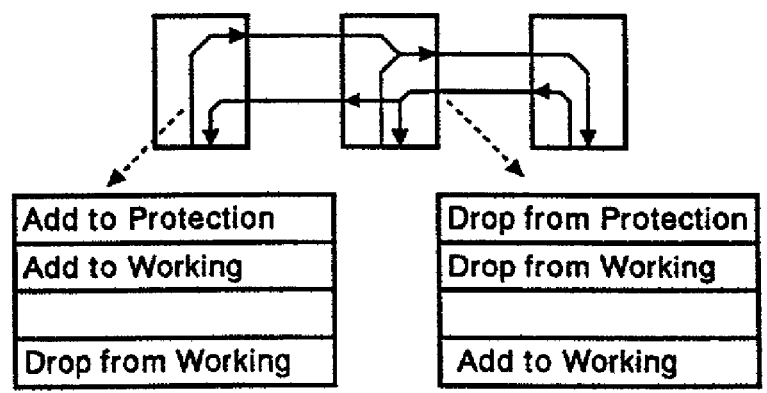
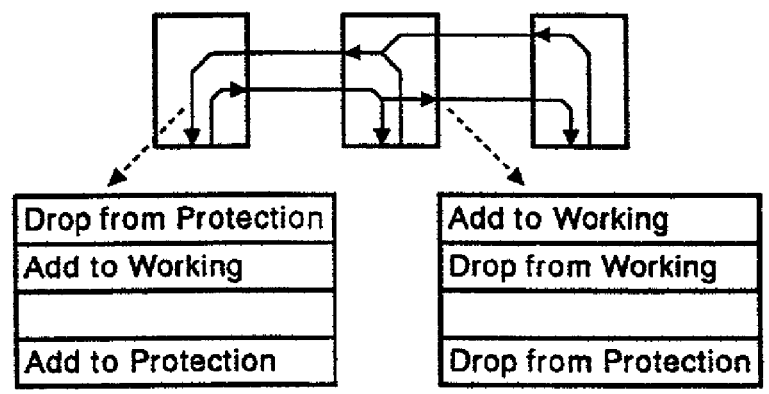

FIG. 21
DCW one-side-end
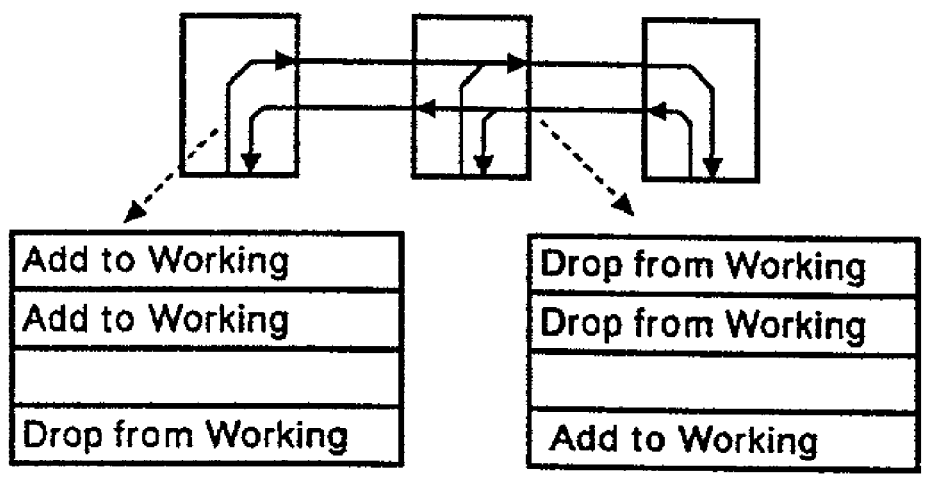
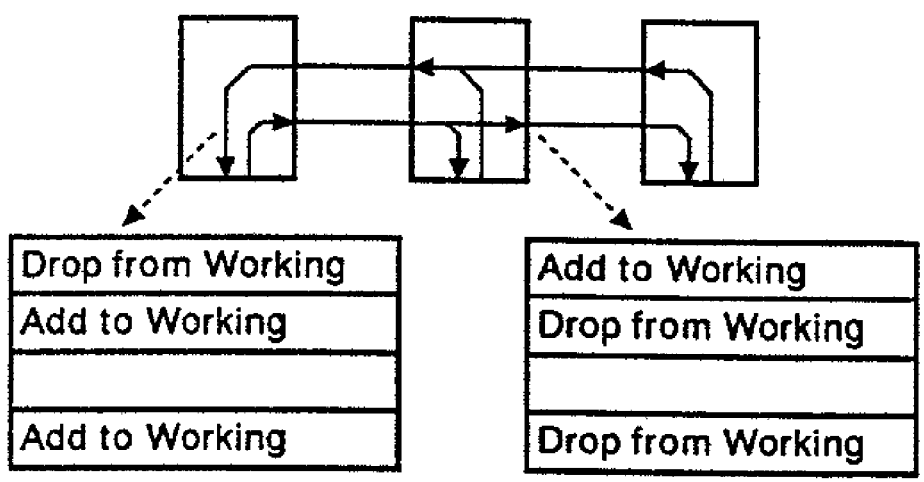

FIG. 22
DTP one-side-end
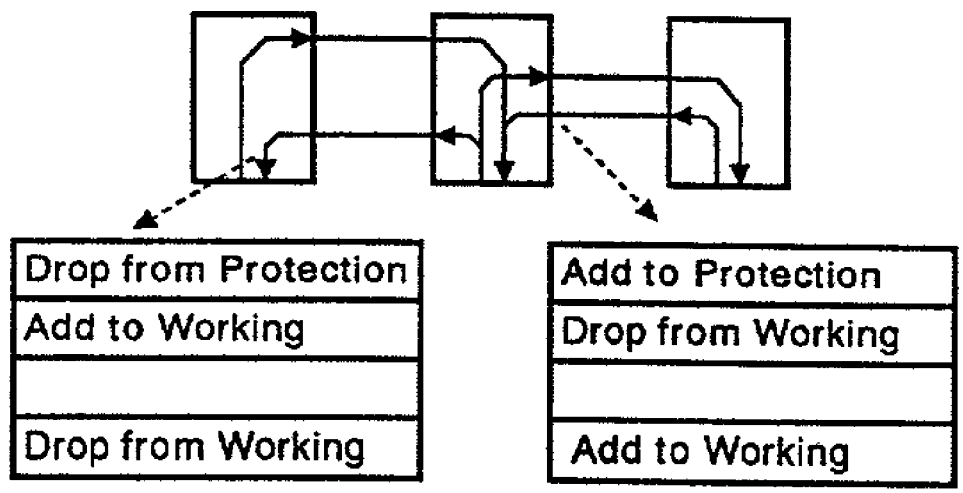
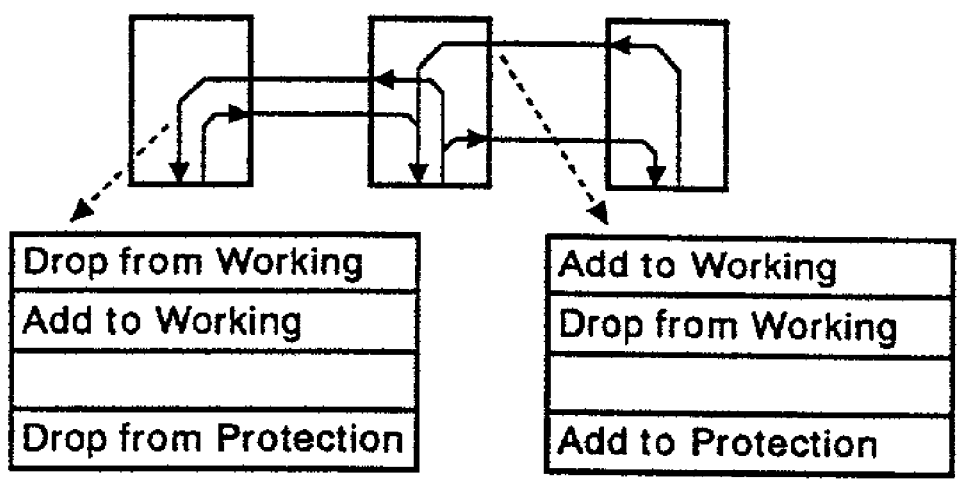

For example, the following cross connect:

Collected data indicates a DCP connection as follows:

| Cross-connect category | ID |
|---|---|
| Add to Protection | A |
| Add to Working | B |
| Drop from Protection | C |

FIG. 29

| CH# | | | East | | West | |
|---|---|---|---|---|---|---|
| CH#1 | Add | | | | | |
| | Drop | | | | | |
| ⋮ | | | | | | |
| CH#n | Add | | | | | |
| | Drop | | | | | |

80#i

FIG. 45
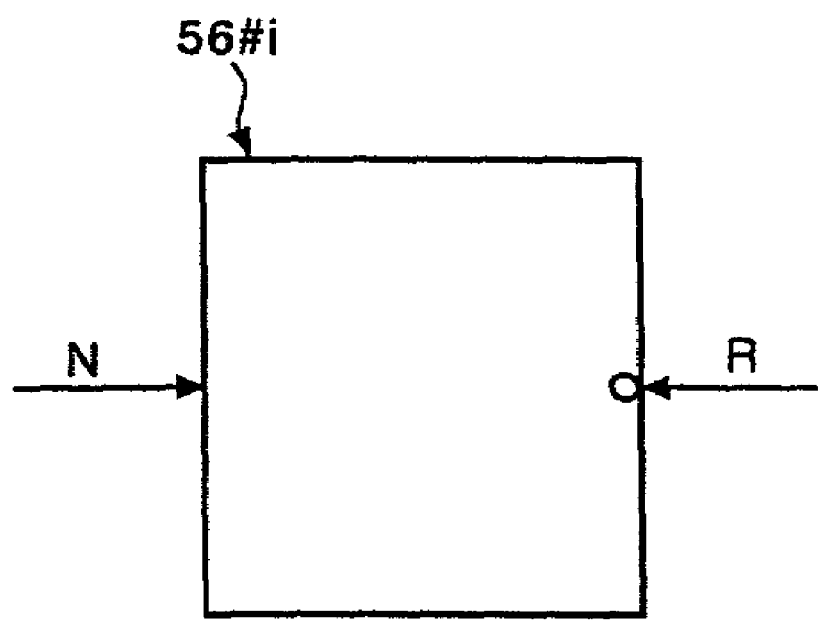
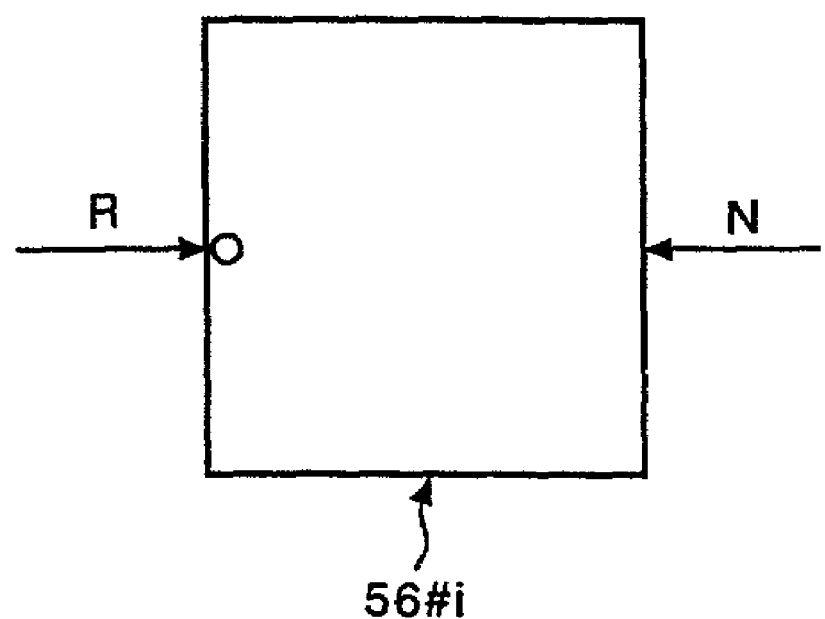

FIG. 48

| | E-S 4 | E-P 2 | W-P 0 | W-S 6 |
|---|---|---|---|---|
| 0 | T | T | F | T |
| 1 | T | T | F | T |
| 2 | T | F | F | T |
| 3 | T | F | F | T |
| 4 | F | F | F | T |
| 5 | F | F | F | T |
| 6 | F | F | F | F |
| 7 | F | F | F | F |

| E-S 6 | E-P 4 | W-P 2 | W-S 0 |
|---|---|---|---|
| T | T | T | F |
| T | T | T | F |
| T | T | F | F |
| T | T | F | F |
| T | F | F | F |
| T | F | F | F |
| F | F | F | F |
| F | F | F | F |

(East ID < RIP)

FIG. 49

| | E-S 4 | E-P 2 | W-P 0 | W-S 6 |
|---|---|---|---|---|
| 0 | T | T | T | T |
| 1 | T | T | F | T |
| 2 | T | T | F | T |
| 3 | T | F | F | T |
| 4 | T | F | F | T |
| 5 | F | F | F | T |
| 6 | F | F | F | T |
| 7 | F | F | F | F |

| E-S 6 | E-P 4 | W-P 2 | W-S 0 |
|---|---|---|---|
| T | T | T | T |
| T | T | T | F |
| T | T | T | F |
| T | T | F | F |
| T | T | F | F |
| T | F | F | F |
| T | F | F | F |
| F | F | F | F |

(West ID ≦ RIP)

FIG. 50

| | E-S | E-P | W-P | W-S |
|---|---|---|---|---|
| | 0 | 6 | 4 | 2 |
| 0 | T | T | T | T |
| 1 | F | T | T | T |
| 2 | F | T | T | T |
| 3 | F | T | T | F |
| 4 | F | T | T | F |
| 5 | F | T | F | F |
| 6 | F | T | F | F |
| 7 | F | F | F | F |

| | E-S | E-P | W-P | W-S |
|---|---|---|---|---|
| | 2 | 0 | 6 | 4 |
| 0 | T | T | T | T |
| 1 | T | F | T | T |
| 2 | T | F | T | T |
| 3 | F | F | T | T |
| 4 | F | F | T | T |
| 5 | F | F | T | F |
| 6 | F | F | T | F |
| 7 | F | F | F | F |

(West ID ≤ RIP)

FIG. 51

| | E-S | E-P | W-P | W-S |
|---|---|---|---|---|
| | 0 | 6 | 4 | 2 |
| 0 | F | T | T | T |
| 1 | F | T | T | T |
| 2 | F | T | T | F |
| 3 | F | T | T | F |
| 4 | F | T | F | F |
| 5 | F | T | F | F |
| 6 | F | F | F | F |
| 7 | F | F | F | F |

| | E-S | E-P | W-P | W-S |
|---|---|---|---|---|
| | 2 | 0 | 6 | 4 |
| 0 | T | F | T | T |
| 1 | T | F | T | T |
| 2 | F | F | T | T |
| 3 | F | F | T | T |
| 4 | F | F | T | F |
| 5 | F | F | T | F |
| 6 | F | F | F | F |
| 7 | F | F | F | F |

(East ID < RIP)

FIG. 55

| MSB | | | | | | | LSB |
|---|---|---|---|---|---|---|---|
| D7 | D6 | D5 | D4 | D3 | D2 | D1 | D0 |
| Token control | | Cross-connect category | | Node ID | | | |

Token control

| D7 | D6 | Control |
|---|---|---|
| 0 | 0 | UNEQ |
| 0 | 1 | Ring establishment |
| 1 | 0 | Token transfer |
| 1 | 1 | Token |

Cross-connect categories

| D5 Add/Drop | D4 Work/PTCT | Control |
|---|---|---|
| 0 | 0 | Add to Working |
| 0 | 1 | Add to Protection |
| 1 | 0 | Drop from Workig |
| 1 | 1 | Drop from Protection |

Node ID

| D3~D0 | | | | Control |
|---|---|---|---|---|
| | | | | Absolute ID in the range 0 to 15 |

FIG. 56

(1) An end station transmits a communication-path-establishing code

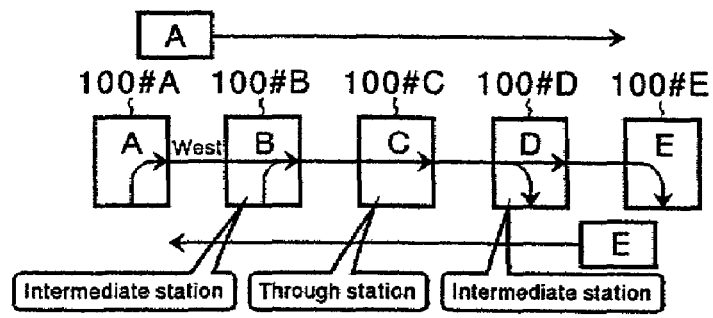

(2) The east-end station hands over a transmission right to an intermediate station and the intermediate station transmits data

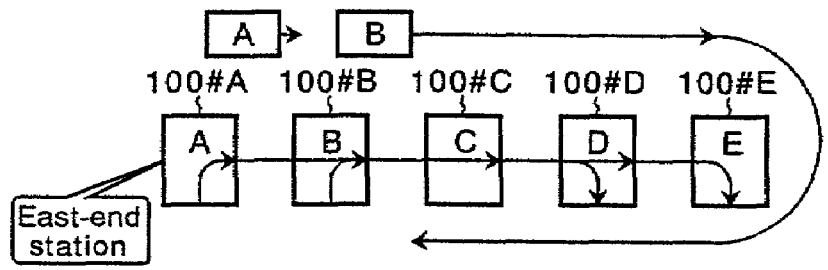

(3) The intermediate station hands over a transmission right to the next intermediate station and the next intermediate station transmits the data

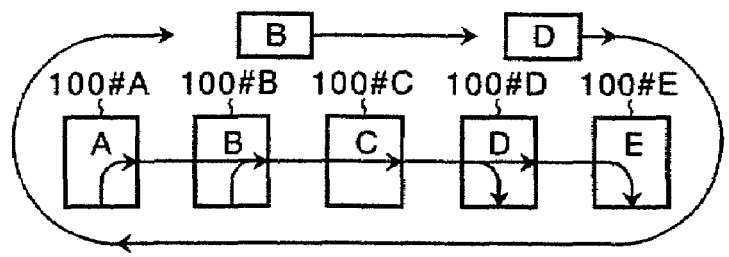

(4) The west-end station receives the transmission right and the transmission of the data is completed

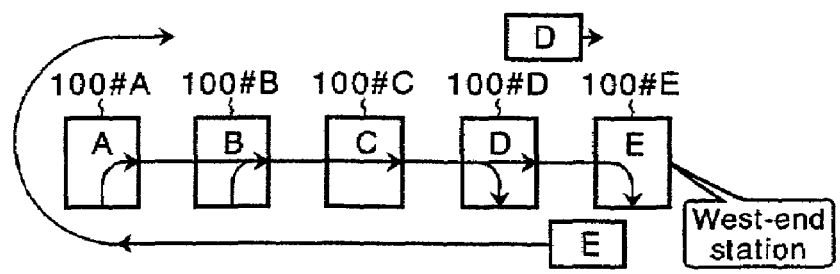

FIG. 66A

Initial state : Astate with the table completed

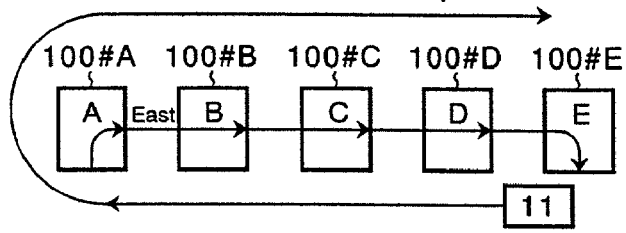

FIG. 66B

A cross connect was added to a B station, resulting in a changed configuration.
The B station transmits all 0s in both the directions.

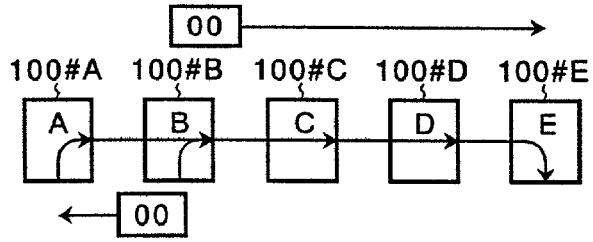

FIG. 66C

When an end station receives a UNEQ code of 00, reconstruction is started.
The east-end and west-end stations transmit a ring establishment code of 01. (Procedure 1)

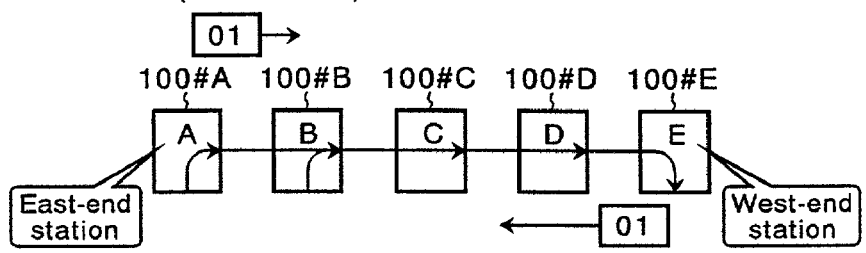

FIG. 66D

The B station outputting the UNEQ code passes through data as requested by the A station. (Procedure 2)

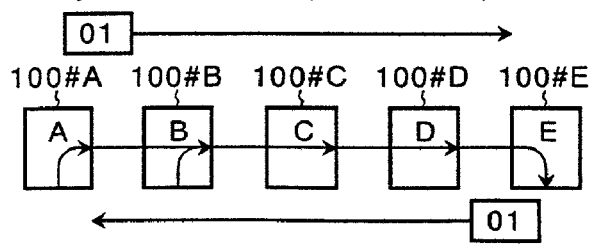

TRANSMISSION APPARATUS WITH A FUNCTION TO SWITCH A LINE IN THE EVENT OF A TRANSMISSION FAILURE

BACKGROUND OF THE INVENTION

1. Field of the Invention

The present invention relates to switching control executed by a transmission apparatus such as a BLSR (Bi-directional Line Switched Ring) multiplexing apparatus having a function to switch a line in the event of a transmission failure.

2. Description of the Related Art

In a network including a BLSR multiplexing apparatus, a transmission line is designed into a redundant configuration comprising a working line and a protection line. If a failure occurs on the working line, the transmission line is switched to the protection line for transmissions in a direction opposite to the working line so as to improve reliability of the network. The working line is a line that is used when no failure occurs. The protection line is a line to which the transmission is switched from the working line in the event of a failure on the working line. This BLSR multiplexing apparatus is used as an apparatus for transmitting data such as voices and pictures in a synchronous network such as an SDH (Synchronous Digital Hierarchy) network. In the case of a BLSR multiplexing apparatus, a band between addition of a signal to a transmission line and dropping of the signal from the transmission line accommodating a terminal on the reception side is allocated to the transmission line as a channel. Since the channel is never allocated to the transmission line once the data has been dropped from the line, however, the transmission capacity of 1 optical fiber is, on the average, 1.5 times that of a transmission apparatus used so far with the channel occupying a transmission line of 1 ring cycle. The addition of a signal to a transmission line cited above is an operation to transmit the data output by a terminal on the transmission side through the line. On the other hand, the dropping of a signal is an operation to transmit the added signal to a transmission line connected to a terminal on the reception side or another ring.

In particular, in a 4-fiber BLSR multiplexing apparatus, each transmission line is a shared line used as both a working line and a protection line. A 4-fiber BLSR multiplexing apparatus is used in conjunction with 4 transmission lines, namely, 2 working lines and 2 protection lines. Each of the 4 transmission lines is a physically separated fiber. In comparison with a 2-fiber BLSR multiplexing apparatus, a 4-fiber BLSR multiplexing apparatus has a span-switch function in addition to a ring switch for switching a transmission from a working line to a protection line in the event of a failure on the working line. It is thus quite within the bounds of possibility that the network is rescued from a line failure. Accordingly, the demand for a 4-fiber BLSR multiplexing apparatus is rising. In addition to the conventional multiplexing apparatus, for the BLSR multiplexing apparatus, there have been discussed a network configuration for transmission over a long distance through a sea-bottom cable and a switching technique referred to as a submarine BLSR. By carrying out a switching operation according to an adopted technique in the event of a failure on a transmission line, suspension of a signal transmission can be avoided.

In order to execute switching control in the event of a failure in a conventional BLSR multiplexing apparatus which is also referred to as an NE (Network Element), every BLSR multiplexing apparatus is provided with a ring topology table and a squelch table showing a range of cross-connected working lines for each channel such as an STS1 or VC3 channel. A ring topology table is a table showing a connection order of NEs connected to form a ring in a direction toward an east side starting with the node ID of this station. The direction toward the east side is defined typically as a counterclockwise direction along the ring. A node ID is an ID assigned to each NE uniquely in the network. By referring to a ring topology table, each NE is capable of knowing the node ID of an adjacent NE.

A squelch table is a table used in a BLSR multiplexing apparatus for forming a judgment as to whether or not to insert an AIS signal into a circuit that cannot be rescued from failures when the failures occur on a plurality of transmission lines in order to avoid incorrect connection. Information stored in a squelch table includes the ID of a signal-adding NE and the ID of an NE dropping the signal. In this squelch table, an add channel and a drop channel are set individually only for each working line. An add channel is the channel of one of 2 working lines, which is used for transmitting added data. A drop channel is the channel of a line dropping a signal. The node ID of a signal-adding NE is referred to as a source-node ID. On the other hand, the node ID of a signal-dropping NE is referred to as a destination-node ID.

The user enters cross-connect information for each channel to an NE on the channel. The cross-connect information includes Add, Drop or Through (or Relay) and the direction of the signal such as East or West. Each NE stores a source-node ID or a destination-node ID in a SONET or SDH overhead byte to be used in creation of a squelch table, and transmits as well as receives node IDS in accordance with the following rule. A transmission table and a reception table are provided in a squelch table for an add channel and a drop channel respectively. The transmission table is a table that is used for storing a node ID when the node ID is transmitted. On the other hand, the reception table is a table that is used for storing a node ID when the node ID is received.

A signal-adding NE sets the node ID of its own as a source-node ID in the transmission table for the channel used for transmitting the added data. The signal-adding NE stores a received destination-node ID in a destination entry of the transmission table and a destination entry of the reception table before bouncing back the destination-node ID to the adjacent NE. The signal-adding NE stores a source-node ID bounced back by a signal-dropping NE in the reception table. A data-passing-through NE passes on a received node ID to an adjacent NE as it is. A signal-dropping NE sets a destination-node ID in a transmission table for a signal-dropping channel. The signal-dropping NE stores a received source-node ID in a source entry of the transmission table and a source entry of the reception table before bouncing back the source-node ID to the adjacent NE. The signal-dropping NE stores a source-node ID bounced back by a signal-dropping NE in the reception table. Each NE determines that the creation of a squelch table has been completed when the transmission table is found to match the reception table. If the transmission table does not match the reception table, on the other hand, incorrect setting is determined to exist. In this way, incorrect setting of each channel can be avoided. In addition, an AIS signal is inserted into a circuit that cannot be rescued from failures when the failures occur on a plurality of transmission lines, making it impossible to carry out communications between a signal-adding NE and a signal-dropping NE, which are set in the squelch table.

A submarine BLSR multiplexing apparatus supports a drop-and-continue connection as an inter-ring connection. A drop-and-continue connection is a connection by which a primary node drops a transmitted signal to an adjacent ring network and, at the same time, relays the signal to an adjacent NE. Two drop-and-continue options are available. One of the options is selected for passing through a secondary circuit of a redundant system to a working line and the other option is selected for passing through a secondary circuit of a redundant system to a protection line. The former is referred to as a DCW (Drop and Continue on Working) connection while the latter is referred to as a DCP (Drop and Continue on Protection) connection. In a DCP connection, the primary node drops a signal from transmission to an adjacent ring network but continues the signal to a protection line before a secondary node drops the signal from transmission to the adjacent ring network. In a DCP connection, a primary node is a node that is connected to an adjacent ring network and plays roles to drop a working signal from transmission to the adjacent ring network and continue the signal to a protection line. On the other hand, a secondary node in a DCP connection is a node that is connected to an adjacent ring network and plays a role to drop a working signal from transmission to the adjacent ring network through a protection line.

In a DCW connection, on the contrary, the primary node drops a signal from transmission to an adjacent ring network but continues the signal to a working line before a secondary node drops the signal from transmission to an adjacent ring network. In a DCW connection, a primary node is a node that is connected to an adjacent ring network and plays roles to drop a working signal from transmission to the adjacent ring network and continue the signal to the working line. On the other hand, a secondary node in a DCP connection is a node that is connected to an adjacent ring network and plays a role to drop a working signal from transmission to the adjacent ring network through the working line.

As another implementation of connection between ring networks, there is provided a DTP (Dual Terminal Transmit on Protection) connection in which a terminal node accommodating a terminal adds a signal to a working line as well as a protection line, a primary node drops a signal from a working line and a secondary node drops a signal from the protection line. As further implementation of connection between ring networks, there is also provided a DTW (Dual Terminal Transmit on Working) connection in which a terminal node accommodating a terminal adds a signal to a working line and a secondary node drops a signal from the working line.

However, the conventional BLSR multiplexing apparatus has the following problems:

1: Since a squelch table is created as a collection of only source-node IDs and destination-node IDS, it is not possible to express a variety of implementations of connection such as the DCW connection and the DCP connection. Thus, for example, a connection of switching in the event of a failure for the DCW connection is the same as that for the DCP connection, making it impossible to carry out a switching operation according to the implementation of connection.

2: A squelch table is created as a collection of only node IDS of signal-adding NEs connected to working lines and signal-dropping NEs also connected to working lines without collecting node IDs of secondary nodes connected to protection lines. Since squelching control is executed in accordance with such a squelch table, an unnecessary squelching operation is executed for a DCP connection or a DTP connection even if the network can be rescued from a transmission-line failure.

3: Since a connection is checked incorrectly due to the fact that only node IDs are collected, it is not possible to easily check whether or not a node ID of a node between destination and source nodes is correctly set. It is thus also impossible to carry out a complex checking operation according to the implementation of connection such as the DCP or DCW connection.

SUMMARY OF THE INVENTION

It is therefore an object of the present invention to provide a transmission apparatus capable of carrying out a switching operation according to an implementation of connection in the event of a failure.

It is another object of the present invention to provide a transmission apparatus capable of properly rescuing the network from a line failure by forming a proper judgment as to whether or not to carry out a squelching operation according to an implementation of connection in the event of the failure.

It is a further object of the present invention to provide a transmission apparatus capable of offering higher reliability by checking a connection of a line definition according to an implementation of connection.

In accordance with an aspect of the present invention, there is provided a transmission apparatus having a function to switch a line with a redundant configuration comprising a working line and a protection line from the working line to the protection line in the event of a transmission-line failure on the working line, the transmission apparatus comprising: a cross-connect-classifying means for inputting cross-connect information from an external source and classifying the information into cross-connect categories wherein the cross-connect information includes a signal direction and information requesting a station employing the transmission apparatus to carry out one of the following pieces of processing for each channel: addition of a signal to either the working line or the protection line; addition of a signal to both the working line and the protection line; dropping of a signal from either the working line or the protection line; dropping of a signal from both the working line and the protection line; passing-through of a signal; and dropping of a signal from either the working line or the protection line and then relaying the signal to either the working line or the protection line; a communication means for gathering the cross-connect category of each signal-adding or signal-dropping transmission apparatus of a channel and node information identifying the signal-adding or signal-dropping transmission apparatus by communications with an adjacent transmission apparatus for each channel; a connection-implementation-classifying means for classifying implementations of connection into appropriate connection categories in accordance with gathered cross-connect categories of other transmission apparatuses and the cross-connect category of the transmission apparatus employed in the station to create a table for executing control to switch a line in the event of a failure for each channel; a failure-reporting means for transmitting information on a failure including node information of the station in the event of a failure on a transmission line between the station and an adjacent station; a failure-occurrence-location-identifying means for identifying the location of occurrence of a failure from received information on the failure; and a switching control means for executing control to switch the line based on a location of occurrence of a failure identified by the failure-occurrence-location-identifying means and the table.

It is desirable to provide a connection-implementation-classifying means that detects incorrect setting on the basis of an order in which the cross-connection categories are collected. For each channel, it is desirable to provide a connection-implementation-classifying means that creates a squelch table composed of node information of 2 stations and, in the ease of a DCP connection of dropping a signal from a line and ten relaying the signal to the protection line, it is desirable to have the connection-implementation- classifying means set node information of a station dropping the signal relayed to the protection line in the squelch table whereas, in the case of a DTP connection of adding a signal to both the working and protection lines, it is desirable to have the connection-implementation-classifying means set node information of a first station adding the signal to both the working and protection lines and node information of a second station dropping the signal added to the protection line in the squelch table. It is desirable to provide a connection-implementation-classifying means that creates a RIP (Routing Interworking Protection) table including node information of a station adding a signal, dropping a signal or relaying after dropping a signal and path information for the implementation of connection for each channel. It is desirable to provide a switching control means that executes switching control for the implementation of connection based on the path information.

The above and other objects, features and advantages of the present invention as well as the manner of realizing them will become more apparent, whereas the invention itself will be best understood from a study of the following description and appended claims with reference to attached drawings showing some preferred embodiments of the invention.

BRIEF DESCRIPTION OF THE DRAWINGS

FIG. 18 is diagrams each showing a setting miss;

FIG. 20 is a diagram showing a DCP one-side-end implementation of connection;

FIG. 21 is a diagram showing a DCW one-side-end implementation of connection;

FIG. 22 is a diagram showing a DTP one-side-end implementation of connection;

FIG. 29 is a diagram showing the configuration of a squelch table used in the BLSR switching control unit shown in FIG. 12;

FIG. 45 is a diagram showing a definition of a line;

FIG. 48 is a diagram showing a technique to determine an east-side N position;

FIG. 49 is a diagram showing a technique to determine an east-side R position;

FIG. 50 is a diagram showing a technique to determine a west-side N position;

FIG. 51 is a diagram showing a technique to determine a west-side R position;

FIG. 55 is a diagram showing the structure of transmitted data;

FIG. 56 is a diagram showing a sequence to construct a table;

FIG. 66A is a diagram showing typical reconstruction of a table;

FIG. 66B is a diagram showing typical reconstruction of a table;

FIG. 66C is a diagram showing typical reconstruction of a table;

FIG. 66D is a diagram showing typical reconstruction of a table; and

DETAILED DESCRIPTION OF THE PREFERRED EMBODIMENTS

Figure 1:
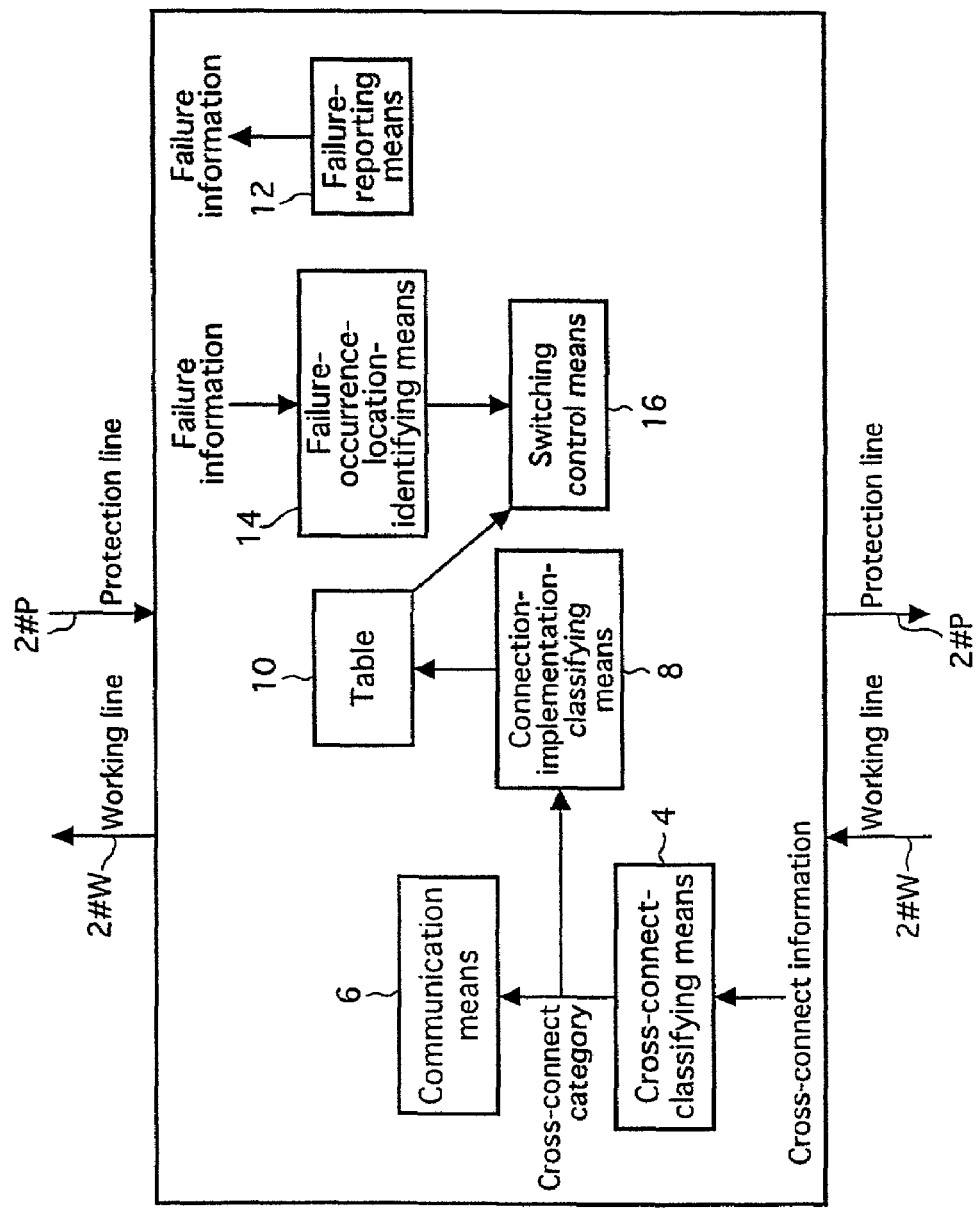
FIG. 1 is a diagram showing the principle of the present invention.

Before describing preferred embodiments of the present invention, the principle of the present invention is explained. FIG. 1 is a diagram showing the principle of the present invention. A transmission apparatus shown in the figure is a communication apparatus such as a BLSR multiplexing apparatus that has a function to switch a transmission line having a redundant configuration comprising a working line 2#W and a protection line 2#P from the working line to the protection line in the event of a transmission-line failure on the working line. As shown in FIG. 1, the transmission apparatus comprises a cross-connect-classifying means 4, a communication means 6, a connection-implementation-classifying means 8, a table 10, a failure-reporting means 12, a failure-occurrence-location-identifying means 14 and a switching control means 16. The cross-connect-classifying means 4 inputs cross-connect information from an external source and classifies the information into cross-connect categories. The cross-connect information includes a signal direction and information requesting a station employing this transmission apparatus to carry out one of the following pieces of processing:

addition of a signal to either the working line or the protection line;

addition of a signal to both the working line and the protection line;

dropping of a signal from either the working line or the protection line;

dropping of a signal from both the working line and the protection line;

passing-through of a signal; and dropping of a signal from either the working line or the protection line and then relaying the signal to either the working line or the protection line.

For example, the cross-connect information is classified by putting:

the dropping of a signal from either the working line or the protection line and the addition of a signal to both the working line and the protection line in a category of addition of a signal to the working line;

the dropping of a signal from both the working line and the protection line in a category of dropping of a signal from the working line; and the dropping of a signal from either the working line or the protection line and then relaying the signal to either the working line or the protection line in a category of dropping of a signal from the working line.

The communication means 6 gathers the cross-connect category of a signal-adding or signal-dropping transmission apparatus and node information for each channel in an order of the direction of a signal flowing through the channel or a direction opposite to the flowing direction in accordance with the direction of the signal. The connection-implementation-classifying means 8 classifies a variety of implementations of connection such as DCP, DCW and DTP connections into appropriate connection categories in accordance with the cross-connect category of the transmission apparatus employed in this station and the cross-connect categories of other transmission apparatuses gathered in the signal direction to create the table 10 for switching the line. The failure-reporting means 12 transmits information on a failure including node information of this station in the event of a failure on a transmission line between this station and an adjacent station. The failure-occurrence-location-identifying means 14 identifies the location of occurrence of a failure from information on the failure. The switching control means 16 executes control to switch the line based on a location of occurrence of a failure and the table 10. In this way, it is possible to execute switching control according to the implementation of connection in the event of a failure.

Figure 2:
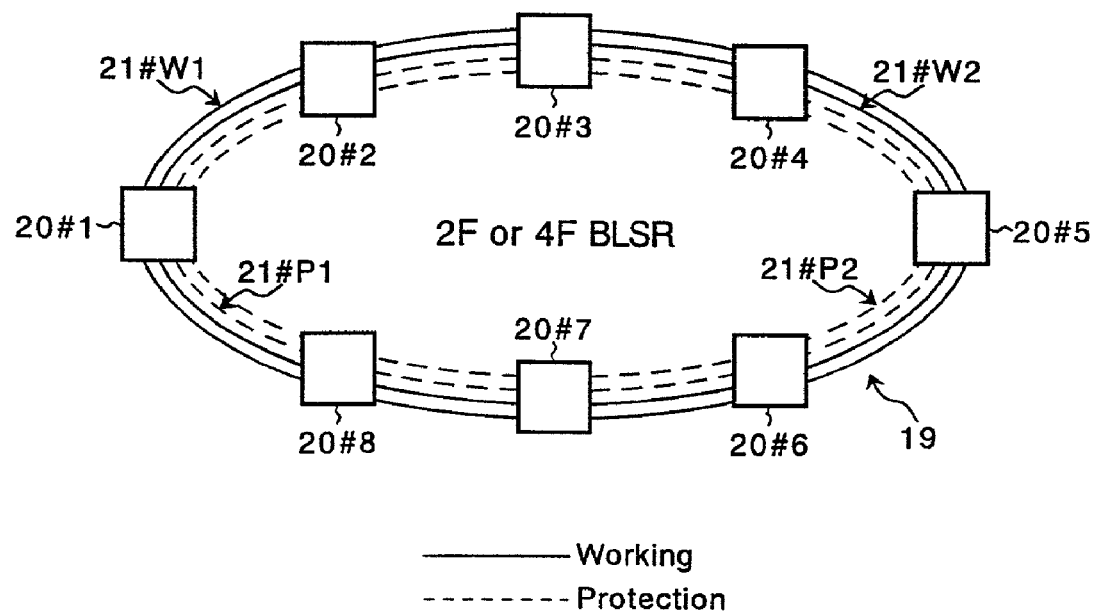
FIG. 2 is a diagram showing the configuration of a network provided by a first embodiment of the present invention.

FIG. 2 is a diagram showing the configuration of a network provided by a first embodiment of the present invention. As shown in the figure, the network is a 1-ring network 19, which comprises a plurality of BLSR multiplexing apparatuses, for example, 8 BLSR multiplexing apparatuses 20#i where i=1 to 8. The BLSR multiplexing apparatus 20#i is referred to hereafter simply as a transmission apparatus. Any adjacent two of the BLSR multiplexing apparatuses 20#i where i=1 to 8 are connected to each other by 2 transmission lines such as optical fibers, namely, a working line 21#W1 and a protection line 21#P1 or 4 transmission lines such as optical fibers, namely, the working line 21#W1, a working line 21#W2, the protection line 21#P1 and a protection line 21#P2. It should be noted that, while the ring network 19 shown in FIG. 2 uses 4 transmission lines for connecting any adjacent two of the BLSR multiplexing apparatuses 20#i where i=1 to 8 to each other, the transmission lines represent a logical connection and thus not implemented as separated physical transmission media. In the case of a 2-F BLSR multiplexing apparatus, only 2 transmission lines are used. One of the transmission lines is shared as the working line 21#W1 and the protection line 21#P1 while the other transmission line is shared as the working line 21#W2 and the protection line 21#P2. In the ring network shown in FIG. 2, the working lines 21#W1 and 21#W2 are each represented by a solid line whereas the protection lines 21#P1 and 21#P2 are each represented by a dashed line.

Figure 3:
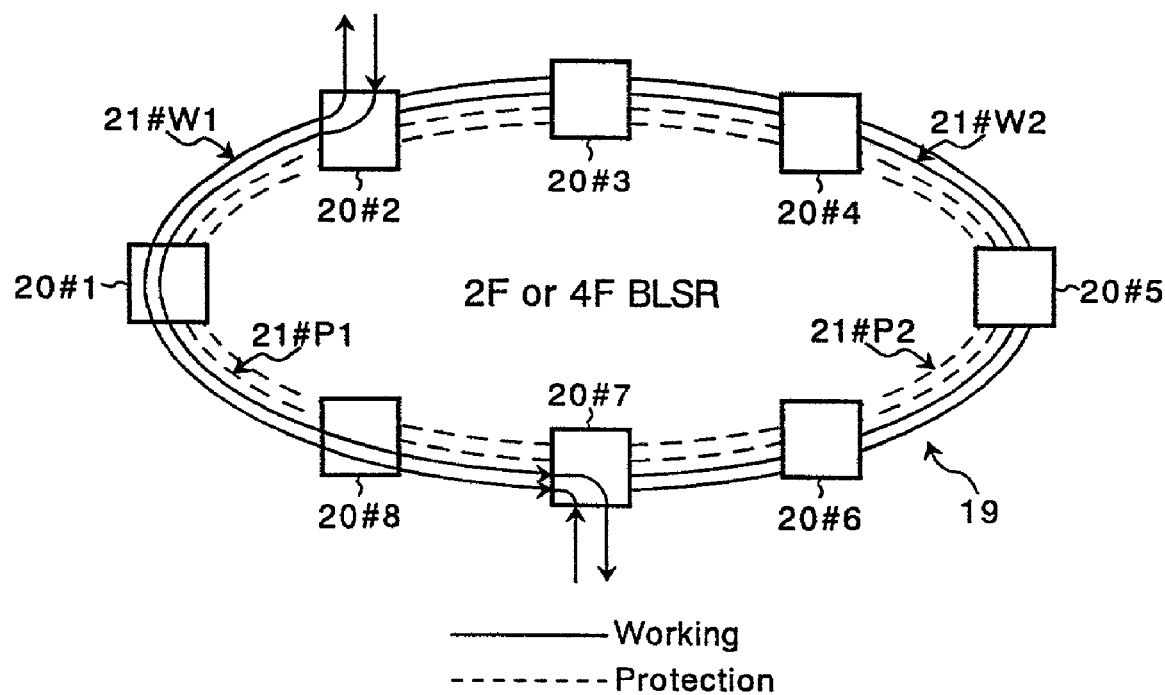
FIG. 3 is a diagram showing a normal connection of the network shown in FIG. 2.

FIG. 3 is a diagram showing a normal connection in the network configuration shown in FIG. 2. To be more specific, FIG. 3 shows a normal implementation of connection of adding and/or dropping a signal by the transmission apparatuses 20#2 and 20#7 in the network configuration shown in FIG. 2. If the transmission apparatus 20#2 functions as a multiplexing apparatus adding a signal to a transmission line, the transmission apparatus 20#7 functions as a terminal dropping the signal from the transmission line. If the transmission apparatus 20#7 functions as a multiplexing apparatus adding a signal to a transmission line, on the other hand, the transmission apparatus 20#2 functions as a terminal dropping the signal from the transmission line. For example, in the normal connection, a channel signal added by the multiplexing apparatus 20#2 is transmitted through a working line 21#W2, the transmission apparatus 20#1, a working line 21#W2, the transmission apparatus 20#8 and a working line 21#W2 to the terminal 20#7, which drops the signal. On the other hand, a channel signal added by the multiplexing apparatus 20#7 is transmitted through a working line 21#W1, the transmission apparatus 20#8, a working line 21#W1, the transmission apparatus 20#1 and a working line 21#W1 to the terminal 20#2, which drops the signal. In the event of a failure on a working line 21#W1 or 21#W2, the transmission is switched from the working line 21#W1 or 21#W2 to a protection line 21#P1 or 21#P2 for a transmission in a direction opposite to the transmission through the working line 21#W1 or 21#W2. If the transmission apparatuses 20#2 and 20#7 cannot be connected to each other by all means, they are subjected to a squelching operation.

Figure 4:
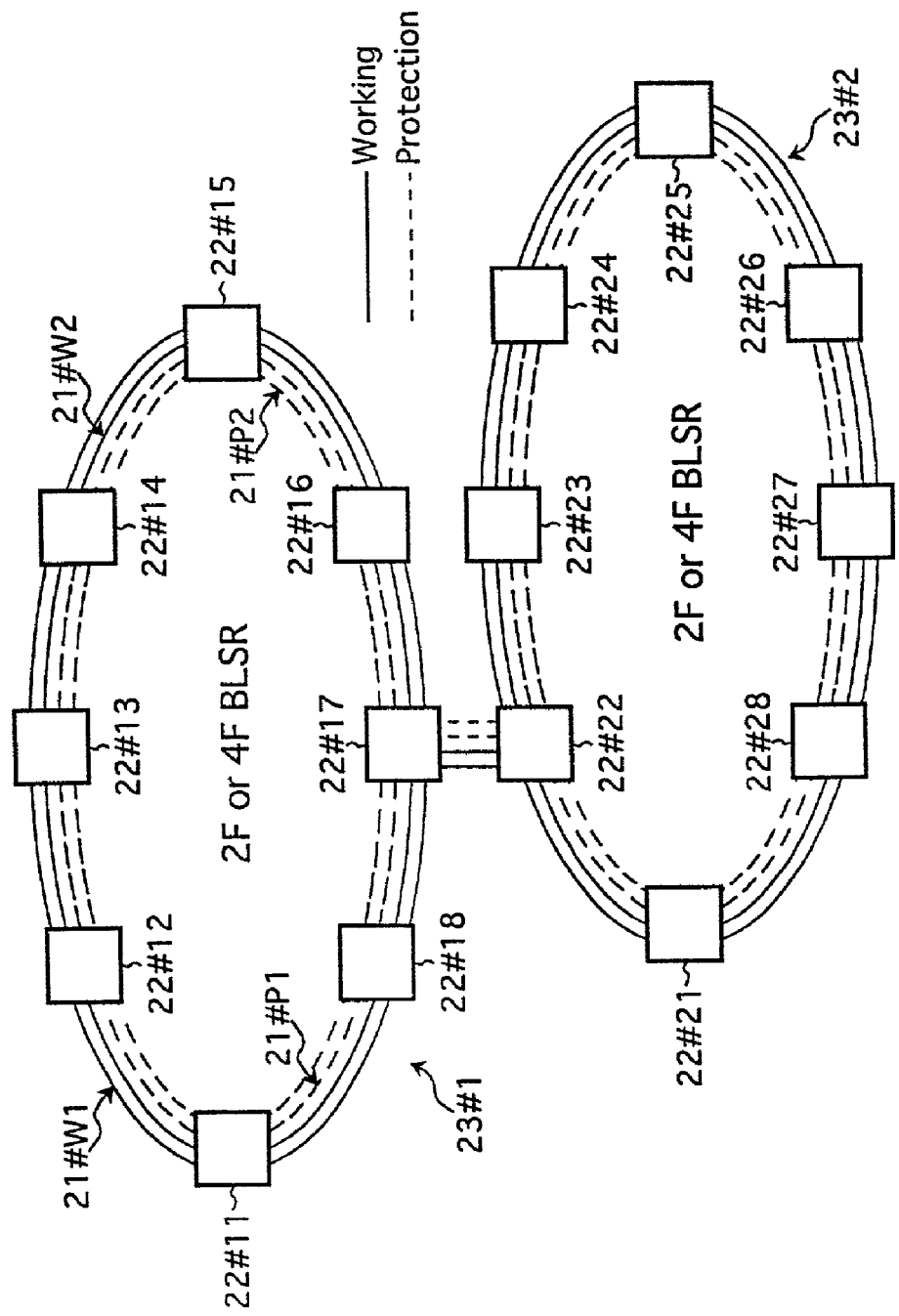
FIG. 4 is a diagram showing the configuration of a network provided by a second embodiment of the present invention.

FIG. 4 is a diagram showing the configuration of a network provided by a second embodiment of the present invention. As shown in the figure, the network is a 2-ring network, which consists of two ring networks 23#1 and 23#2. The ring network 23#1 comprises a plurality of BLSR multiplexing apparatuses, for example, 8 transmission apparatuses 22#1i where i=1 to 8. Likewise, the ring network 23#2 comprises a plurality of BLSR multiplexing apparatuses, for example, 8 transmission apparatuses 22#2i where i=1 to 8. The ring networks 23#1 and 23#2 are connected to each other by transmission lines linking the transmission apparatus 22#17 of the ring network 23#1 to the transmission apparatus 22#22 of the ring network 23#2.

Figure 5:
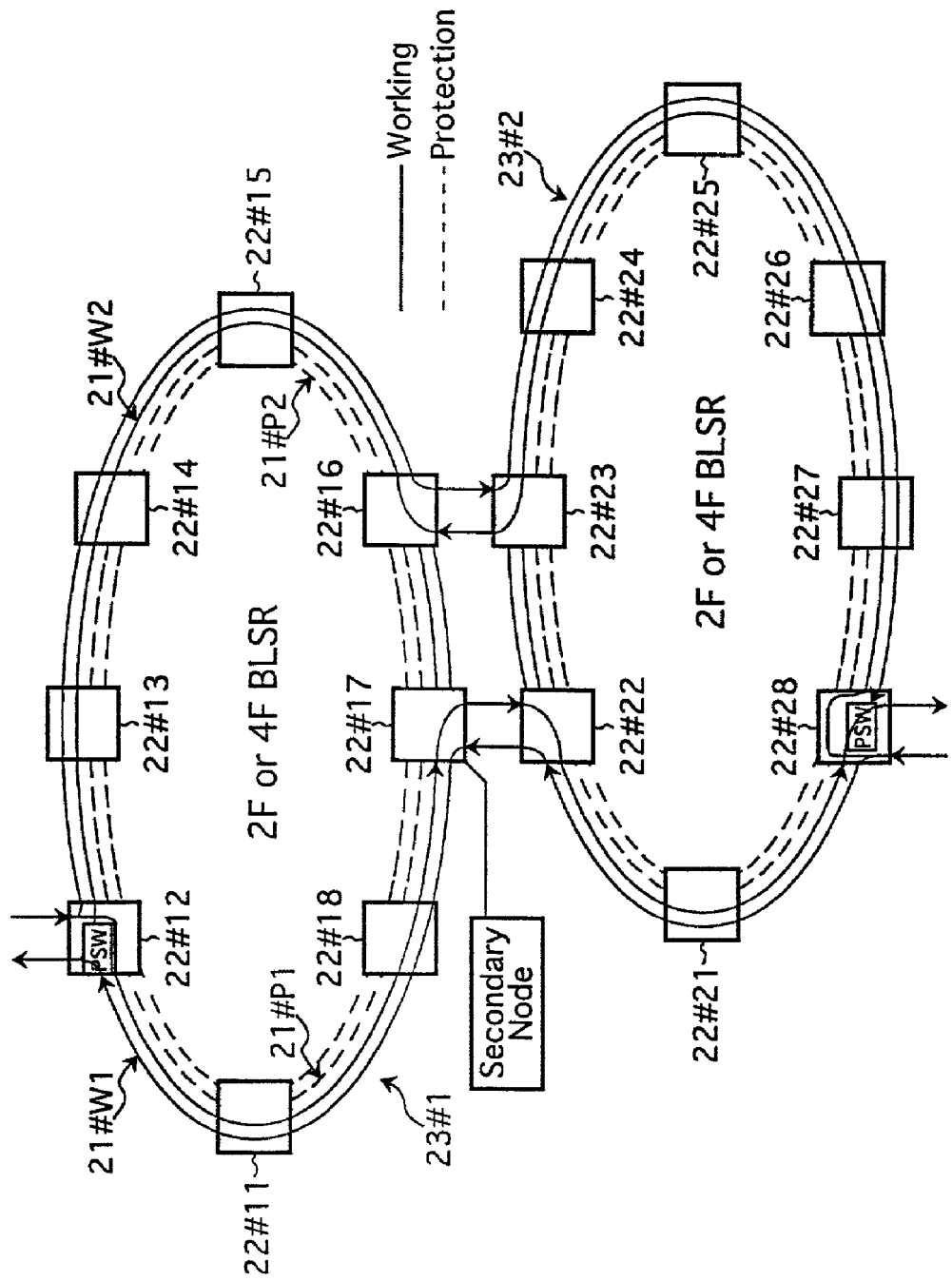
FIG. 5 is a diagram showing a DTW connection of the network shown in FIG. 4.

FIG. 5 is a diagram showing a DTW connection of the configuration of the network shown in FIG. 4. To be more specific, FIG. 5 shows a DTW implementation of connection of adding and/or dropping a signal between the terminal node 22#12 of the ring network 23#1 and the terminal node 22#28 of the ring network 23#2 in the configuration of the network shown in FIG. 4. In the DTW connection, the terminal node 22#12 adds a channel signal to a working line 21#W1 and a working line 21#W2 in a direction opposite to a working line 21#W1. The channel signal added to the working line 21#W1 is transmitted through the transmission apparatus 22#11, a working line 21#W1, the transmission apparatus 22#18 and a working line 21#W1 to the secondary node 22#17, which drops the signal to the network 23#2. The channel signal dropped by the secondary node 22#17 is added by the secondary node 22#22 of the network 23#2 to a working line 21#W1 and transmitted to the terminal node 22#28 through the transmission apparatus 22#21 and a working line 21#W1.

On the other hand, the channel signal added to the working line 21#W2 is transmitted through the transmission apparatus 22#13, a working line 21#W2, the transmission apparatus 22#14, a working line 21#W2, the transmission apparatus 22#15 and a working line 21#W2 to the secondary node 22#16, which drops the signal to the network 23#2. The channel signal dropped by the secondary node 22#16 is added by the secondary node 22#23 of the network 23#2 to a working line 21#W2 and transmitted to the terminal node 22#28 through the transmission apparatus 22#24, a working line 21#W2, the transmission apparatus 22#25, a working line 21#W2, the transmission apparatus 22#26, and a working line 21#W2. The terminal node 22#28 selects the channel signal received from the transmission apparatus 22#21 or 22#27 by using a PSW (path switch) and finally drops the selected one.

A channel signal added by the terminal node 22#28 to working lines 21#W1 and 21#W2 are transmitted to paths in opposite directions to the terminal node 22#12, which finally drops the signal.

Figure 6:
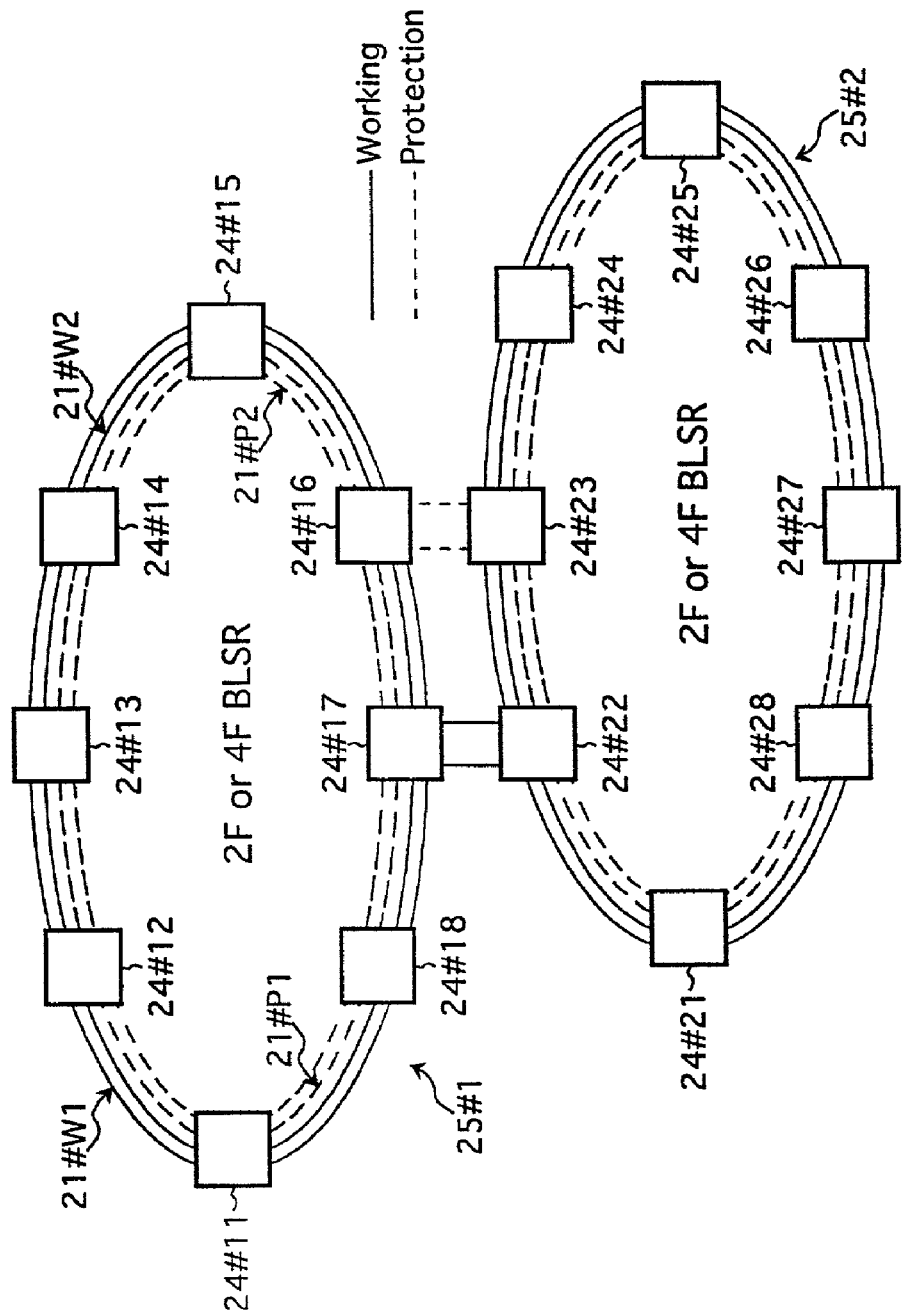
FIG. 6 is a diagram showing the configuration of a network provided by a third embodiment of the present invention.

FIG. 6 is a diagram showing the configuration of a network provided by a third embodiment of the present invention. As shown in the figure, the network is a 2-ring network, which consists of two ring networks 25#1 and 25#2. The ring network 25#1 comprises a plurality of BLSR multiplexing apparatuses, for example, 8 transmission apparatuses 24#1i where i=1 to 8. Likewise, the ring network 25#2 comprises a plurality of BLSR multiplexing apparatuses, for example, 8 transmission apparatuses 24#2i where i=1 to 8. The ring networks 25#1 and 25#2 are connected to each other by working lines linking the transmission apparatus 24#17 of the ring network 25#1 to the transmission apparatus 24#22 of the ring network 25#2 and protection lines linking the transmission apparatus 24#16 of the ring network 25#1 to the transmission apparatus 24#23 of the ring network 25#2.

Figure 7:
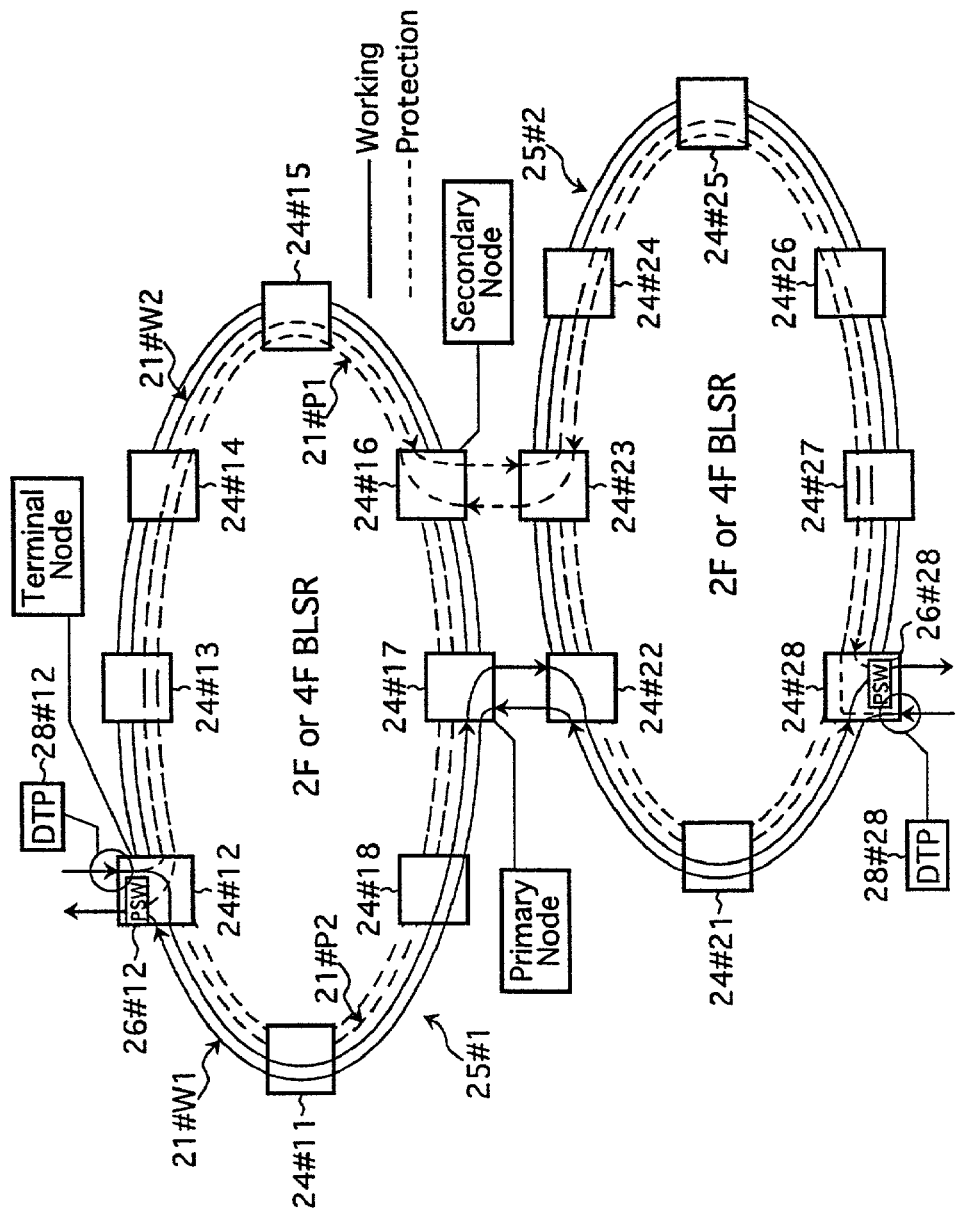
FIG. 7 is a diagram showing a DTP connection of the network shown in FIG. 6.

FIG. 7 is a diagram showing a DTP connection of the configuration of the network shown in FIG. 6. To be more specific, FIG. 7 shows a DTP implementation of connection of adding and/or dropping a signal between the terminal node 24#12 of the ring network 25#1 and the terminal node 24#28 of the ring network 25#2 in the configuration of the network shown in FIG. 6. In the DTP connection, the terminal node 26#12 adds a channel signal to a working line 21#W2 and a protection line 21#P2. The channel signal added to the working line 21#W1 is transmitted through the transmission apparatus 24#11, a working line 21#W1, the transmission apparatus 24#18 and a working line 21#W1 to the primary node 24#17, which drops the signal to the network 25#2. On the other hand, the channel signal added to the protection line 21#P2 is transmitted through the transmission apparatus 24#13, a protection line 21#P1, the transmission apparatus 24#14, a protection line 21#P2, the transmission apparatus 24#15 and a protection line 21#P2 to the secondary node 24#16, which drops the signal to the network 23#2.

The signal dropped by the primary node 24#17 is added by the primary node 24#22 of the network 23#2 to a working line 21#W2 and transmitted to the terminal node 24#28 through the transmission apparatus 24#21 and a working line 21#W2. On the other hand, the channel signal dropped by the secondary node 24#16 is added by the secondary node 24#23 of the network 23#2 to a protection line 21#P2 and transmitted to the terminal node 24#28 through the transmission apparatus 24#24, a protection line 21#P2, the transmission apparatus 24#25, a protection line 21#P2, the transmission apparatus 24#26, a protection line 21#P2, the transmission apparatus 24#27 and a protection line 21#P2. The terminal node 24#28 selects the channel signal received from a working line 21#W2 or a protection line 21#P2 by using a PSW (path switch) 26#28 and finally drops the selected one.

A channel signal added by the terminal node 24#28 to working and protection lines are transmitted to paths in opposite directions to the terminal node 24#12, which finally drops the signal.

Figure 8:
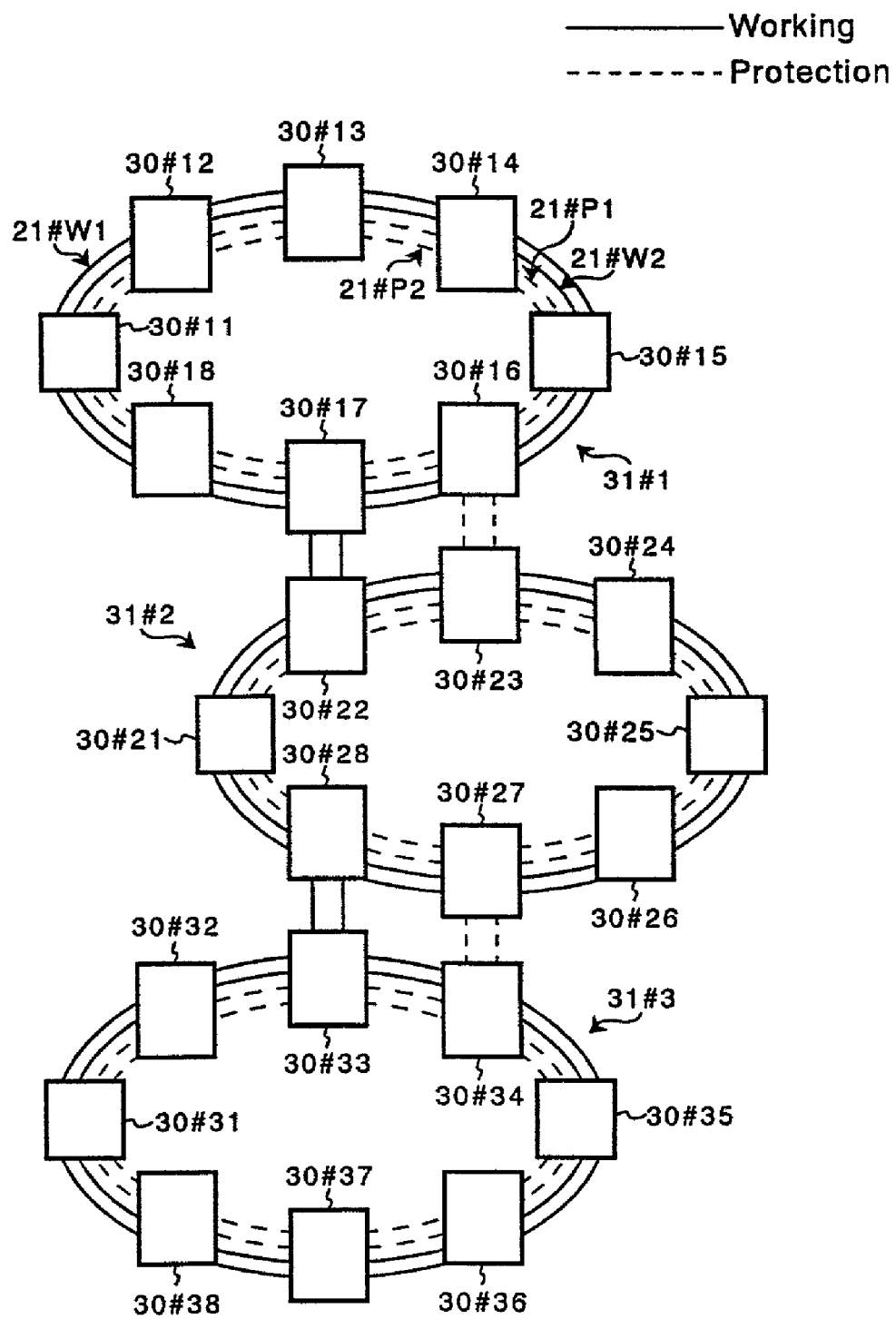
FIG. 8 is a diagram showing the configuration of a network provided by a fourth embodiment of the present invention.

FIG. 8 is a diagram showing the configuration of a network provided by a fourth embodiment of the present invention. As shown in the figure, the network is a 3-ring network, which consists of 3 ring networks 31#i where i=1 to 3. The ring network 31#i where i=1 to 3 comprises a plurality of BLSR multiplexing apparatuses, for example, 8 transmission apparatuses 30#ij where j=1 to 8. The ring networks 31#1 and 31#2 are connected to each other by working lines linking the transmission apparatus 30#16 of the ring network 31#1 to the transmission apparatus 30#22 of the ring network 31#2 and protection lines linking the transmission apparatus 30#16 of the ring network 31#1 to the transmission apparatus 30#23 of the ring network 31#2. By the same token, the ring networks 31#2 and 31#3 are connected to each other by working lines linking the transmission apparatus 30#28 of the ring network 31#2 to the transmission apparatus 30#33 of the ring network 31#3 and protection lines linking the transmission apparatus 30#27 of the ring network 31#2 to the transmission apparatus 30#34 of the ring network 31#3.

Figure 9:
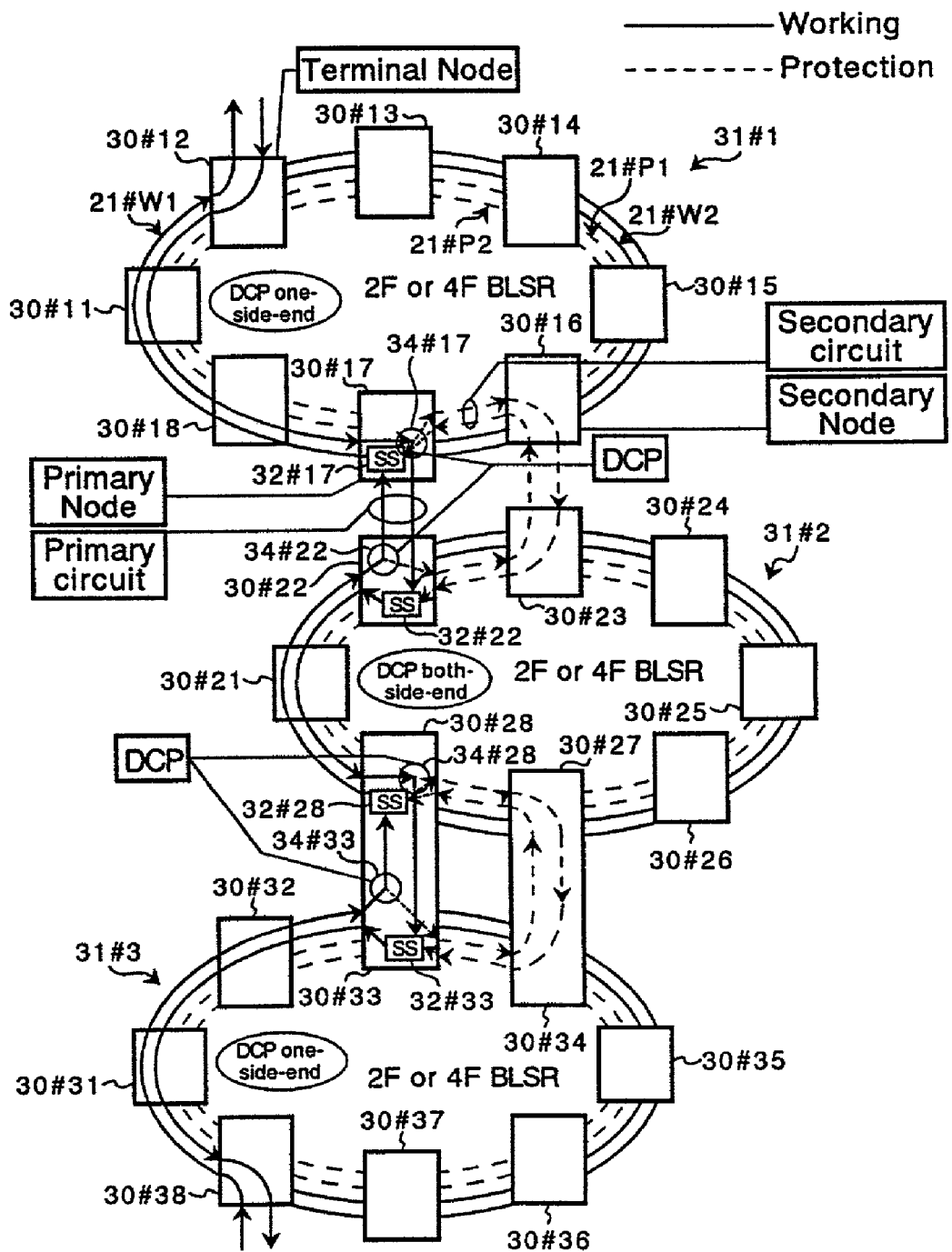
FIG. 9 is a diagram showing a DCP connection system of the network shown in FIG. 8.

FIG. 9 is a diagram showing a DCP connection system of the configuration of the network shown in FIG. 8. To be more specific, FIG. 9 shows a DCP implementation of connection of adding and/or dropping a signal between the terminal node 30#12 of the ring network 31#1 and the terminal node 30#38 of the ring network 31#3 in the configuration shown in FIG. 8. In the DCP connection, a channel signal added by the terminal node 30#12 to a working line 21#W1 is transmitted to the primary node 30#17 through the working line 21#W1, the transmission apparatus 30#11, a working line 21#W1, the transmission apparatus 30#18 and a working line 21#W1. The primary node 30#17 uses a DCP unit 34#17 employed therein to drop the channel signal received from a working line 21#W1 to the transmission apparatus 30#22 of the ring network 31#2 through a primary circuit 21#W1, and continues the channel signal to the secondary node 30#16 through a secondary circuit 21#P1. The secondary node 30#16 drops the channel signal received from the secondary circuit 21#P1 to the secondary node 30#23 of the ring network 31#2.

The secondary node 30#23 of the ring network 31#2 receives the channel signal dropped from the secondary node 30#16 of the ring network 31#1 and adds the signal to a protection line 21#P1. The transmission apparatus 30#22 of the ring network 31#2 receives the channel signal dropped by the primary node 30#17 of the ring network 31#1 and the channel signal added by the secondary node 30#23 to a protection line 21#P1, using an SS (service selector) 32#22 to select either of the channel signals to be added to a working line 21#W1. The channel signal added to the working line 21#W1 is transmitted to the primary node 30#28 through the transmission apparatus 30#21 and a working line 21#W1. A DCP unit 34#28 employed in the primary node 30#28 drops the channel signal to the primary node 30#33 of the ring network 31#3 and continues the signal to the secondary node 30#27 through a protection line 21#P1. The secondary node 30#27 drops the channel signal received from the secondary circuit 21#P1 to the transmission apparatus 30#34 of the ring network 31#3.

The secondary node 30#34 of the ring network 31#3 receives the channel signal dropped from the secondary node 30#27 of the ring network 31#2 and adds the signal to a protection line 21#P1. The transmission apparatus 30#33 of the ring network 31#3 receives the channel signal dropped by the primary node 30#28 of the ring network 31#2 and the channel signal added by the secondary node 30#34 to a protection line 21#P1, using an SS (service selector) 32#33 to select either of the channel signals to be added to a working line 21#W1. The channel signal added to the working line 21#W1 is transmitted to the terminal-node transmission apparatus 30#38 through the transmission apparatus 30#32, a working line 21#W1, the transmission apparatus 30#31 and a working line 21#W1.

The transmission apparatuses 30#17 and 30#28, which drop as well as continue a channel signal as described above, are each referred to as a primary node. The transmission apparatuses 30#22 and 30#33 also drop as well as continue a channel signal in transmissions in a direction opposite to that of the transmission apparatuses 30#17 and 30#28 and are thus each referred to as a primary node as well. On the other hand, the transmission apparatuses 30#16 and 30#27, which drop a channel signal to another ring network, and the transmission apparatuses 30#23 and 30#34, which add a channel signal received from another ring network, are each referred to as a secondary node. A ring network having only one secondary node is referred to as a DCP one-side-end connection network. Examples of the DCP one-side-end connection network are the ring network 31#1 having only one secondary node, namely, the transmission apparatus 30#16, and the ring network 31#3 having only one secondary node, namely, the transmission apparatus 30#34. On the other hand, a ring network having two secondary nodes is referred to as a DCP both-side-end connection network. An example of the DCP both-side-end connection network is the ring network 31#2 having two secondary nodes, namely, the transmission apparatuses 30#23 and 30#27.

Figure 10:
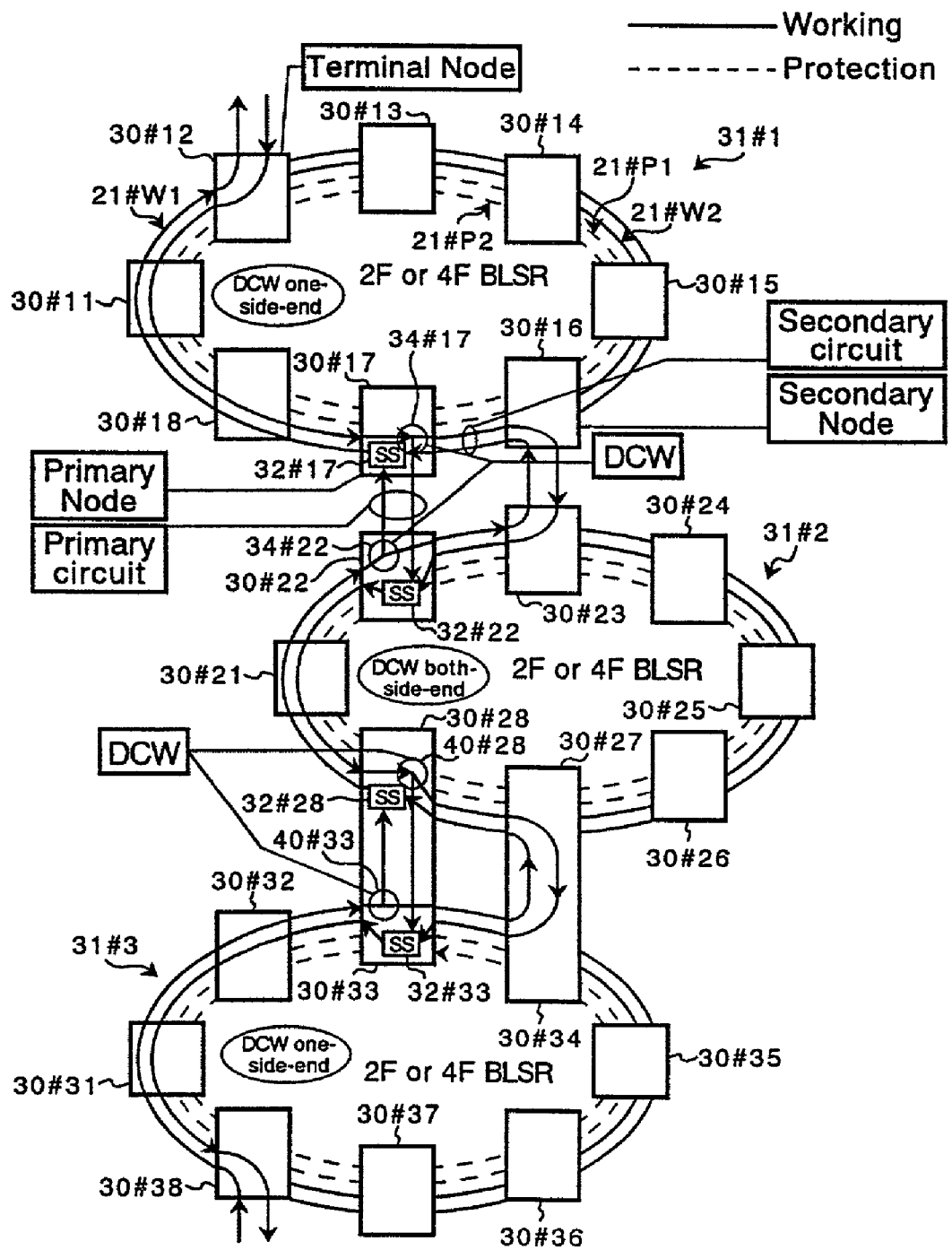
FIG. 10 is a diagram showing a DCW connection system of the network shown in FIG. 8.

FIG. 10 is a diagram showing a DCW connection system of the configuration of the network shown in FIG. 8. As shown in FIG. 10, the DCW connection is different from the DCP connection shown in FIG. 9 in that, DCW units 40#17, 40#22 and 40#33 employed in the transmission apparatuses 30#17, 30#22 and 30#33 respectively each drop a channel signal and continue the channel signal on a working line instead of a protection line and the transmission apparatuses 30#16, 30#23, 30#27 and 30#34 each add a channel signal to working lines 21#W1 and 21#W2.

A ring network having only one secondary node is referred to as a DCW one-side-end connection network. Examples of the DCW one-side-end connection network are the ring network 31#1 having only one secondary node, namely, the transmission apparatus 30#16, and the ring network 31#3 having only one secondary node, namely, the transmission apparatus 30#34. On the other hand, a ring network having two secondary nodes is referred to as a DCW both-side-end connection network. An example of the DCW both-side-end connection network is the ring network 31#2 having two secondary nodes, namely, the transmission apparatuses 30#23 and 30#27.

As described above, it is possible to provide a variety of implementations of connection such as the normal connection, the DTW connection, the DTP, the DCP one-side-end connection, the DCP both-side-end connection, the DCW one-side-end connection and the DCW both-side-end connection. The transmission apparatus provided by an embodiment of the present invention executes switching control according to the implementation of connection for the variety of implementations of connection.

Figure 11:
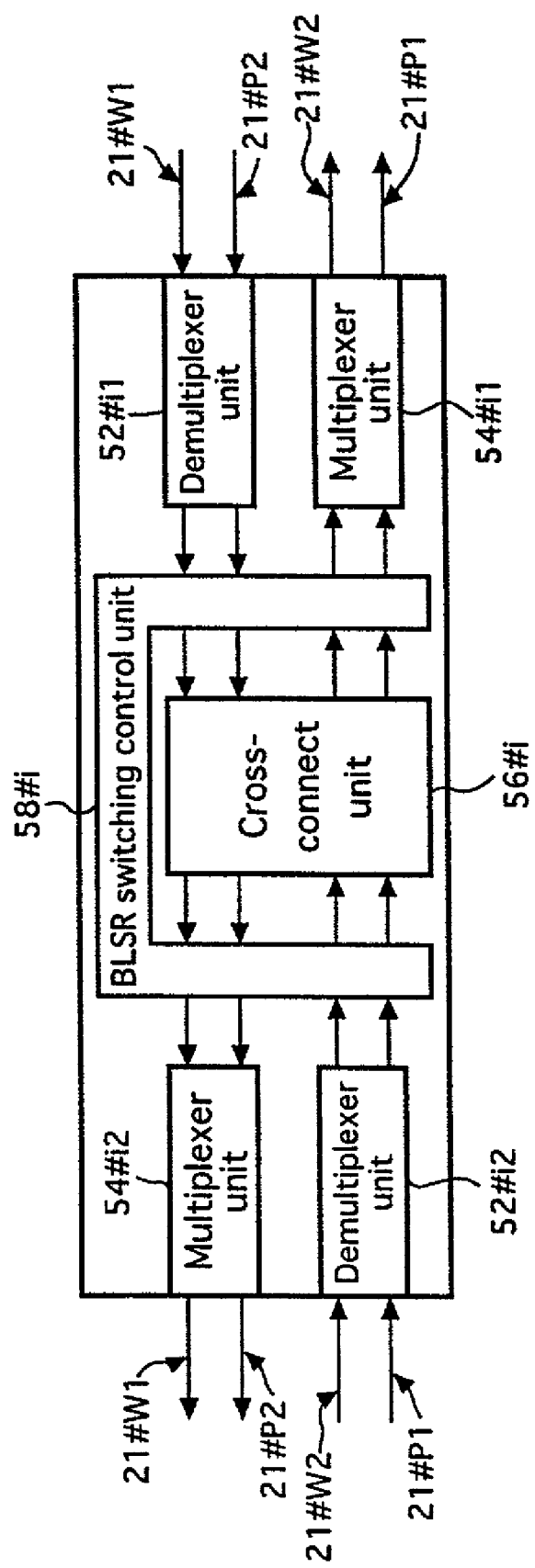
FIG. 11 is a diagram showing the configuration of a transmission apparatus provided by an embodiment of the present invention.

FIG. 11 is a diagram showing the configuration of a transmission apparatus 56#i provided by an embodiment of the present invention. As shown in the figure, the transmission apparatus 56#i comprises demultiplexer units 52#i1 and 52#i2, multiplexer units 54#i1 and 54#i2, a cross-connect unit 56#i and a BLSR switching control unit 58#i. The demultiplexer units 52#i1 and 52#i2 receive synchronized frames such as SDH and SONET from transmission lines, namely, working lines 21#W1 and 21#W2 as well as protection lines 21#P1 and 21#P2, separating each frame into an overhead and a payload. Data of channels mapped onto the payload is extracted and supplied to the BLSR switching control unit 58#i along with the overhead. The multiplexer units 54#i1 and 54#i2 multiplex data of channels received from the BLSR switching control unit 58#i with the payload of a synchronized frame, and maps an overhead received from the BLSR switching control unit 58#i onto the synchronized frame, outputting the frame to the working lines 21#W1 and 21#W2 as well as the protection lines 21#P1 and 21#P2. The cross-connect unit 56#i outputs data of channels extracted by the demultiplexer units 52#i1 and 52#i2 to signal lines for the respective channels of an output path in accordance with line setting information. The transmission apparatus 56#i also requires a demultiplexer and a multiplexer that serve as an interface with an apparatus such as a terminal in operations to add and drop a signal. It should be noted, however, that these demultiplexer and the multiplexer are not shown in the figure.

The BLSR switching control unit 58#i has the following functions:

1: Input cross-connect information for each channel from a user interface unit and classify the information into cross-connect categories. A time slot in a synchronized frame is assigned to a channel for a path starting at a node adding a signal and ending at a node dropping the signal.

2: Form a judgment as to whether the station employing this transmission apparatus is an east-end station, a west-end station, an intermediate station or a through station. The judgment is based on a cross-connect category. With a signal transmitted in the counterclockwise direction, typically, the reception and transmission sides are seen by each transmission apparatus 56#i as west and east sides respectively. An end station is a station for merely adding or dropping a signal. For a channel, an end station is thus a node located at an end. Speaking about an end station adding a signal and an end station dropping a signal, an end station located on the east side is referred to as an east-end station whereas an end station located on the west side is referred to as a west-end station. An intermediate station is a node that drops as well as continues a signal or a node that adds a signal to both working and protection lines. A through station is a node that relays (or passes through) a channel signal. In the case of the middle ring network shown in FIG. 9, for example, the transmission apparatus 30#27 is the east-end station, the transmission apparatus 30#28 is an intermediate station, the transmission apparatus 30#21 is a through station, the transmission apparatus 30#22 is an intermediate station and the transmission apparatus 30#23 is a west-end station.

3: Carry out the following functions in case the station employing this transmission apparatus is an east-end station:

3-1: Insert the cross-connect category of the station employing this transmission apparatus into the overhead of the synchronized frame and transmit the frame to an adjacent node on the west side in accordance with a predetermined protocol such as a token ring protocol.

3-2: Hand over a transmission right to the adjacent node.

3-3: Store the cross-connect category of the station employing this transmission apparatus in a stack.

3-4: Store a cross-connect category received from the adjacent station in a stack.

4: Carry out the following functions in case the station employing this transmission apparatus is a west-end station:

4-1: Accommodate information triggering collection of cross-connect categories in the overhead of the synchronized frame and transmit the frame to an adjacent node on the east side.

4-2: In case a cross-connect category is received from an east-end station, initialize a table and store the cross-connect category in a stack.

4-3: In case a cross-connect category is not received from an east-end station, store the cross-connect category in a stack.

4-4: When a transmission right is passed around from an adjacent node on a polling basis, acquire the transmission right and accommodate the cross-connect category of the station employing this transmission apparatus in the overhead of the synchronized frame before transmitting the frame to an adjacent node on the west side. Then, store the cross-connect category of the station employing this transmission apparatus in a stack.

5: Carry out the following functions in case the station employing this transmission apparatus is a through station:

5-1: In case a cross-connect category is received from an east-end station, initialize a table and store the cross-connect category in a stack.

5-2: In case a cross-connect category is not received from an east-end station, store the cross-connect category in a stack.

5-3: Pass on a received cross-connect category to an adjacent node on the west side.

5-4: When a transmission right is transferred from an adjacent node on a polling basis, pass on the transmission right to an adjacent node on the west side.

6: Carry out the following functions in case the station employing this transmission apparatus is an intermediate station:

6-1: In case a cross-connect category is received from an east-end station, initialize a table and store the cross-connect category in a stack.

6-2: In case a cross-connect category is not received from an east-end station, store the cross-connect category in a stack.

6-3: Pass on a received cross-connect category to an adjacent node on the west side.

6-4: When a transmission right is passed around from an adjacent node on a polling basis, acquire the transmission right and accommodate the cross-connect category of the station employing this transmission apparatus in the overhead of the synchronized frame before transmitting the frame to an adjacent node on the west side. Then, store the cross-connect category of the station employing this transmission apparatus in a stack.

7: Check a cross-connect category stored in the stack for an connection-implementation error. If such an error exists, issue a warning to the user by way of the user interface unit.

8: Identify the implementation of connection from a cross-connect category stored in the stack and create a squelch table and a RIP table.

9: If a transmission-line error is detected, report information on the failure to adjacent nodes on the east and west sides.

10: If information on a failure is received, identify the implementation of connection by referring to the squelch and RIP tables and execute switching control in accordance with the connection system.

11: Drive a switch unit such as a PSW, an SS, a ring switch or a span switch employed therein in accordance with the switching system including the submarine BLSR system or the normal BLSR system.

Figure 12:
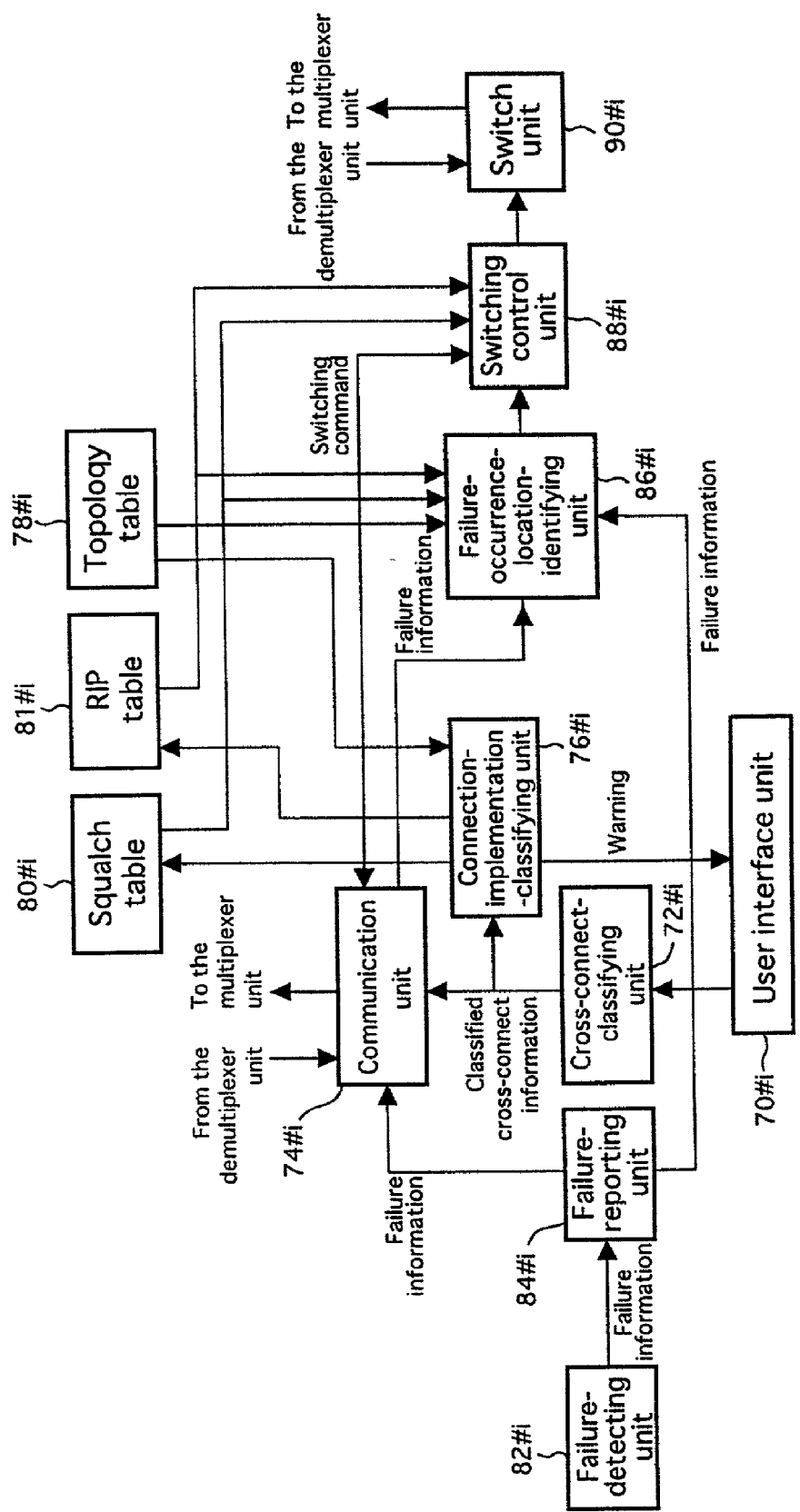
FIG. 12 is a diagram showing the configuration of a BLSR switching control unit employed in the transmission apparatus shown in FIG. 11.

FIG. 12 is a diagram showing the configuration of the BLSR switching control unit 58#i employed in the transmission apparatus shown in FIG. 11. As shown in FIG. 12, the BLSR switching control unit 58#i comprises a user interface unit 70#i, a cross-connect-classifying unit 72#i, a communication unit 74#i, a connection-implementation-classifying unit 76#i, a topology table 78#i, a squelch table 80#i, a RIP table 81#i, a failure-detecting unit 82#i, a failure-reporting unit 84#i, a failure-occurrence-location-identifying unit 86#i, a switching control unit 88#i and a switch unit 90#i. The user interface unit 70#i inputs cross-connect information entered by the user and supplies the information to the cross-connect-classifying unit 72#i. Cross-connect information is typically transmitted from a central control apparatus at a remote location by way of a LAN or from an adjacent node typically as an overhead of a synchronized frame. The cross-connect information typically includes a channel number, a signal direction, namely, the east or west direction and a line type, which indicates whether the transmission line is a working or protection line for adding, dropping, passing through or adding as well as dropping a signal. Take the connection system shown in FIG. 9 as an example. In this case, for a channel to which the transmission apparatus 30#12 adds a signal, the cross-connect information is given as follows:

The cross-connect information supplied to the transmission apparatus 30#12:
A channel number and a request for an operation of adding a signal to a working line in the east signal direction.
The cross-connect information supplied to the transmission apparatus 30#11:
A channel number and a request for an operation of passing through a signal to a working line in the east signal direction.
The cross-connect information supplied to the transmission apparatus 30#18:
A channel number and a request for an operation of passing through a signal to a working line in the east signal direction.
The cross-connect information supplied to the transmission apparatus 30#17:
A channel number and a request for an operation of dropping a signal from a work line in the east signal direction as well as relaying the signal to a protection line in the east signal direction.
The cross-connect information supplied to the transmission apparatus 30#16:
A channel number and a request for an operation of dropping a signal from a protection line in the east signal direction.

As described above, the cross-connect information supplied to the transmission apparatus 30#17 includes a channel number and a request for operations to drop a signal from a work line in the east signal direction as well as to relay the signal to a protection line in the east signal direction, indicating a DCP (Drop and Continue on Protection) connection. Since this cross-connect information entails 2 operations, namely, signal-dropping and signal-adding operations, 2 pieces of cross-connect information are supplied at separate times. That is to say, the first cross-connection information includes a channel number and a request for an operation to drop a signal from a work line in the east signal direction and the second cross-connection information includes a channel number and a request for an operation to pass through the signal to a protection line in the east signal direction. As for a west-direction channel involved in the operation of the SS 32#17 employed in the transmission apparatus 30#17 of the middle ring network shown in FIG. 9, two pieces of cross-connect information are also supplied at separate times. That is to say, the first cross-connection information includes a channel number and a request for an operation to add a signal from a work line in the west signal direction and the second cross-connection information includes a channel number and a request for an operation to pass through the signal to a protection line in the west signal direction. Much like the DCP connection system described above, in the DCW connection system shown in FIG. 10, 2 pieces of cross-connect information are also supplied to a primary node at separate times.

Figure 13:
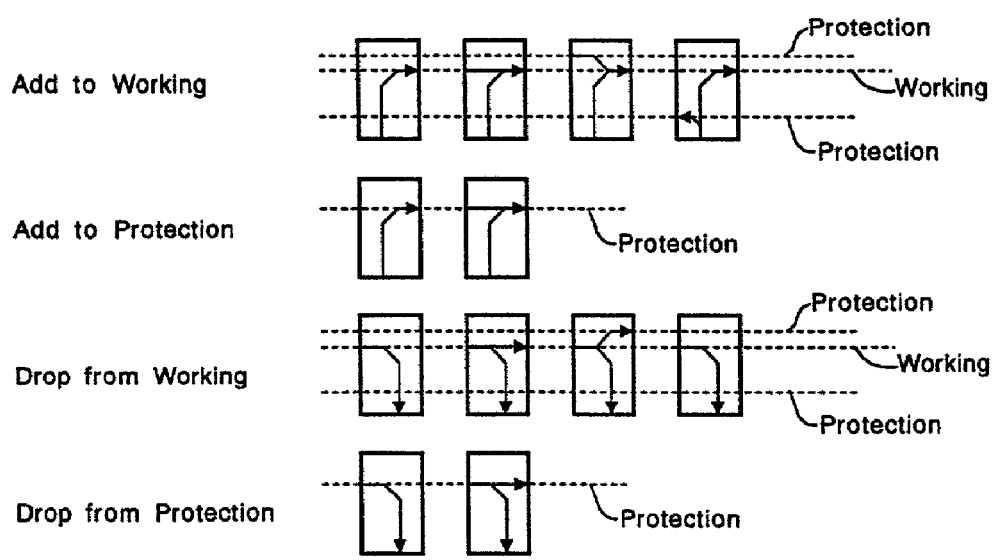
FIG. 13 is a diagram showing classification of cross-connect categories.

The cross-connect-classifying unit 72#i classifies cross-connect information input by the user interface unit 70#i into cross-connect categories. FIG. 13 is a diagram showing classification of cross-connect categories. As shown in FIG. 13, cross-connect information is classified into categories of Add to Working, Add to Protection, Drop from Working and Drop from Protection.

1: Add-to-Working category

The following cross-connect information is included in the category of Add to Working:

1-1: A request for an operation of adding a signal to a working line in the east or west direction.

1-2: A request for an operation of adding a signal to a working line in the east or west direction or passing through a signal from a protection line in the east or west direction to a working line.

1-3: A request for an operation of adding a signal to a working line in the east or west direction and passing through a signal from a protection line in the east or west direction to a working line.

1-4: A request for an operation of adding a signal to a protection line in the east or west direction and passing through a signal from a protection line in the east or west direction to a working line.

2: Add-to-Protection category

The following cross-connect information is included in the category of Add to Protection:

2-1: A request for an operation of adding a signal to a protection line in the east or west direction.

2-2: A request for an operation of adding a signal to a protection line in the east or west direction and passing through a signal from a protection line in the east or west direction to a protection line.

3: Drop-from-Working category

The following cross-connect information is included in the category of Drop from Working:

3-1: Dropping a signal from a working line in the east or west direction.

3-2: Dropping a signal from a working line in the east or west direction and passing through a signal from a working line in the east or west direction to a working line.

3-3: Dropping a signal from a working line in the east or west direction and passing through a signal from a working line in the east or west direction to a protection line.

4: Drop-from-Protection category

The following cross-connect information is included in the category of Drop from Protection:

4-1: Dropping a signal from a protection line in the east or west direction.

4-2: Dropping a signal from a protection line in the east or west direction and passing through a signal from a protection line in the east or west direction to a protection line.

In the case of a through station, cross-connect information is not subjected to classification due to the fact that the information is not required for creation of a squelch table 80#i and a RIP table 81#i.

The communication unit 74#i has the following functions:

1: Determine whether the station employing this transmission apparatus is an east-end station, a west-end station, an intermediate station or a through station on the basis of the cross-connect category.

2: If the station employing this transmission apparatus is an east-end station, carry out the following functions:

2-1: Accommodate information such as the node ID and the cross-connect category of the station employing this transmission apparatus to be described later into the overhead of the synchronized frame and transmit the frame to an adjacent node on the west side in accordance with a token ring protocol.

2-2: Hand over the transmission right to the adjacent node.

3: If the station employing this transmission apparatus is a west-end station, carry out the following functions:

3-1: Accommodate information triggering start of collection of cross-connect categories and the like in the overhead of the synchronized frame and transmit the frame to an adjacent node on the east side.

3-2: When a transmission right is passed around from an adjacent node on a polling basis, acquire the transmission right and accommodate the cross-connect category of the station employing this transmission apparatus in the overhead of the synchronized frame before transmitting the frame to an adjacent node on the west side.

4: If the station employing this transmission apparatus is a west-end station, carry out the following functions:

4-1: Pass on a received cross-connect category to an adjacent node on the west side.

4-2: When a transmission right is passed around from an adjacent node on a polling basis, acquire the transmission right and accommodate the cross-connect category of the station employing this transmission apparatus in the overhead of the synchronized frame before transmitting the frame to an adjacent node on the west side.

5: If the station employing this transmission apparatus is an intermediate station, carry out the following functions:

5-1: Pass on a received cross-connect category to an adjacent node on the west side.

5-2: When a transmission right is passed around from an adjacent node on a polling basis, acquire the transmission right and accommodate the cross-connect category of the station employing this transmission apparatus in the overhead of the synchronized frame before transmitting the frame to an adjacent node on the west side.

6: Output information such as a received cross-connect category to the connection-implementation-classifying unit 76#i.

7: When receiving information on a failure from the failure-reporting unit 84#i, insert the information (including the node ID of the station employing this transmission apparatus) into typically K1 and K2 bytes of the overhead of the synchronized frame before transmitting the frame to an adjacent node on the west side.

The connection-implementation-classifying unit 76#i has the following functions:

1: If the station employing this transmission apparatus is an east-end station, initialize a stack and store information such as the cross-connect category of the station employing this transmission apparatus at the head of the stack.

2: Store information such as the cross-connect category in a stack table.

When the communication unit 74#i receives information such as a cross-connect category from an adjacent node, the communication unit 74#i forms a judgment as to whether or not a node corresponding to the information such as a cross-connect category received this time or stored in the stack right before is a broadcasting node on the basis of a cross-connect category stored in the stack as will be described later. If the node corresponding to such information is a broadcasting node, the cross-connect category received this time is not stored, or the cross-connect category received this time is stored, overwriting the cross-connect category stored in the stack right before. A broadcasting node is a node provided on a connection system of a DCx one-side/both-side broadcasting type adopting the submarine BLSR technique. In this implementation of connection, there exists a broadcasting node dropping a signal as well as continuing the signal to a protection or working line between a primary node and a secondary node for a DCx side-end connection. This broadcasting node is thus a node for dropping a signal and broadcasting the signal to nodes such as terminals in another ring network or the like. This is because removal of information on the broadcasting node from the stack has nothing to do with switching control. When a transmission right is passed around from an adjacent node on a polling basis, information such as a cross-connect category is stored in a stack if the station employing this transmission apparatus is a middle or west station. In this way, pieces of cross-connect information are stored in the stack in an order from the east direction.

Figure 14:
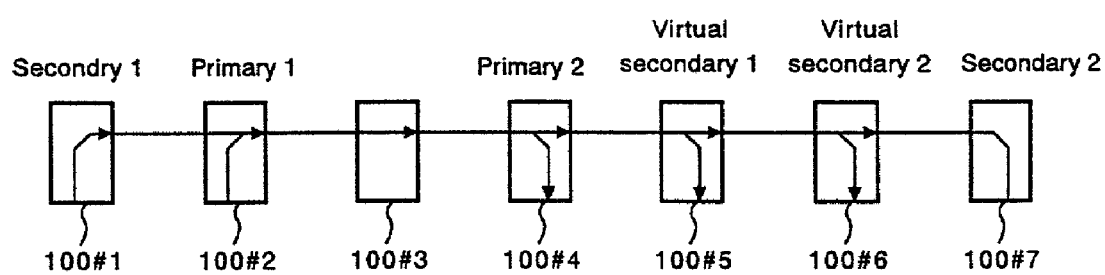
FIG. 14 is a diagram showing a technique to create a table for a broadcasting type.
Figure 15:
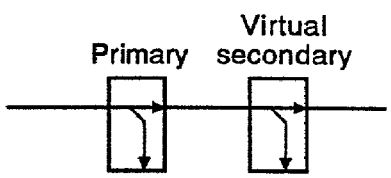
FIG. 15 is a diagram showing a technique to create a table for a broadcasting type.
Figure 16:
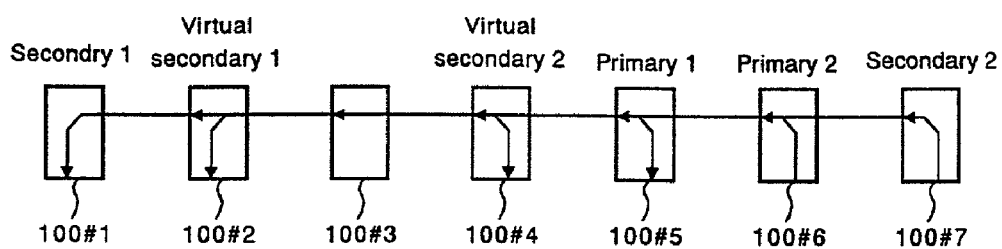
FIG. 16 is a diagram showing a technique to create a table for a broadcasting type.
Figure 17:
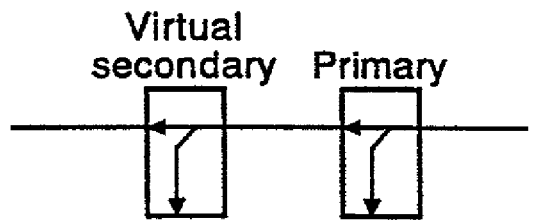
FIG. 17 is a diagram showing a technique to create a table for a broadcasting type.

FIGS. 14 to 17 are diagrams showing a technique to create a table for a DCx both-side-end broadcasting type. To be more specific, FIGS. 14 and 15 are diagrams showing a technique to create a table for a case in which a signal propagating from the east direction is added. On the other hand, FIGS. 16 and 17 are diagrams showing a technique to create a table for a case in which a signal propagating from the west direction is added. In the network shown in FIG. 14, nodes 100#1 and 100#7 are each a secondary node, a node 100#3 is a through node, nodes 100#2 and 100#4 are each a primary node whereas nodes 100#5 and 100#6 are each a broadcasting node (or a virtual secondary node). As shown in FIG. 14, the transmission of a signal starts from the signal-adding secondary node 100#1 and ends with 4 consecutive signal-dropping nodes, namely, the signal-dropping primary node 100#4, the signal-dropping broadcasting node 100#5, the signal-dropping broadcasting node 100#6 and the signal-dropping secondary node 100#7. The first signal-dropping cross-connect category of the primary node 100#4 and the last signal-dropping cross-connect category of the secondary node 100#7 are gathered but the signal-dropping cross-connect categories of nodes between the primary node 100#4 and the secondary node 100#7 are not. That is to say, if the cross-connect category of the first node is a category of adding of a signal, a signal-dropping cross-connection category received this time such as the cross-connection category of a virtual secondary node shown in FIG. 15 is not stored in a stack provided that an immediately preceding cross-connection category such as the cross-connection category of a primary node shown in FIG. 15 is also a category of dropping of a signal.

In the network shown in FIG. 16, nodes 100#1 and 100#7 are each a secondary node, a node 100#3 is a through node, nodes 100#5 and 100#6 are each a primary node whereas nodes 100#2 and 100#4 are each a broadcasting node (or a virtual secondary node). As shown in FIG. 16, the transmission of a signal starts from the signal-adding secondary node 100#7 and ends with 4 consecutive signal-dropping nodes, namely, the signal-dropping primary node 100#5, the signal-dropping broadcasting node 100#4, the signal-dropping broadcasting node 100#2 and the signal-dropping secondary node 100#1. In this case, when a signal is dropped by 2 consecutive nodes, the second data is used by this station for overwriting the first one. To put it in detail, a signal-dropping cross-connect category received this time is stored, overwriting an immediately preceding signal-dropping cross-connect category. That is to say, if the cross-connect category of the first node is a category of adding of a signal, a signal-dropping cross-connection category received this time such as the cross-connection category of a virtual secondary node shown in FIG. 17 is stored in a stack, overwriting an immediately preceding cross-connection category such as the cross-connection category of a primary node shown in FIG. 17 provided that the immediately preceding cross-connection category such as the cross-connection category of the primary node shown in FIG. 17 is also a category of dropping of a signal. In this way, in the case of the both-side DCx broadcasting type, the cross-connect category of a broadcasting node is not collected. In the case of the one-side DCx broadcasting type, the node 100#2 shown in FIG. 14 and the node 100#6 shown in FIG. 16 merely disappear. Thus, the operations to store cross-connect category for the one-side DCx broadcasting type are carried out in the same way as the both-side DCx broadcasting type.

3: Check a connection miss.

FIGS. 18A to 18C are diagrams each showing a setting miss. To be more specific, FIG. 18A shows a consecutive Drop→Add case or a consecutive Add→Drop case. FIG. 18B shows consecutive Add→Add cases. FIG. 18C shows a consecutive Add→Drop→Add→Drop case or a consecutive Drop→Add→Drop→Add case. In either case, a setting miss is determined to exist and a warning of the setting miss is reported to the user by way of the user interface unit 70#i.

4: Classify implementations of connection on the basis of cross-connection categories stored in the stack.

As described above, implementations of connection include the normal connection, the DTW connection, the DCP one-side-end connection, the DCP both-side-end connection, the DCW one-side-end connection and the DCW both-side-end connection. The implementations of connection are classified as follows.

4-1: Normal Add/Drop or DTW Implementation of Connection

Figure 19:
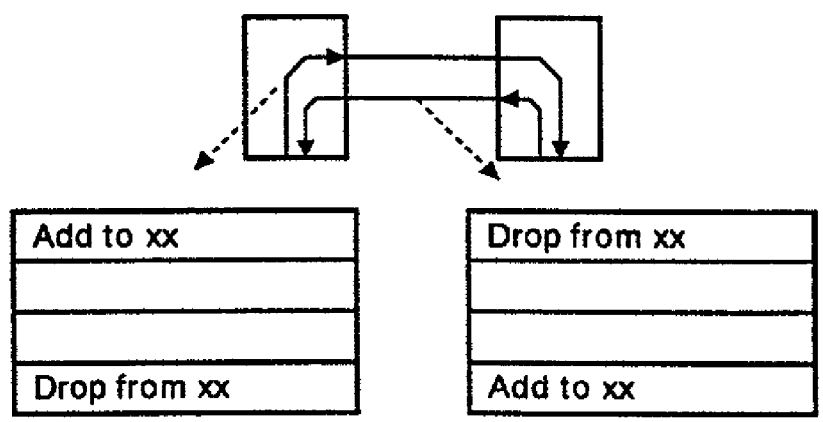
FIG. 19 is a diagram showing normal add and drop operations or a DTW implementation of connection.

FIG. 19 is a diagram showing normal add and drop operations or a DTW implementation of connection. As shown in FIG. 19, if the cross-connection categories stored in the stack are categories of adding a signal to a working line and dropping a signal from a working line or categories of dropping a signal from a working line and adding a signal to a working line, the implementation of connection is determined to be a normal Add/Drop or DTW implementation of connection.

4-2: DCP One-side-end Implementation of Connection

FIG. 20 is a diagram showing a DCP one-side-end implementation of connection. As shown in FIG. 20, if the cross-connection categories stored in the stack are categories of adding a signal to a protection line, adding a signal to a working line and dropping a signal from a working line, or categories of dropping a signal from a protection line, dropping a signal from a working line and adding a signal to a working line, or categories of dropping a signal from a working line, adding a signal to a working line and adding a signal to a protection line, or categories of adding a signal to a working line, dropping a signal from a working line and dropping a signal from a protection line, the implementation of connection is determined to be a DCP one-side-end implementation of connection.

4-3: DCW One-side-end Implementation of Connection

FIG. 21 is a diagram showing a DCW one-side-end implementation of connection. As shown in FIG. 21, if the cross-connection categories stored in the stack are categories of adding a signal to a working line, adding a signal to a working line and dropping a signal from a working line, or categories of dropping a signal from a working line, dropping a signal from a working line and adding a signal to a working line, or categories of dropping a signal from a working line, adding a signal to a working line and adding a signal to a working line, or categories of adding a signal to a working line, dropping a signal from a working line and dropping a signal from a working line, the implementation of connection is determined to be a DCW one-side-end implementation of connection.

4-4: DTP One-side-end Implementation of Connection

FIG. 22 is a diagram showing a DTP one-side-end implementation of connection. As shown in FIG. 22, if the cross-connection categories stored in the stack are categories of dropping a signal from a protection line, adding a signal to a working line and dropping a signal from a working line, or categories of adding a signal from a protection line, dropping a signal from a working line and adding a signal to a working line, or categories of dropping a signal from a working line, adding a signal to a working line and dropping a signal from a protection line, or categories of adding a signal to a working line, dropping a signal from a working line and adding a signal to a protection line, the implementation of connection is determined to be a DTP one-side-end implementation of connection.

4-5: DCP Both-side-end Implementation of Connection

Figure 23:
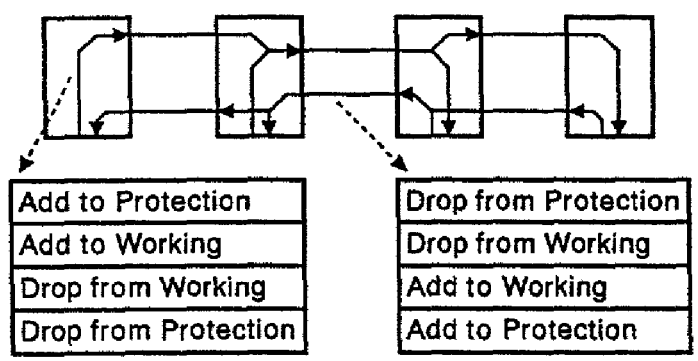
FIG. 23 is a diagram showing a DCP both-side-end implementation of connection.

FIG. 23 is a diagram showing a DCP both-side-end implementation of connection. As shown in FIG. 23, if the cross-connection categories stored in the stack are categories of adding a signal to a protection line, adding a signal to a working line, dropping a signal from a working line and dropping a signal from a protection line, or categories of dropping a signal from a protection line, dropping a signal from a working line, adding a signal to a working line and adding a signal to a protection line, the implementation of connection is determined to be a DCP both-side-end implementation of connection.

4-6: DCW Both-side-end Implementation of Connection

Figure 24:
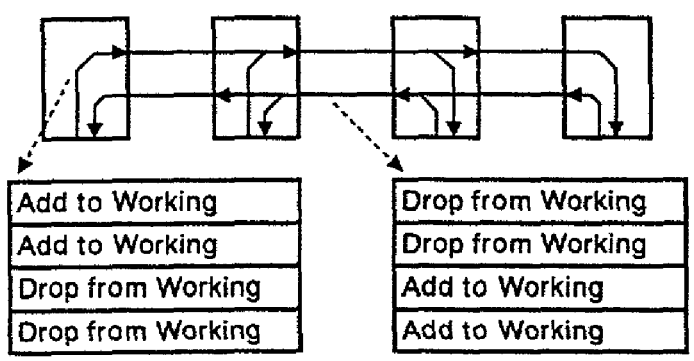
FIG. 24 is a diagram showing a DCW both-side-end implementation of connection.

FIG. 24 is a diagram showing a DCW both-side-end implementation of connection. As shown in FIG. 24, if the cross-connection categories stored in the stack are categories of adding a signal to a working line, adding a signal to a working line, dropping a signal from a working line and dropping a signal from a working line, or categories of dropping a signal from a working line, dropping a signal from a working line, adding a signal to a working line and adding a signal to a working line, the implementation of connection is determined to be a DCW both-side-end implementation of connection.

4-7: DCX One-side-end Implementation of Connection

Figure 25:
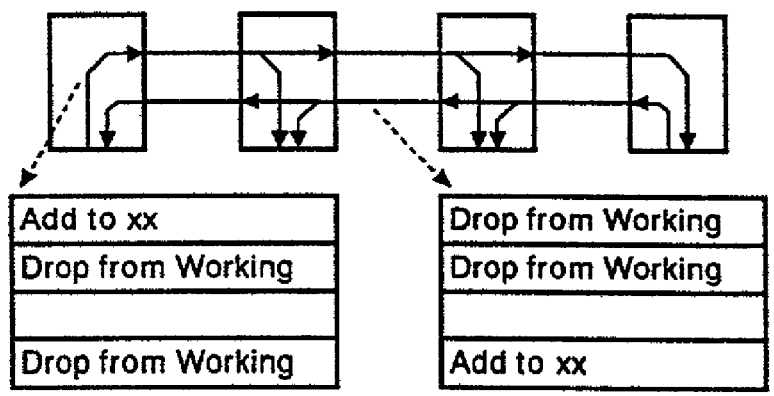
FIG. 25 is a diagram showing an implementation of connection with a broadcasting type of a DCx one-side-end.

FIG. 25 is a diagram showing a DCx one-side-end implementation of connection where the symbol x represents P or W, which stands for a protection or working line respectively. FIG. 25 shows a case with only one broadcasting node. It is worth noting, however, that 2 or more broadcasting nodes may exist in some cases. For example, a channel with the left-end node serving as a node adding a signal to a transmission line comprises a primary node at the left end successively followed by a primary node, a broadcasting node and a secondary node. On the other hand, a channel with the left-end node serving as a node dropping a signal from a transmission line comprises a secondary node at the left end successively followed by a broadcasting node, a primary node and a primary node. As shown in the figure, if the cross-connection categories stored in the stack are categories of adding a signal to a working or protection line, dropping a signal from a working line and dropping a signal from a working line, or categories of dropping a signal from a working line, and adding a signal to a working or protection line, the implementation of connection is determined to be a DCx one-side-end implementation of connection. It should be noted that, as described before, the cross-connect category of a broadcasting node is not stored in the stack.

4-8: DCx Both-side-end Implementation of Connection

Figure 26:
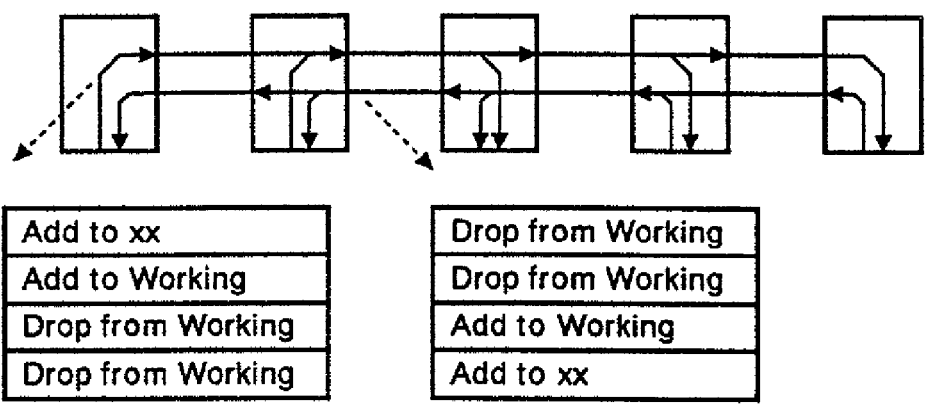
FIG. 26 is a diagram showing an implementation of connection with a broadcasting type of DCx both-side-ends.

FIG. 26 is a diagram showing a DCx both-side-end implementation of connection where the symbol x represents P or W. The DCx both-side-end implementation of connection is an implementation adopted for the submarine BLSR technique. The implementation of connection shown in the figure is a DCx both-side-end connection in which there are a plurality of broadcasting nodes dropping a signal and continuing the signal to a protection or working line between a primary node and a secondary node. FIG. 26 shows a case with only one broadcasting node. It is worth noting, however, that 2 or more broadcasting nodes may exist in some cases. For example, a channel with the left-end node serving as a node adding a signal to a transmission line comprises a secondary node at the left end successively followed by a primary node, a primary node, a broadcasting node and a secondary node. On the other hand, a channel with the left-end node serving as a node dropping a signal from a transmission line comprises a secondary node at the left end successively followed by a broadcasting node, a primary node, a primary node and a secondary node. As shown in the figure, if the cross-connection categories stored in the stack are categories of adding a signal to a working or protection line, adding a signal to a working line, dropping a signal from a working line and dropping a signal from a working line, or categories of dropping a signal from a working line, dropping a signal from a working line, adding a signal to a working line and adding a signal to a working or protection line, the implementation of connection is determined to be a DCx both-side-end implementation of connection. It should be noted that, as described before, the cross-connect category of a broadcasting node is not stored in the stack.

Figure 27:
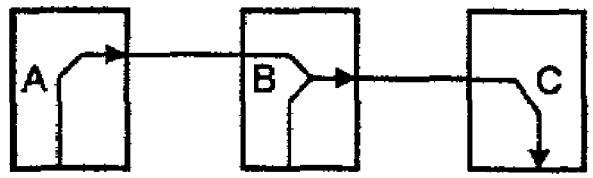
FIG. 27 is a diagram showing a typical determination of the implementation of connection.

FIG. 27 is a diagram showing a typical determination of the implementation of connection. In a DCP connection shown in FIG. 27, a node 100#A adds a signal to a protection line, a node 100#B adds a signal to a working line and a node 100#C drops a signal from a protection line. Thus, cross-connection information stored in the stack is categories of adding a signal to a protection line, adding a signal to a working line and dropping a signal from a protection line, indicating a DCP connection.

4: Create a squelch table 80#i shown in FIG. 29 in accordance with an identified implementation of connection and the topology table 78#i.

Figure 28:
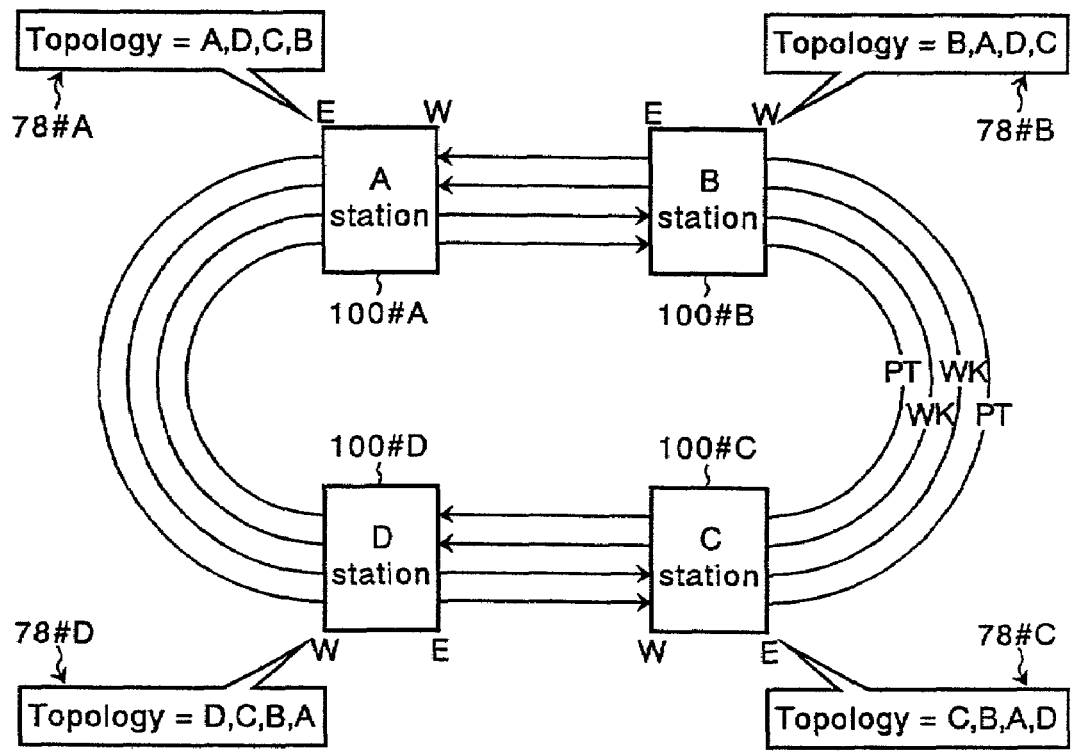
FIG. 28 is a diagram showing a topology table used in the BLSR switching control unit shown in FIG. 12.

FIG. 28 is a diagram showing the topology table 78#i used in the BLSR switching control unit 58#i shown in FIG. 12. As shown in FIG. 28, the topology table 78#i is a table showing an order of connection of NEs connected to form a ring in a direction to the east side starting with the node ID of the station including this table. For example, the topology table 78#A in the A station 100#A, contains node IDs A, D, C and B arranged in the order in which the node IDs are enumerated. A topology table 78#i is used typically for setting information in the squelch table 80#i and the RIP table 81#i and identifying the location of occurrence of a failure by conversion of a node ID of an NE into a modified node ID representing a distance from the station including the topology table 78#i to the NE.

Figure 29:
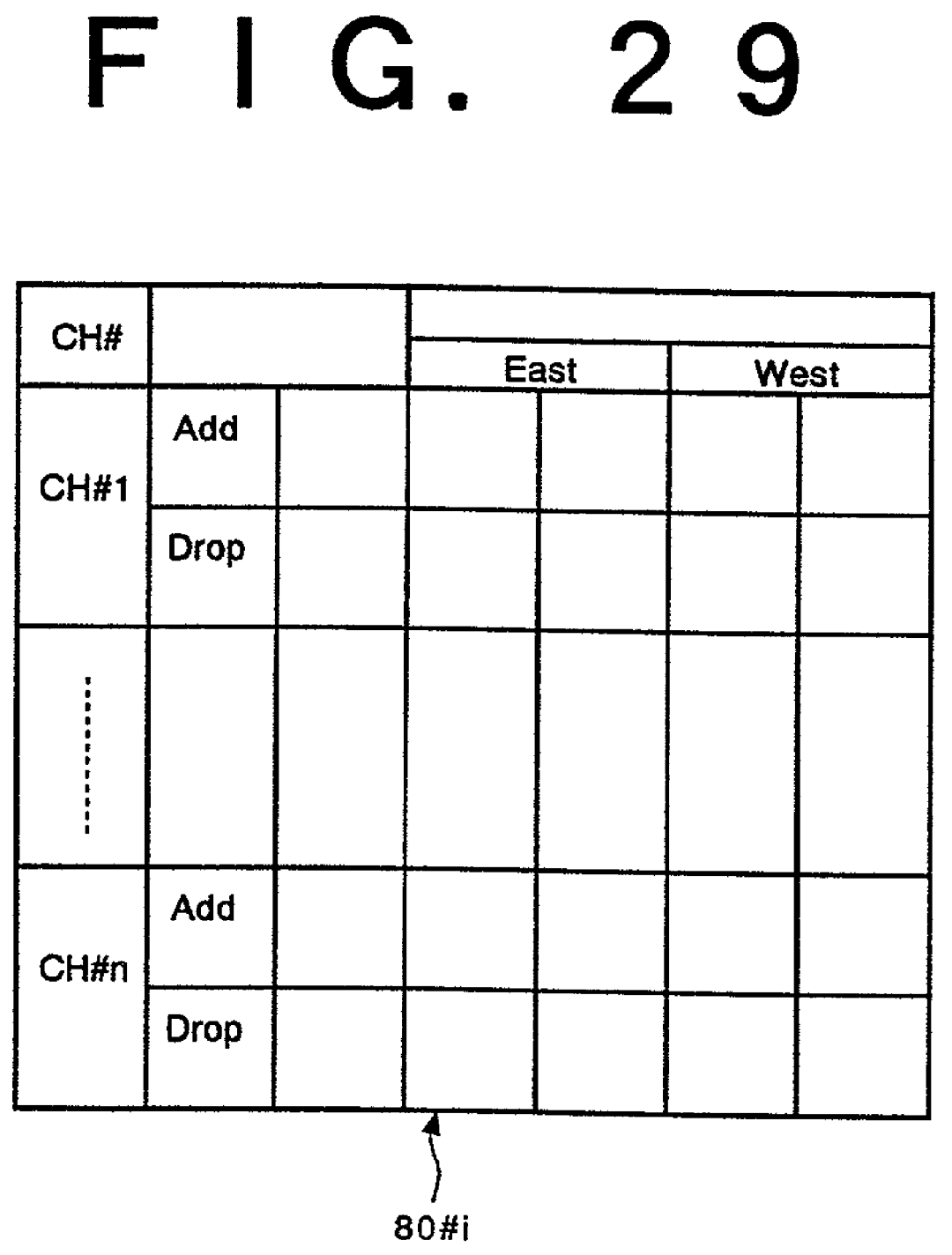

FIG. 29 is a diagram showing the configuration of the squelch table 80#i used in the BLSR switching control unit 58#i shown in FIG. 12. As shown in FIG. 29, information is stored in the squelch table 80#i for each channel. The information for each channel includes information with the channel serving as a channel adding a signal to a transmission line and information with the channel serving as a channel dropping a signal from a transmission line. The information with the channel serving as a channel adding a signal to a transmission line is information for the east direction and information for the west direction. Likewise, the information with the channel serving as a channel dropping a signal from a transmission line is information for the east direction and information for the west direction. The information for the east direction is a modified node ID of a source node ID and a modified node ID of a destination node ID. Similarly, the information for the west direction is a modified node ID of a source node ID and a modified node ID of a destination node ID. As described above, the modified node ID of an NE is a distance from the station including the squelch table 80#i to the NE. To put it concretely, the modified node ID of an NE is the number of nodes located along the transmission line in the east direction between the station including the squelch table 80#i and the NE with the station not counted. For example, the modified node ID of the station including the squelch table 80#i itself is 0 and the modified node ID of the adjacent station on the east side is 1. Modified node IDs are used because, by converting the node ID of a node involved in a transmission-line failure and the node IDs of nodes composing the ring network into modified node IDs, the location of occurrence of a failure can be identified with ease by carrying out logic processing.

Figure 30:
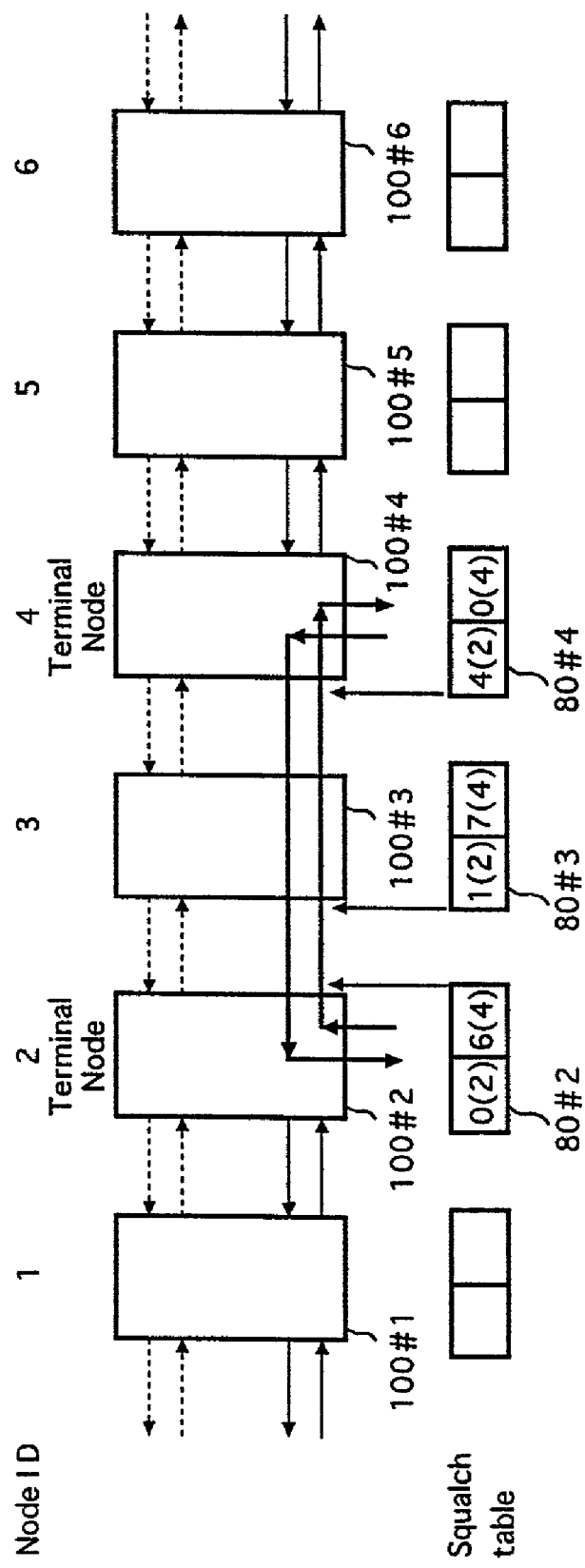
FIG. 30 is a diagram showing a typical squelch table for a normal/DTW connection.

FIG. 30 is a diagram showing a typical squelch table 80#i for a normal/DTW connection. Refer to the network shown on the upper part of FIG. 30. In channels along paths indicated by thick lines, signals are added and dropped between terminal nodes 100#2 and 100#4. In actuality, the ring network shown in FIG. 30 comprises 8 nodes. However, only 6 nodes 100#i where i=1 to 6 are shown in the figure and the remaining two nodes are omitted. In the figure, the left side is the east side while the right side is the west side. This assignment of the east and west sides also holds true of FIGS. 31 to 44. In FIG. 30, in a squelch table 80#2 on the west side of the terminal node 100#2, a modified node ID of 0 of the terminal node 100#2 and a modified node ID of 6 of the terminal node 100#4 are set. By the same token, a modified node ID of 1 of the terminal node 100#2 and a modified node ID of 7 of the terminal node 100#4 are set in a squelch table 80#3 on the east side of the node 100#3. Likewise, a modified node ID of 4 of the terminal node 100#2 and a modified node ID of 0 of the terminal node 100#4 are set and in a squelch table 80#4 on the east side of the terminal node 100#4. It should be noted that numbers enclosed in parentheses in the squelch tables 80#2, 80#3 and 80#4 shown in FIG. 30, that is, the numbers (2) and (4), are the original node IDs of the terminal node 100#2 and the terminal node 100#4 respectively.

Figure 31:
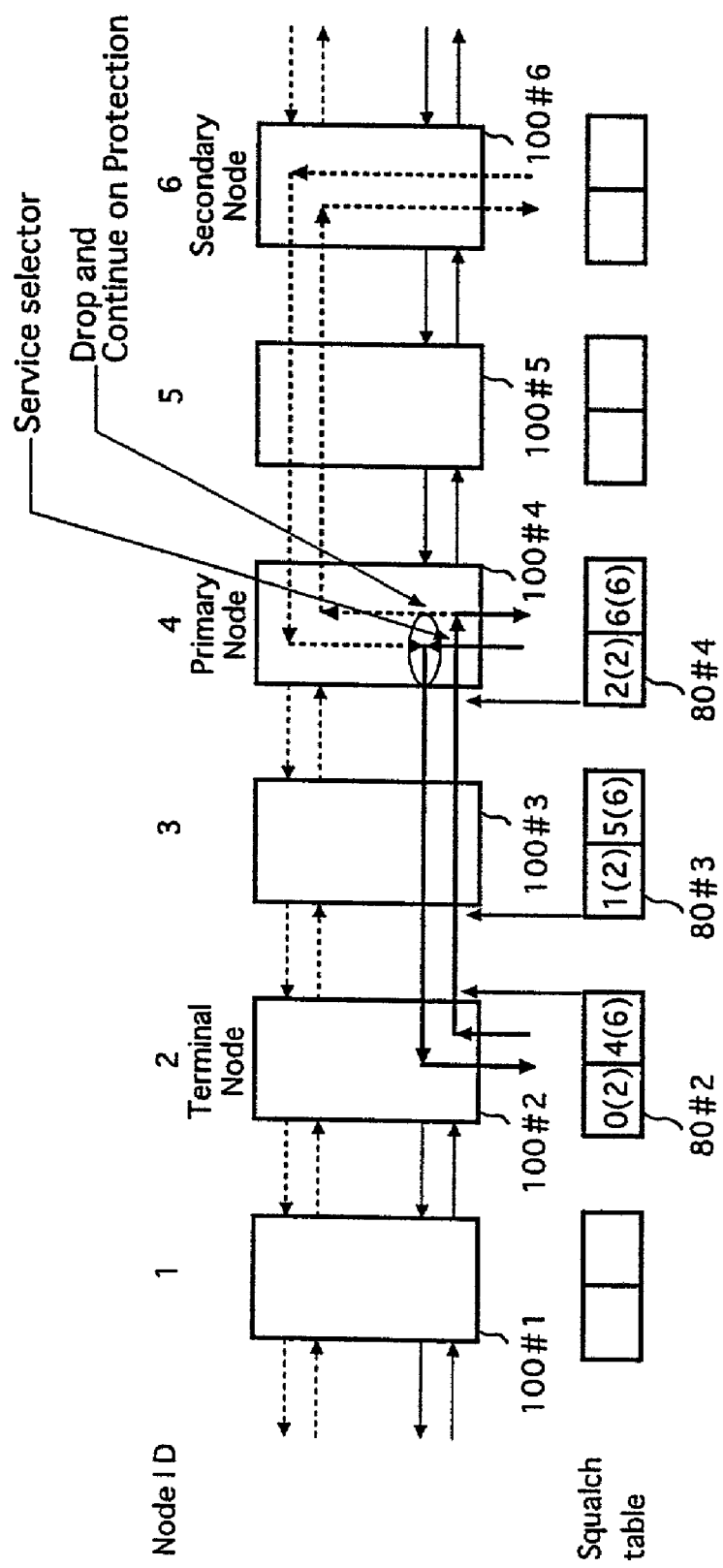
FIG. 31 is a diagram showing a typical squelch table for a DCP one-side-end connection.

FIG. 31 is a diagram showing a typical squelch table 80#i for a DCP one-side-end connection. In a network shown in FIG. 31, nodes 100#2, 100#3, 100#4, 100#5 and 100#6 serve as an east-end station, a through station, an intermediate station, a through station and a west-end station respectively. Information such as a cross-connect category is stored in the stack in the following order: information for the east-end station 100#2, information for the intermediate node 100#4 and information for the west-end station 100#6. Each channel is assigned to a path indicated by a thick solid line and a thick dashed line. The thick solid lines each represent a working line between the east-end station 100#2 and the intermediate node 100#4 whereas the thick dashed lines each represent a protection line between the intermediate node 100#4 and the west-end station 100#6. Thus, the working lines allocated to the channel pass through the east-end station 100#2, the through node 100#3 and the intermediate node 100#4. In a squelch table 80#2 on the west side of the east-end station 100#2, a squelch table 80#3 on the east side of the through node 100#3 and a squelch table 80#4 on the east side of the intermediate node 100#4, modified node IDs for a node ID of (2) of the primary node 100#2 and a node ID of (6) of the terminal node 100#4 are set.

Figure 32A:
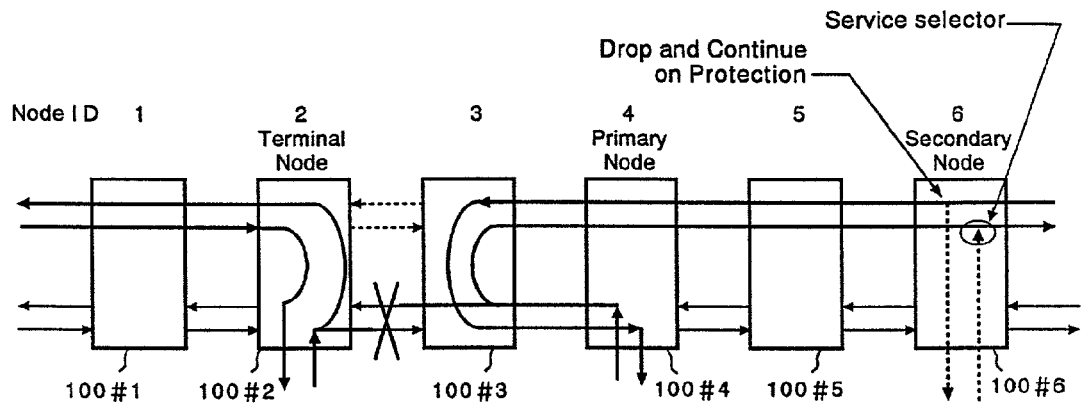
FIG. 32A is a diagram showing an event of a failure in a DCP one-side-end connection.
Figure 32B:
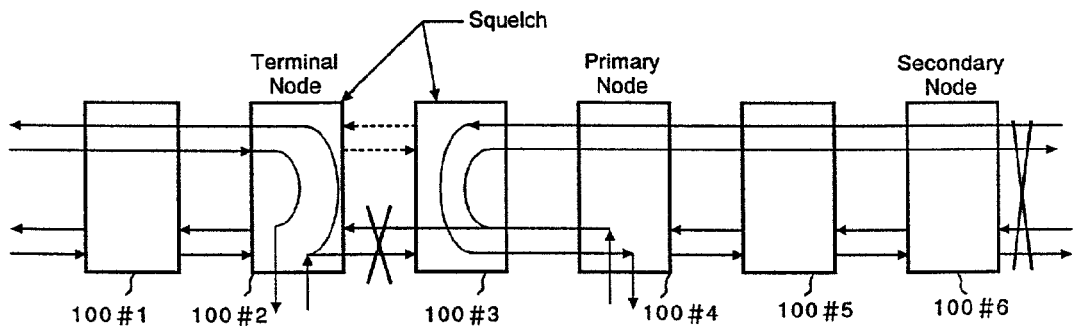
FIG. 32B is a diagram showing an event of a failure in a DCP one-side-end connection.
Figure 32C:
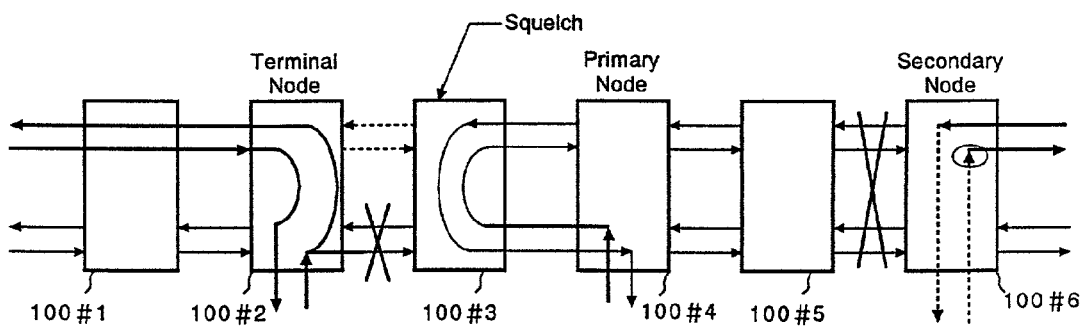
FIG. 32C is a diagram showing an event of a failure in a DCP one-side-end connection.

FIGS. 32A to 32C are each a diagram showing an event of a failure in a DCP one-side-end connection. To be more specific, FIG. 32A shows a case in which a transmission-line failure occurs on working lines between a terminal node 100#2 and a through node 100#3 so that communications through working lines between the terminal node 100#2 and a primary node 100#4 become impossible. In order to rescue the ring network from this failure, the terminal node 100#2 and the through node 100#3 each provide a bridge between the working lines and protection lines. In addition, a secondary node 100#6 switches transmission of signals from working lines to protection lines. As a result, a communication between the terminal node 100#2 and the primary node 100#4 becomes possible. Thus, a squelching operation is not necessary in this case. In addition, since modified node IDs of the terminal node 100#2 and the secondary node 100#6 are set in the squelch table 80#i and the terminal node 100#2 and the secondary node 100#6 are connected to each other, a squelching operation is not carried out.

FIG. 32B shows a case in which a transmission-line failure occurs on working lines between the terminal node 100#2 and the though node 100#3 and, in addition, a transmission-line failure also occurs on the transmission lines between the secondary node 100#6 and a node on the west side thereof. As a result, communications between the primary node 100#4 and the terminal node 100#2 as well as communications between the secondary node 100#6 and the terminal node 100#2 are disabled, making it impossible to rescue the ring network. Since modified node IDs of the secondary node 100#6 and the terminal node 100#2 are set in the squelch table 80#i, however, they are squelched.

FIG. 32C shows a case in which a transmission-line failure occurs on working lines between the terminal node 100#2 and the through node 100#3 and, in addition, a failure also occurs on the transmission lines between a through node 100#5 and the secondary node 100#6. As a result, communications between the primary node 100#4 and the terminal node 100#2 as well as communications between the secondary node 100#6 and the primary node 100#4 are disabled. In order to rescue the ring network from these failures, the terminal node 100#2 provides a bridge between the working lines and protection lines. In addition, the secondary node 100#6 switches transmission of signals from working lines to protection lines, dropping and adding signals from and to the protection lines. As a result, a communication between the terminal node 100#2 and the secondary node 100#6 becomes possible.

At that time, the connection between the primary node 100#4 and the terminal node 100#2 may have been cataloged in a squelch table. In this case, since the primary node 100#4 and the terminal node 100#2 cannot be connected to each other, a squelching operation is inevitably carried out. Since the connection between the secondary node 100#6 and the terminal node 100#2 is already cataloged in the squelch table 80#i and, in addition, the secondary node 100#6 and the terminal node 100#2 can be connected to each other, however, no squelching operation is carried out. Thus, in the case of a DCP one-side-end connection, cataloging of the modified node IDs of the secondary node 100#6 and the terminal node 100#2 in the squelch table 80#i is proper. That is to say, in the case of a DCP one-side-end connection, the node IDs of the east-end station and the west-end station are set in the squelch table 80#i.

Figure 33:
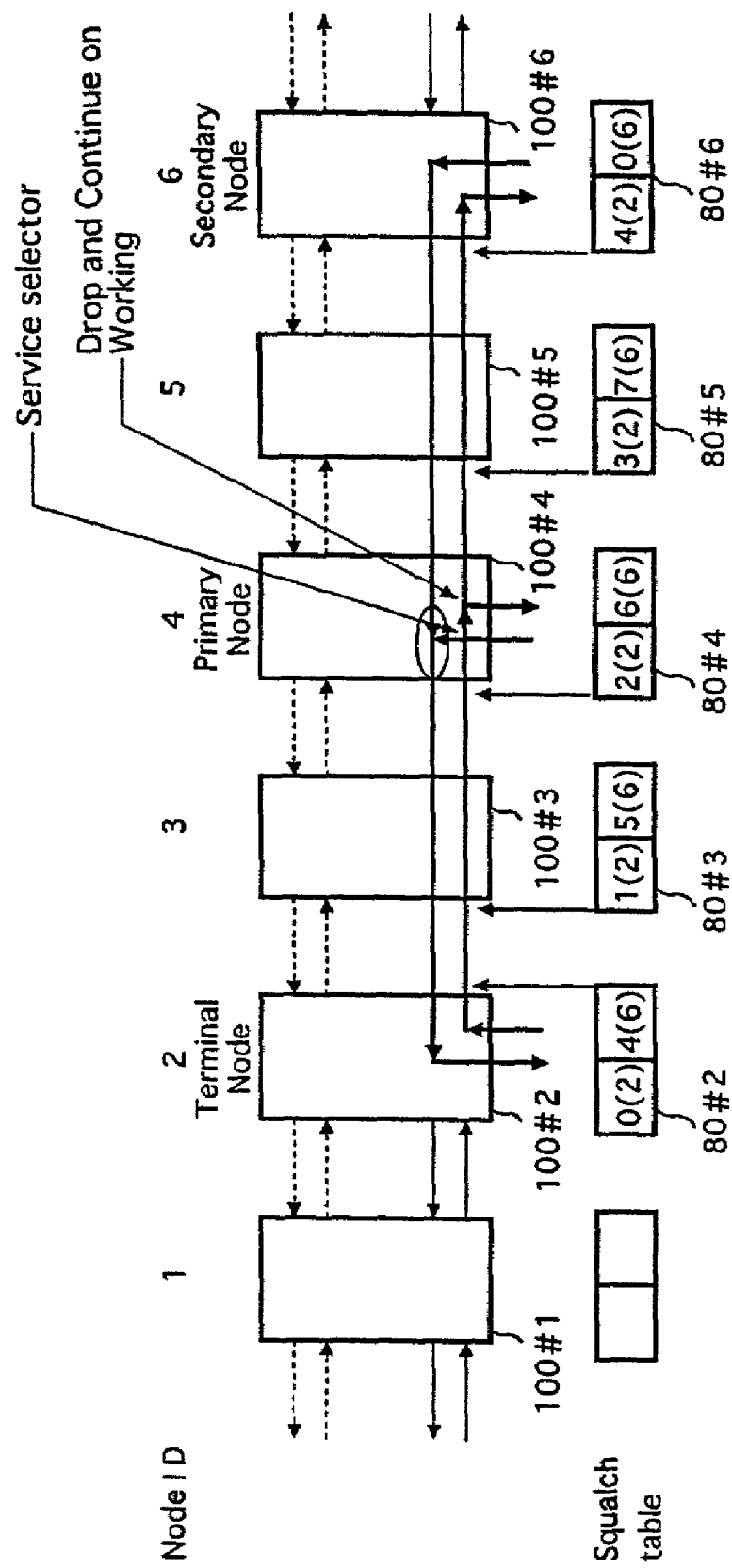
FIG. 33 is a diagram showing a typical squelch table for a DCW one-side-end connection.

FIG. 33 is a diagram showing a typical squelch table 80#i for a DCW one-side-end connection. In a network shown in FIG. 33, nodes 100#2, 100#3, 100#4, 100#5 and 100#6 serve as an east-end station, a through station, an intermediate station, a through station and a west-end station respectively. Cross-connect categories are stored in the stack in the following order: a category for the east-end station 100#2, a category for the intermediate node 100#4 and a category for the west-end station 100#6. Each channel is assigned to a path indicated by a thick solid line. The thick solid lines each represent a working line between the terminal nodes 100#2 and 100#6. Thus, working lines pass through the east-end station 100#2 to the west-end station 100#6. In each of a squelch table 80#2 on the west side of the east-end station 100#2, a squelch table 80#3 on the east side of the through node 100#3, a squelch table 80#4 on the east side of the intermediate node 100#4, a squelch table 80#5 on the east side of the through node 100#5 and a squelch table 80#6 on the east side of the west-end station 100#6, a modified node ID of the east-end station 100#2 and a modified node ID of the west-end station 100#6 are set for the same reasons as the DCP one-side-end connection.

Figure 34:
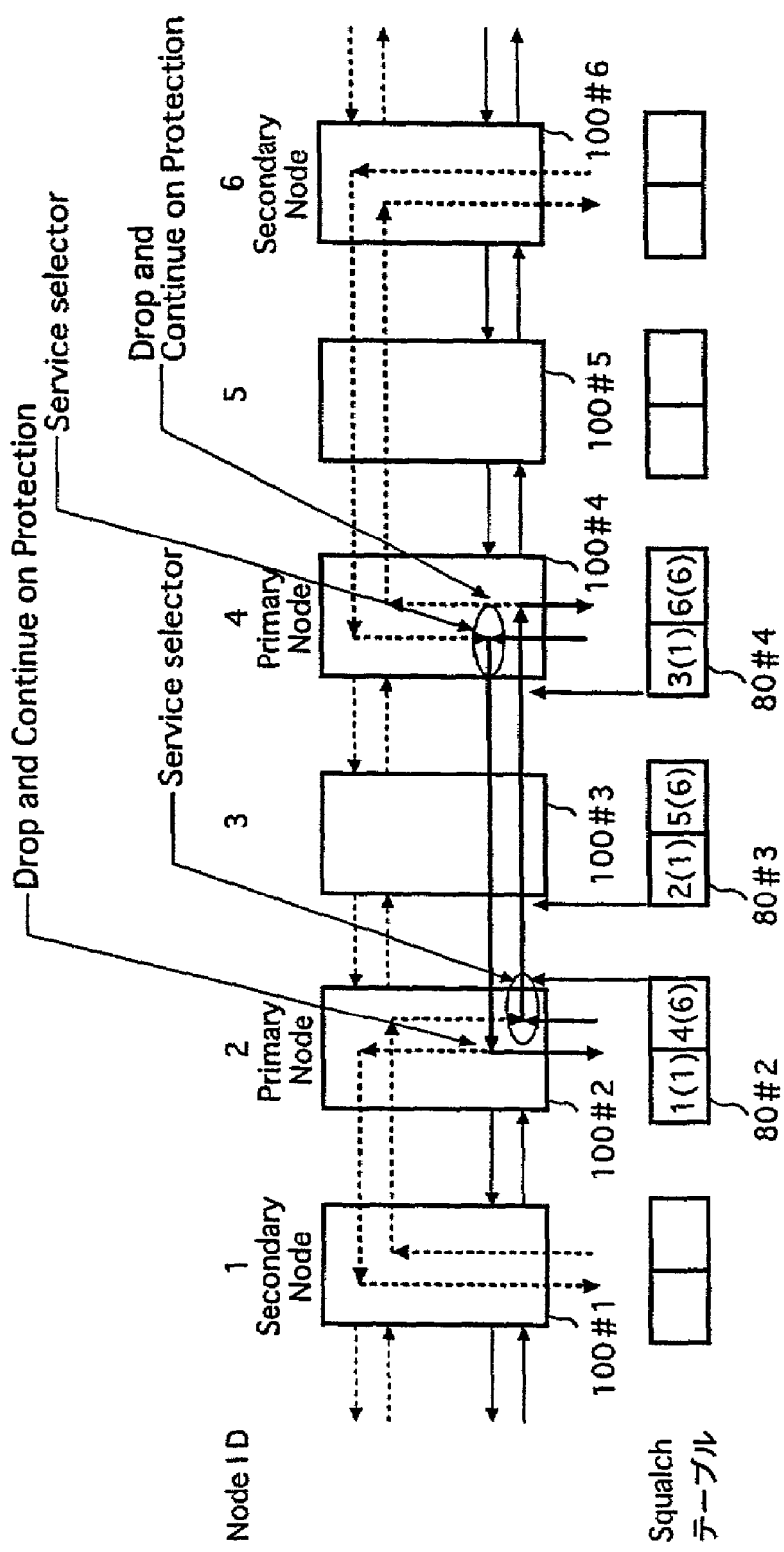
FIG. 34 is a diagram showing a typical squelch table for a DCP both-side-end connection.

FIG. 34 is a diagram showing a typical squelch table 80#i for a DCP both-side-end connection. In a network shown in FIG. 34, nodes 100#1, 100#2, 100#3, 100#4, 100#5 and 100#6 serve as an east-end station, an intermediate station, a through station, an intermediate station, a through station and a west-end station respectively. Cross-connect categories are stored in the stack in the following order: a category for the east-end station 100#1, a category for the intermediate node 100#2, a category for the intermediate node 100#4 and a category for the west-end station 100#6. Each channel is assigned to a path indicated by a thick solid line and a dashed line. Thus, working lines pass through the intermediate node 100#2, the through 100#3 and the intermediate station 100#4. In each of a squelch table 80#2 on the west side of the intermediate node 100#2, a squelch table 80#3 on the east side of the through node 100#3 and a squelch table 80#4 on the east side of the intermediate node 100#4, a modified node ID of the east-end station 100#1 and a modified node ID of the west-end station 100#6 are set for the following reason. As shown in FIG. 9, if the secondary nodes 30#23 and 30#27 can be connected to each other, the terminal nodes 30#12 and 30#38 can be connected to each other through protection lines in the ring network 31#2.

Figure 35:
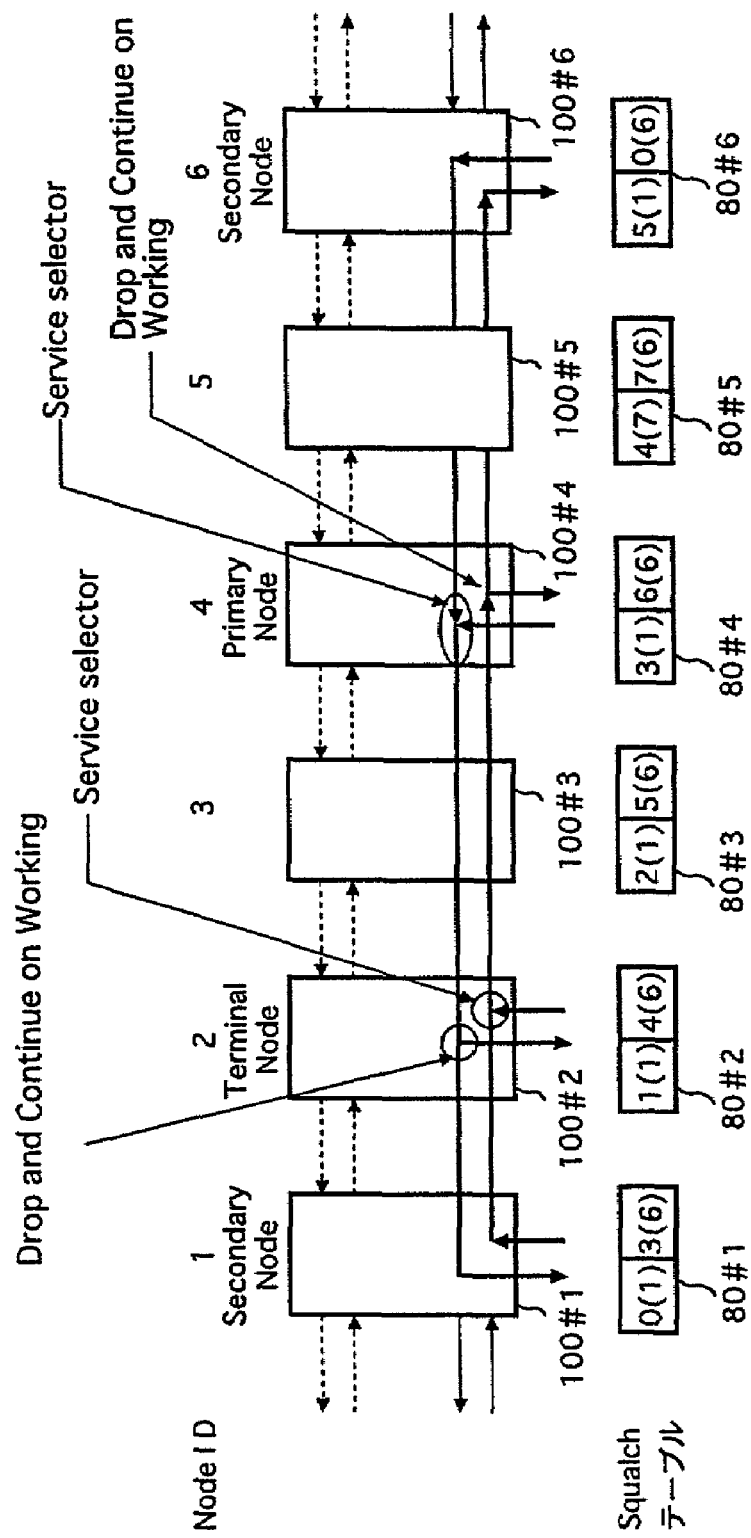
FIG. 35 is a diagram showing a typical squelch table for a DCW both-side-end connection.

FIG. 35 is a diagram showing a typical squelch table for a DCW both-side-end connection. In a network shown in FIG. 35, nodes 100#1, 100#2, 100#3, 100#4, 100#5 and 100#6 serve as an east-end station, an intermediate station, a through station, an intermediate station, a through station and a west-end station respectively. Each channel is assigned to a path indicated by a thick solid line. Thus, working lines pass through the east-end station 100#1 to the west-end station 100#6. In each of a squelch table 80#1 on the west side of the east-end station 100#1, a squelch table 80#2 on the east side of the intermediate node 100#2, a squelch table 80#3 on the east side of the through node 100#3 and a squelch table 80#4 on the east side of the intermediate node 100#4, a modified node ID of the secondary node 100#1 and a modified node ID of the secondary node 100#6 are set for the following reason. As shown in FIG. 10, if the secondary nodes 30#23 and 30#27 can be connected to each other, the terminal nodes 30#12 and 30#38 are capable of communicating with each other through protection lines in the ring network 31#2 as is the case with the DCP both-side-end connection.

Figure 36:
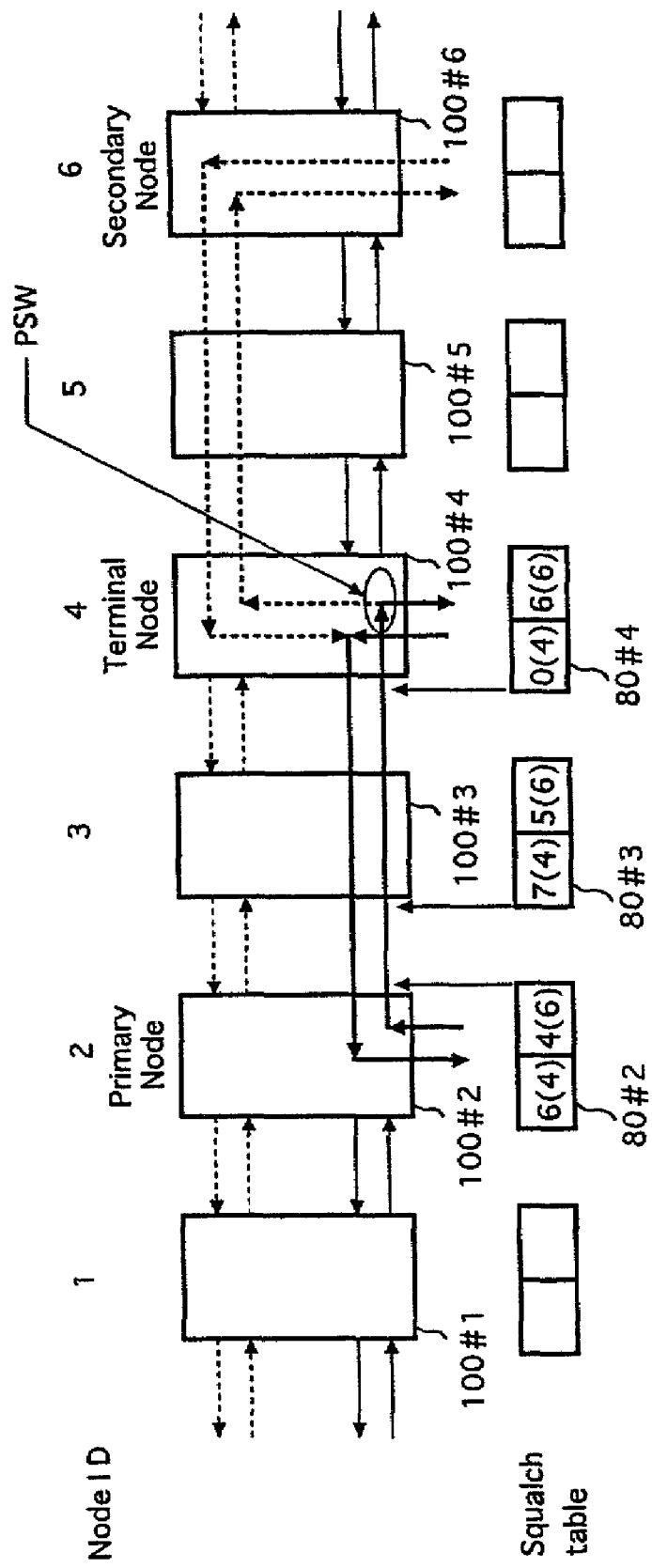
FIG. 36 is a diagram showing a typical squelch table for a DTP connection.

FIG. 36 is a diagram showing a typical squelch table 80#i for a DTP connection. In a network shown in FIG. 36, nodes 100#2, 100#3, 100#4, 100#5 and 100#6 serve as an east-end station, a through station, an intermediate station, a through station and a west-end station respectively. Each channel is assigned to a path indicated by a thick solid line and a dashed line. Thus, working lines pass through the east-end station 100#2, the through node 100#3 and the intermediate node 100#4. In each of a squelch table 80#2 on the west side of the east-end station 100#2, a squelch table 80#3 on the east side of the through node 100#3 and a squelch table 80#4 on the east side of the intermediate node 100#4, a modified node ID of the primary node 100#4 and a modified node ID of the secondary node 100#6 are set for the following reason.

Figure 37A:
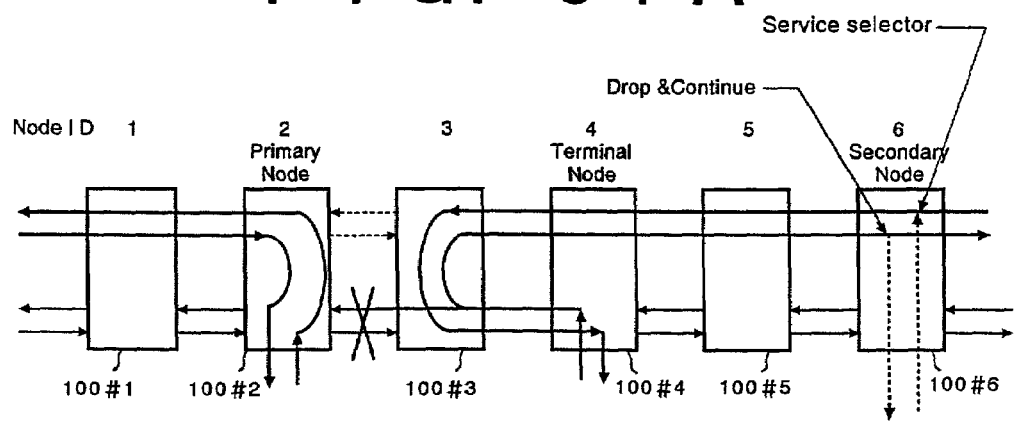
FIG. 37A is a diagram showing an event of a failure in a DTP connection.
Figure 37B:
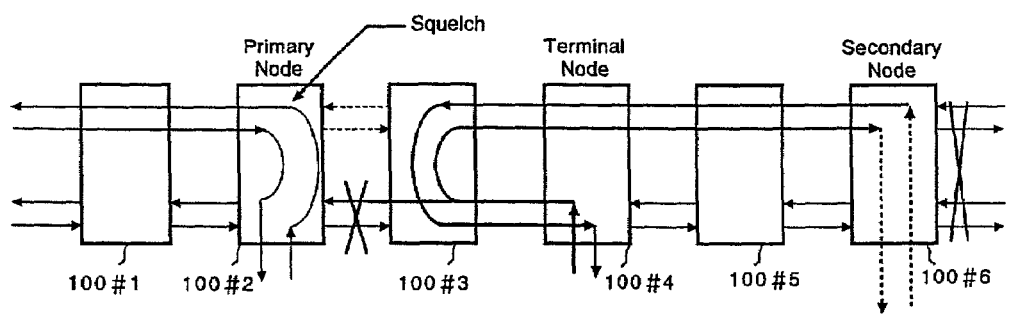
FIG. 37B is a diagram showing an event of a failure in a DTP connection.
Figure 37C:
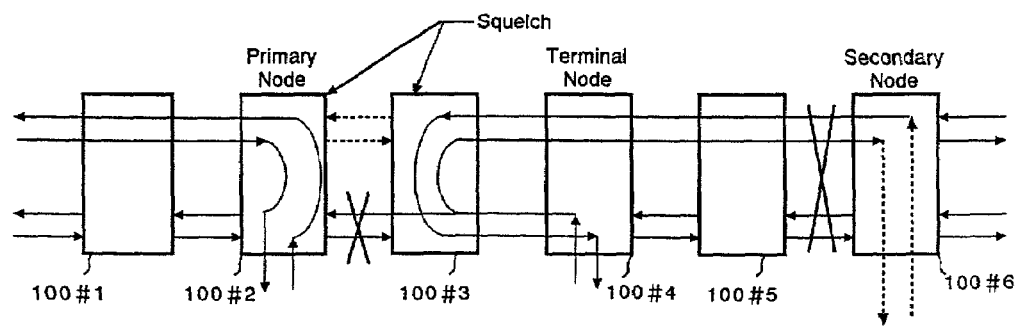
FIG. 37C is a diagram showing an event of a failure in a DTP connection.

FIGS. 37A to 37C are each a diagram showing an event of a failure in a DTP connection. To be more specific, FIG. 37A shows a case in which a transmission-line failure occurs on working lines between a primary node 100#2 and a through node 100#3 so that the primary node 100#2 and a terminal node 100#4 are not capable of communicating with each other through the working lines. In order to rescue the ring network from the failure, the same switching operations as that for the failure shown in FIG. 32A are carried out. As a result, a communication between the primary node 100#2 and the terminal node 100#4 becomes possible. Thus, a squelching operation is not necessary in this case. In addition, since modified node IDs of the terminal node 100#4 and the secondary 100#6 are set in the squelch table 80#i and the terminal node 100#4 and the secondary node 100#6 are connected to each other, a squelching operation is not carried out.

FIG. 37B shows a case in which a transmission-line failure occurs on working lines between the primary node 100#2 and the through node 100#3 and, in addition, a failure also occurs on the transmission lines between the secondary node 100#6 and a node on the west side thereof. As a result, communications between the node 100#i, where i=4 and 6, and the primary node 100#2 are disabled.

In order to rescue the ring network from the failures, the through node 100#3 provides a bridge between work lines and protection lines. In addition, the terminal node 100#4 passes through a signal to or from a protection line whereas the secondary node 100#6 adds a signal to a protection line or drops a signal from a protection line. As a result, communications between the terminal node 100#4 and the secondary node 100#6 become possible. At that time, the connection between the terminal node 100#4 and the primary node 100#2 may have been cataloged in a squelch table. In this case, since the terminal node 100#4 and the primary node 100#2 cannot be connected to each other, a squelching operation is inevitably required. In addition, since modified node IDs of the secondary node 100#6 and the primary node 100#2 are set in the squelch table 80#i, however, a squelching operation is inevitably carried out. Since the connection between the secondary node 100#6 and the terminal node 100#4 is already cataloged in the squelch table 80#i and, in addition, the secondary node 100#6 and the terminal node 100#4 can be connected to each other, however, no squelching operation is carried out.

FIG. 37C shows a case in which a transmission-line failure occurs on working lines between the primary node 100#2 and the through node 100#3 and, in addition, a failure also occurs on the transmission lines between a node 100#5 and the secondary node 100#6. As a result, communications between the terminal node 100#4 and the primary node 100#2 as well as communications between the secondary node 100#6 and the terminal node 100#4 are disabled, making it impossible to rescue the ring network from the failures.

At that time, since the modified IDs of the terminal node 100#4 and the secondary node 100#6 have been cataloged in a squelch table and, in addition, the terminal node 100#4 and the secondary node 100#6 cannot be connected to each other, a squelching operation is inevitably carried out. Thus, since the modified node IDs according to the implementation of connection are set in the squelch table 80#i as such, a proper switching operation can be carried out and no squelching operation is carried out in case the ring network can be rescued from failures.

5: Create a RIP table 81#i based on a classified implementation of connection and the topology table 78#i.

Figure 38:
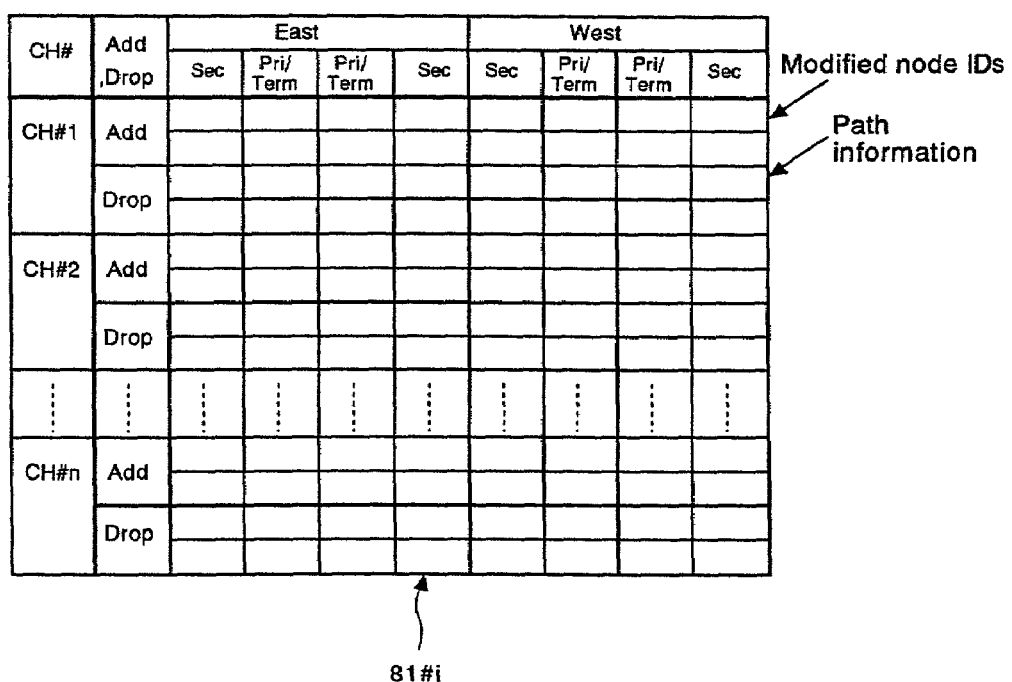
FIG. 38 is a diagram showing a RIP table used in the BLSR switching control unit shown in FIG. 12.

FIG. 38 is a diagram showing a RIP table 81#i used in the BLSR switching control unit 58#i shown in FIG. 12. As shown in FIG. 38, information is stored in the RIP table 81#i for each channel. The information for each channel includes information with the channel serving as a channel adding a signal to a transmission line and information with the channel serving as a channel dropping a signal from a transmission line. The information with the channel serving as a channel adding a signal to a transmission line is information for the east direction and information for the west direction. Likewise, the information with the channel serving as a channel dropping a signal from a transmission line is information for the east direction and information for the west direction. The information for the east direction is modified node IDs and pieces of path information. Similarly, the information for the west direction is modified node IDs and pieces of path information. Path information is information for identifying an implementation of connection such as a DCP, DCW or DTW connection. For every channel, a RIP table 81#i is created on the east side of each node, which adds and/or drops a signal to and/or from a transmission line. By the same token, for every channel, a RIP table 81#i is created on the west side of each node, which adds and/or drops a signal to and/or from a transmission line. To put it in detail, the modified node IDs and pieces of path information in the information for the east direction are stored in 4 columns, which are assigned to a secondary node, a primary node/a terminal node, a primary node/a terminal node and a secondary node respectively. By the same token, the modified node IDs and pieces of path information in the information for the west direction are stored in 4 columns, which are assigned to a secondary node, a primary node/a terminal node, a primary node/a terminal node and a secondary node respectively. The 4 columns are arranged from the left to the right in the order in which the nodes are arranged from the east side to the west side. That is to say, the 4 columns are arranged from the left to the right in the order in which pieces of cross-connect information are stored in a stack. It should be noted that the 4 columns may not necessarily all be used. In other words, the usage of the columns is determined by the implementation of connection. In the case of the both-side-end DCP connection and the both-side-end DCW connection, for example, all the 4 columns are used whereas, in the case of the one-side-end DCP connection and the one-side-end DCW connection, only 3 columns are used. In the case of the normal connection and the DTW connection, on the other hand, only 2 columns are used. Unused columns are each treated as an empty column showing a special value for indicating that no data is set in the column. As will be indicated later, the special value is represented typically by a hyphen '-'.

As path information, the symbol W denoting a working line, the symbol P denoting a protection line or the special value for indicating that no data is set is described in the column of the secondary node, and the symbol DCx (representing DCP/DCW), the symbol DT or the special value is set in the column of the primary node or the terminal node. In the case of the DCP both-side-end connection, for example, the 4 columns contain the following 4 pieces of path information: P, DCx, DCx and P respectively. In the case of the DCP both-side-end connection, on the other hand, the 4 columns contain the following 4 pieces of path information: the special value, the special value, DCx and W respectively. In this way, the implementation of connection can be identified from the pieces of path information. It should be noted that, in the case of an implementation of connection with a DCx broadcasting type, no information on broadcasting nodes is set in the RIP table 81#i.

Figure 39:
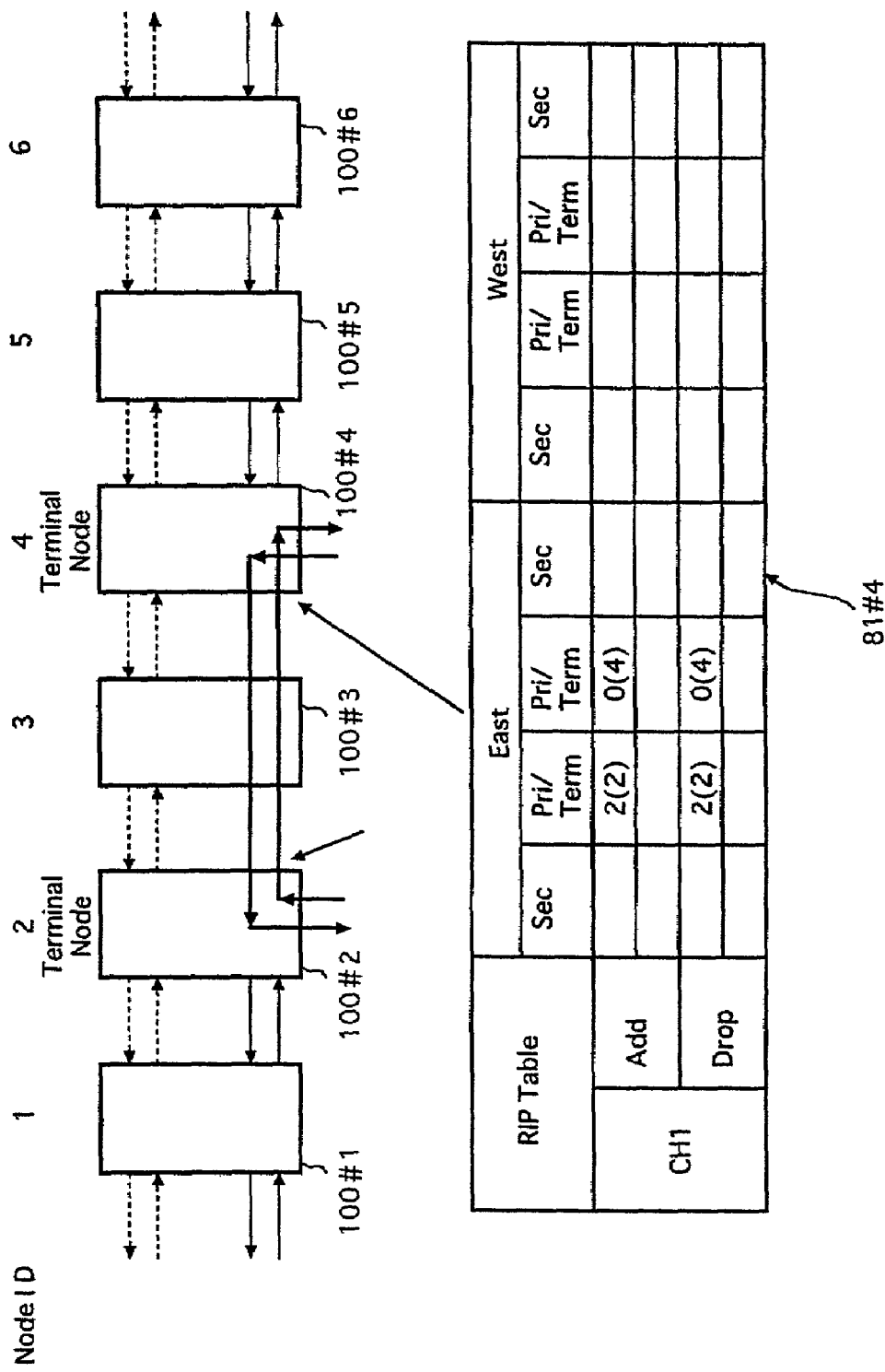
FIG. 39 is a diagram showing a typical RIP table for a normal/DTW connection.

FIG. 39 is a diagram showing a typical RIP table 81#i for a normal/DTW connection. The implementation of connection is the same as that shown in FIG. 30. As shown in FIG. 39, for channel CH1 indicated by a thick line, RIP tables 81#2 and 81#4 are set on the west side of a node 100#2 and the east side of a node 100#4 respectively. In the case of channel CH1, for example, the data of the east side in the RIP table 81#4 includes modified node IDs of (a special value, 2 (2), 0 (4) and a special value) as well as pieces of path information of (a special value, a special value, a special value and a special value). The numbers enclosed in parentheses are each a node ID.

Figure 40:
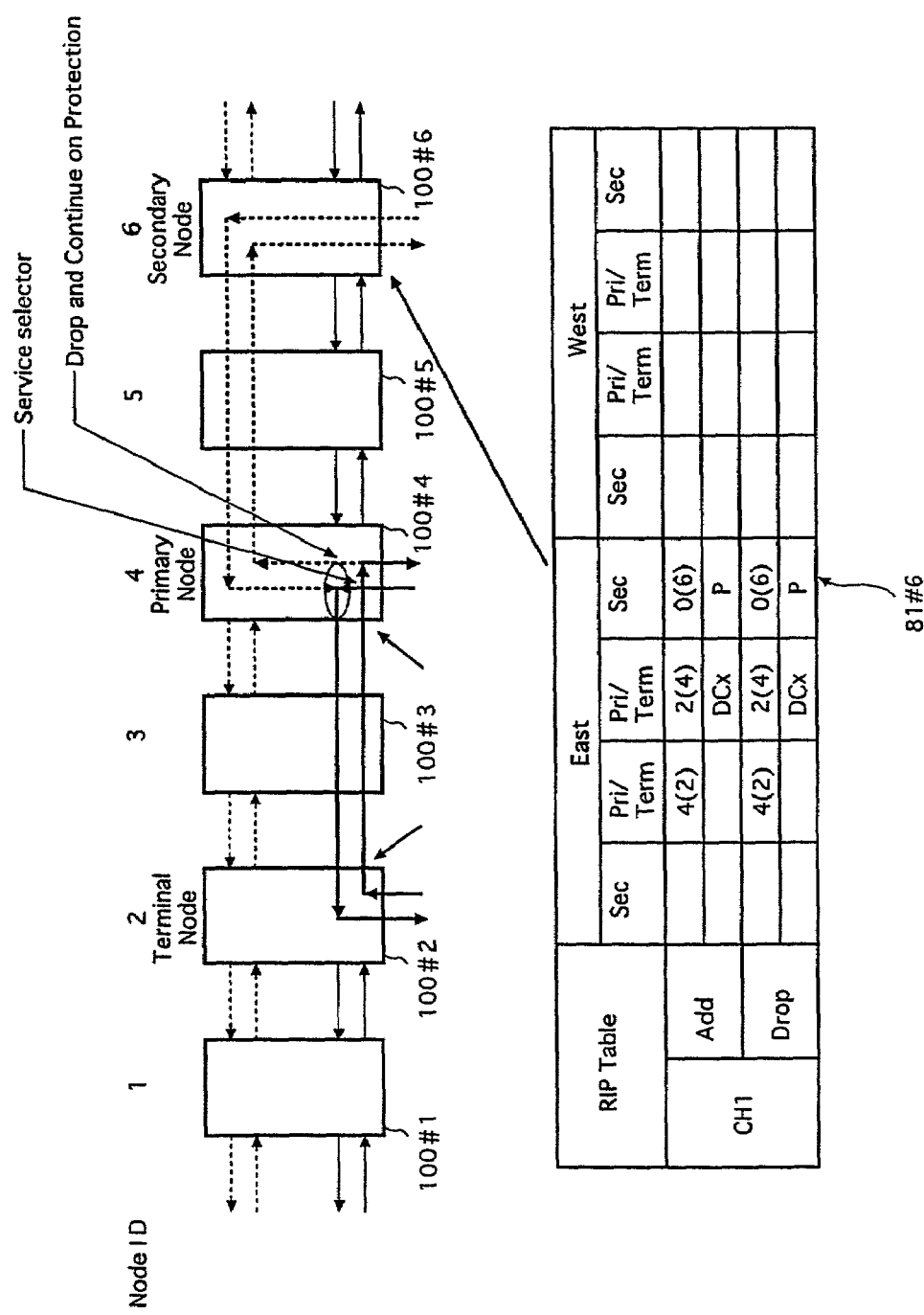
FIG. 40 is a diagram showing a typical RIP table for a DCP one-side-end connection.

FIG. 40 is a diagram showing a typical RIP table 81#i for a DCP one-side-end connection. The implementation of connection is the same as that shown in FIG. 31. As shown in FIG. 40, for channel CH1 indicated by a thick line and a dashed line, RIP tables 81#2 and 81#4 are set on the west side of a node 100#2 and the east side of a node 100#4 respectively. In the case of channel CH1, for example, the data of the east side in the RIP table 81#6 includes modified node IDs of (a special value, 4 (2), 2 (4) and 0 (6)) as well as pieces of path information of (a special value, a special value, DCx and P).

Figure 41:
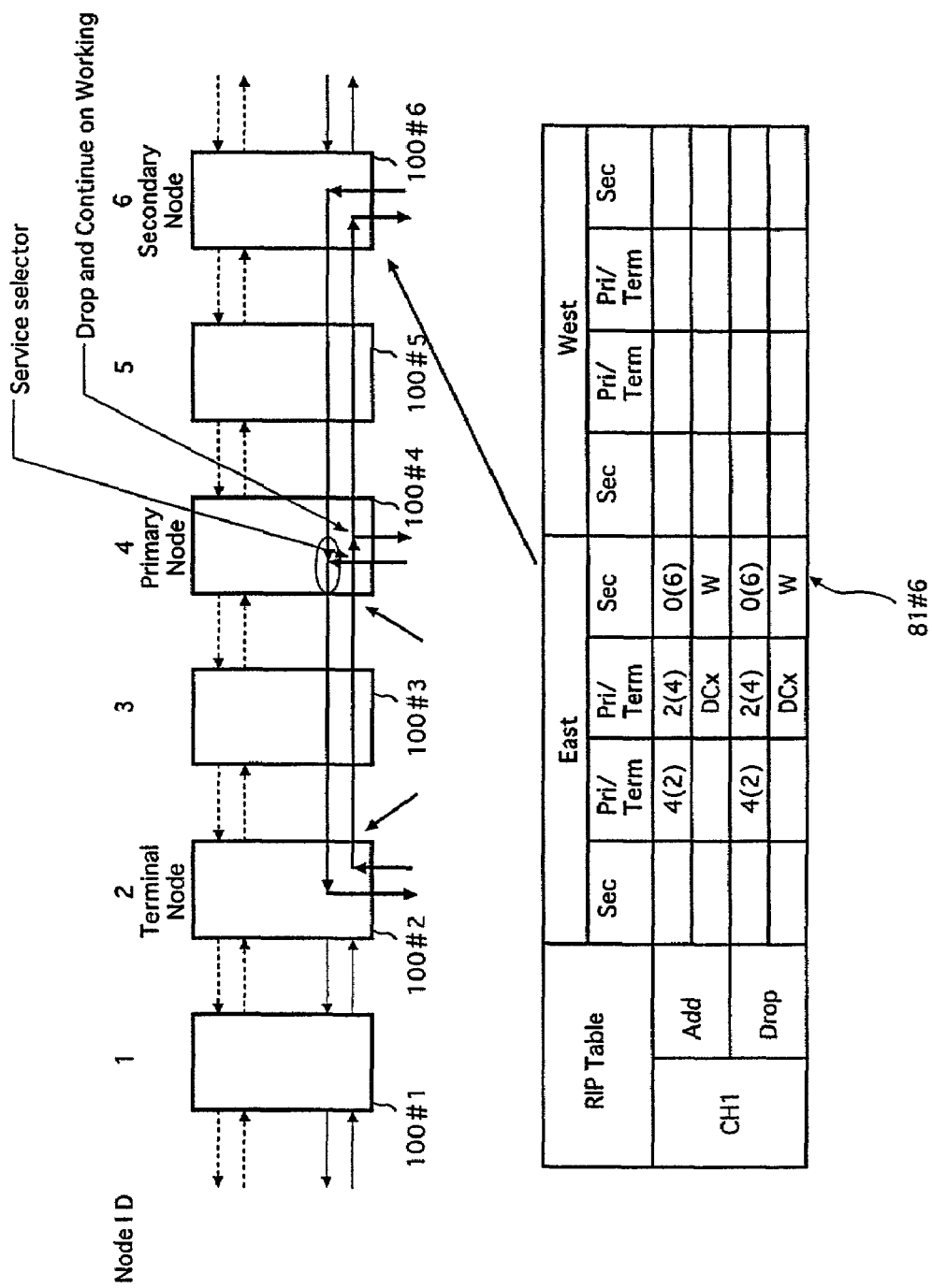
FIG. 41 is a diagram showing a typical RIP table for a DCW one-side-end connection.

FIG. 41 is a diagram showing a typical RIP table 81# I for a DCW one-side-end connection. The implementation of connection is the same as that shown in FIG. 33. As shown in FIG. 41, for channel CH1 indicated by a thick line, RIP tables 81#2, 81#4 and 81#6 are set on the west side of a node 100#2, the east side of a node 100#4 and the east side of a node 100#6 respectively. In the case of channel CH1, for example, the data of the east side in the RIP table 81#6 includes modified node IDs of (a special value, 4 (2), 2 (4)

and 0 (6)) as well as pieces of path information of (a special value, a special value, DCx and W).

Figure 42:
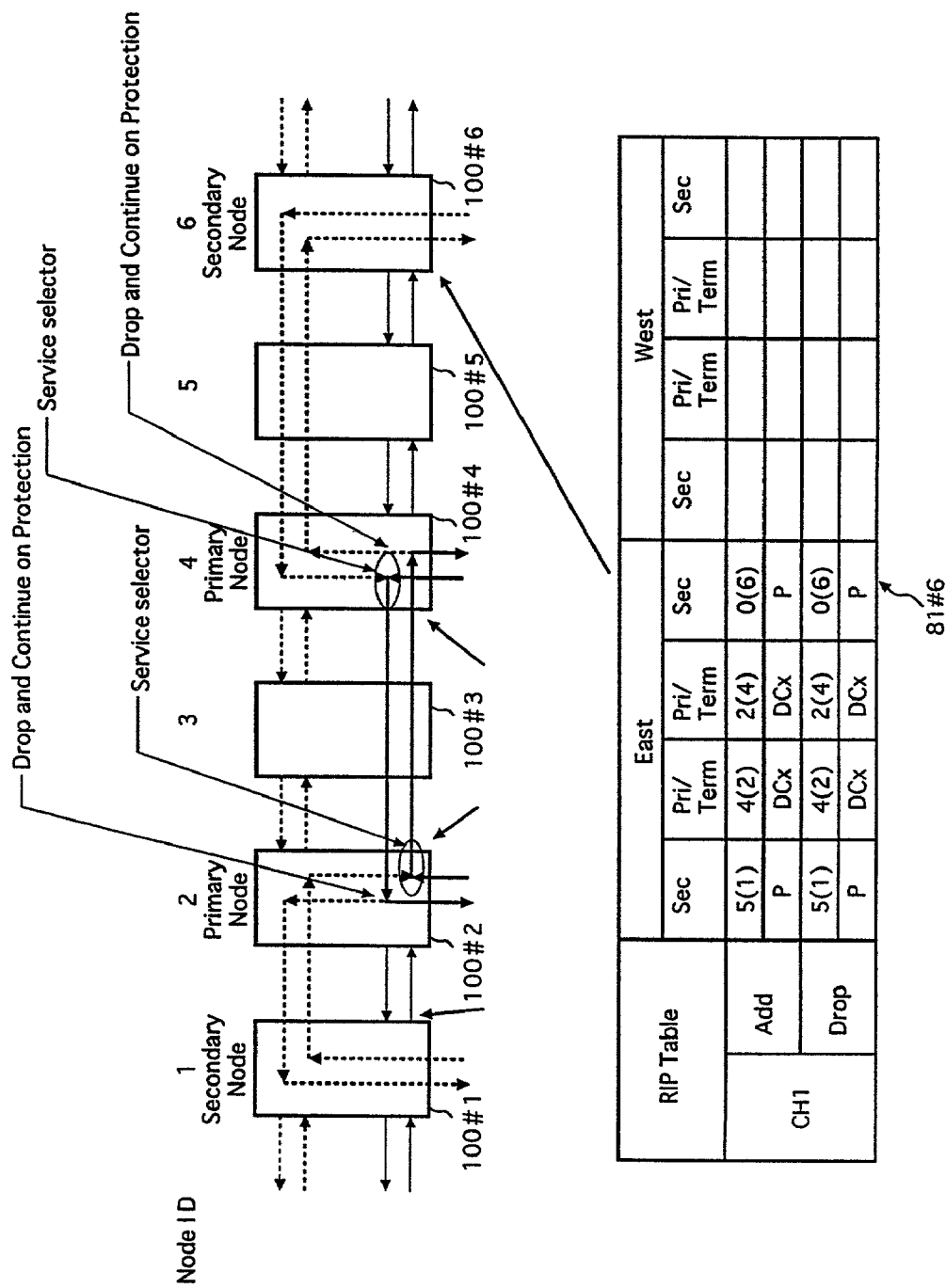
FIG. 42 is a diagram showing a typical RIP table for a DCP both-side-end connection.

FIG. 42 is a diagram showing a typical RIP table 81#i for a DCP both-side-end connection. The implementation of connection is the same as that shown in FIG. 34. As shown in FIG. 42, for channel CH1 indicated by a thick line and a dashed line, RIP tables 81#1, 81#2, 81#4 and 81#6 are set on the west side of a node 100#1, the west side of a node 100#2, the east side of a node 100#4 and the east side of a node 100#6 respectively. In the case of channel CH1, for example, the data of the east side in the RIP table 81#6 includes modified node IDs of (5 (1), 4 (2), 2 (4) and 0 (6)) as well as pieces of path information of (P, DCx, DCx and P).

Figure 43:
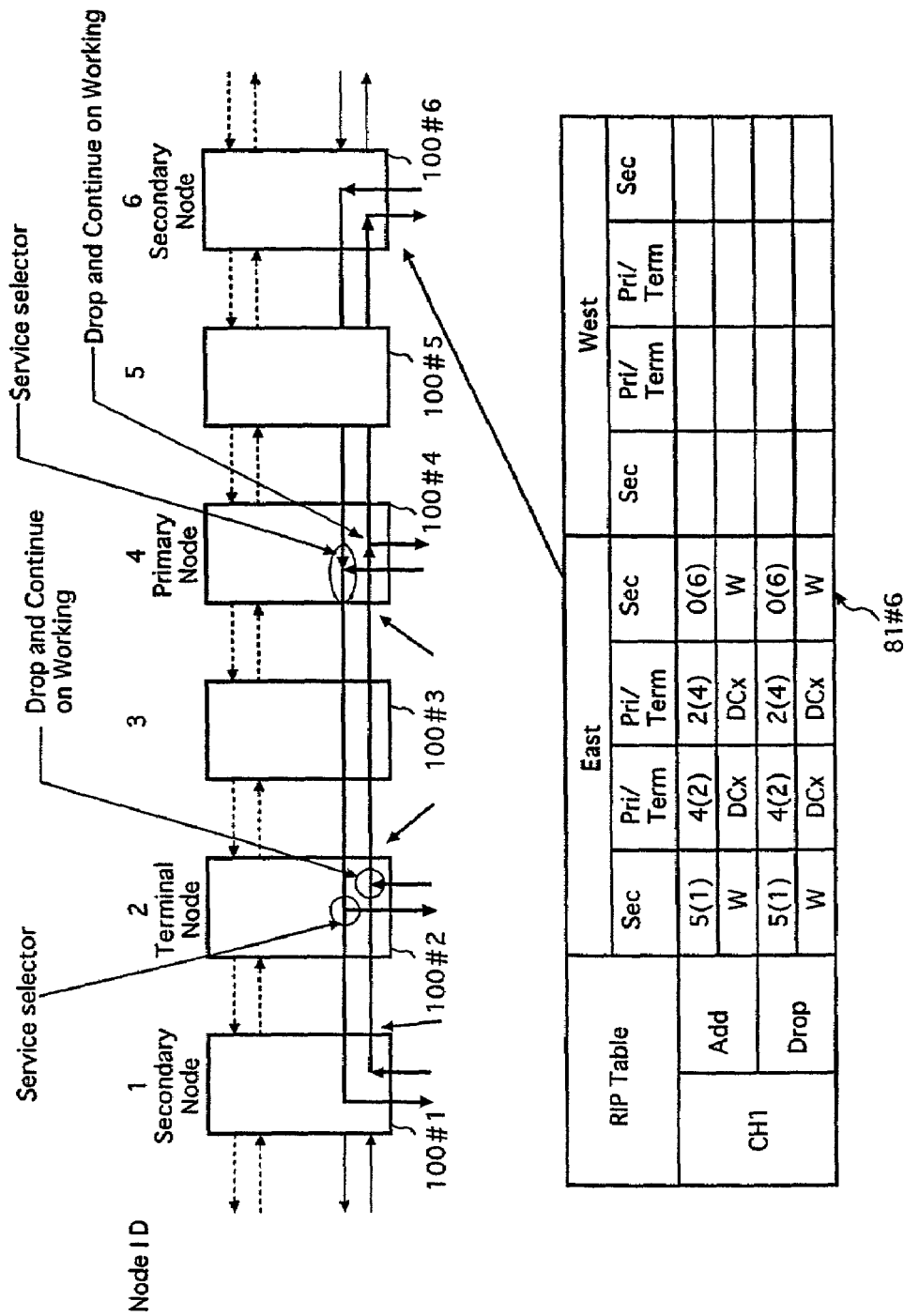
FIG. 43 is a diagram showing a typical RIP table for a DCW both-side-end connection.

FIG. 43 is a diagram showing a typical RIP table 81#i for a DCW both-side-end connection. The implementation of connection is the same as that shown in FIG. 35. As shown in FIG. 43, for channel CH1 indicated by a thick line, RIP tables 81#1, 81#2, 81#4 and 81#6 are set on the west side of a node 100#1, the west side of a node 100#2, the east side of a node 100#4 and the east side of a node 100#6 respectively. In the case of channel CH1, for example, the data of the east side in the RIP table 81#6 includes modified node IDs of (5 (1), 4 (2), 2 (4) and 0 (6)) as well as pieces of path information of (W, DCx, DCx and W).

Figure 44:
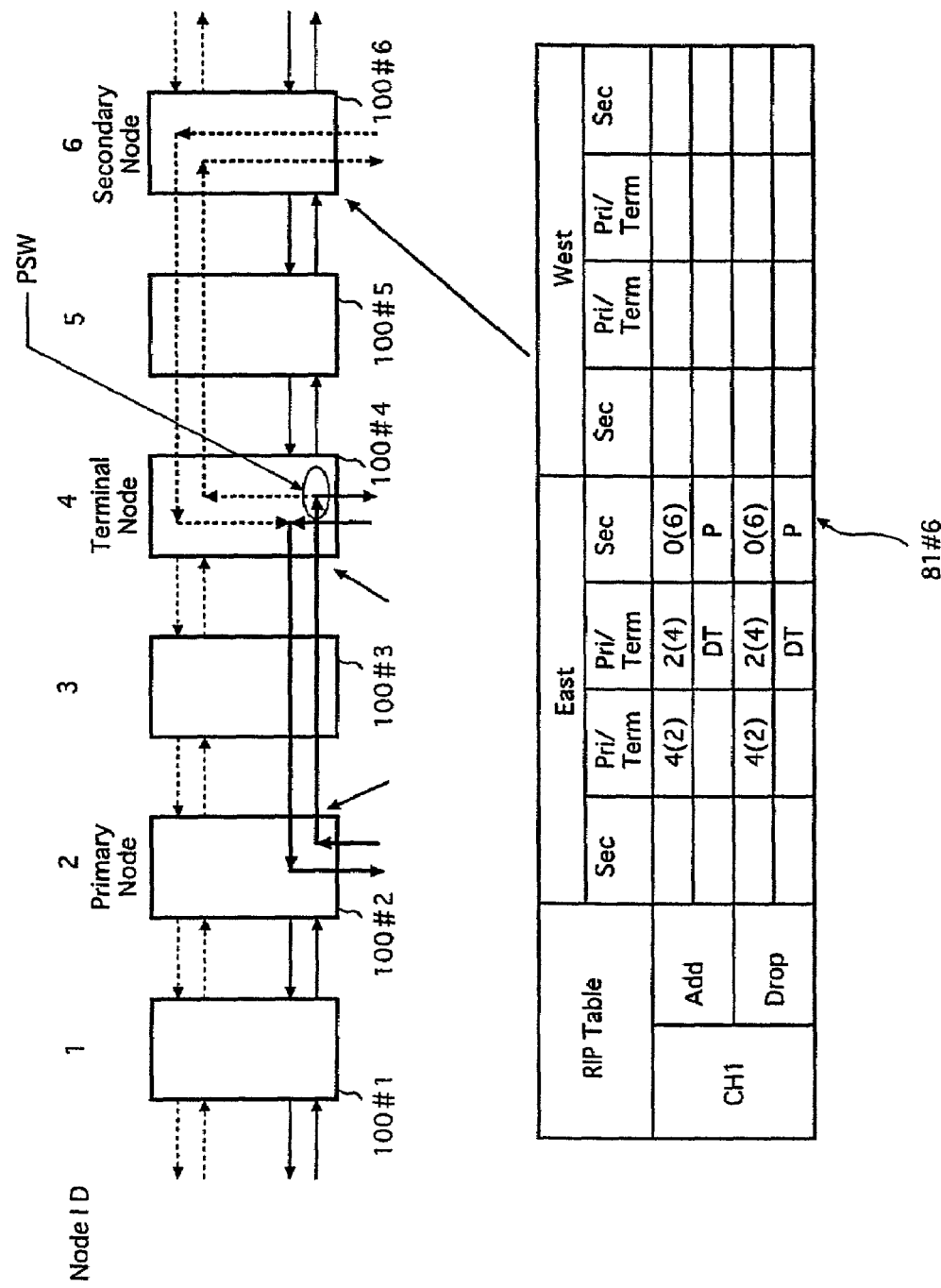
FIG. 44 is a diagram showing a typical RIP table for a DTP connection.

FIG. 44 is a diagram showing a typical RIP table 81#i for a DTP connection. The implementation of connection is the same as that shown in FIG. 36. As shown in FIG. 44, for channel CH1 indicated by a thick line and a dashed line, RIP tables 81#2, 81#4 and 81#6 are set on the west side of a node 100#2, the east side of a node 100#4 and the east side of a node 100#6 respectively. In the case of channel CH1, for example, the data of the east side in the RIP table 81#6 includes modified node IDS of (a special value, 4 (2), 2 (4) and 0 (6)) as well as pieces of path information of (a special value, a special value, DT and P).

The failure-detecting unit 82#i employed in the BLSR switching control unit 58#i shown in FIG. 12 senses abnormalities such as a signal interruption and a signal-level deterioration in order to detect a failure on a transmission line between the station employing this failure-detecting unit and an adjacent node, outputting information on the failure to the failure-reporting unit 84#i. The failure-reporting unit 84#i reports the information on the failure to the communication unit 74#i and the failure-occurrence-location-identifying unit 86#i. The information on a failure includes information on whether a transmission line generating a failure propagates a signal in the east or west direction.

The failure-occurrence-location-identifying unit 86#i modifies a node ID included in information on a failure received from the failure-reporting unit 84#i or the communication unit 74#i. The modified node ID is compared with each modified node ID cataloged in the squelch table 80#i and the RIP table 81#i to form a True/False judgment for each cataloged modified node ID. The location of occurrence of a failure is determined from the result of the judgment as will be described later.

FIG. 45 is a diagram showing a definition of a line. In the definition shown in FIG. 45, if a squelch table 80#i or a RIP table 81#i exists on the west side as shown by a white circle in the upper drawing, the line in the east direction is represented by the symbol N and the line in the west direction is represented by the symbol R. If a squelch table 80#i or a RIP table 81#i exists on the east side as shown by a white circle in the lower drawing, on the other hand, the line in the west direction is represented by the symbol N and the line in the east direction is represented by the symbol R.

Figure 46:
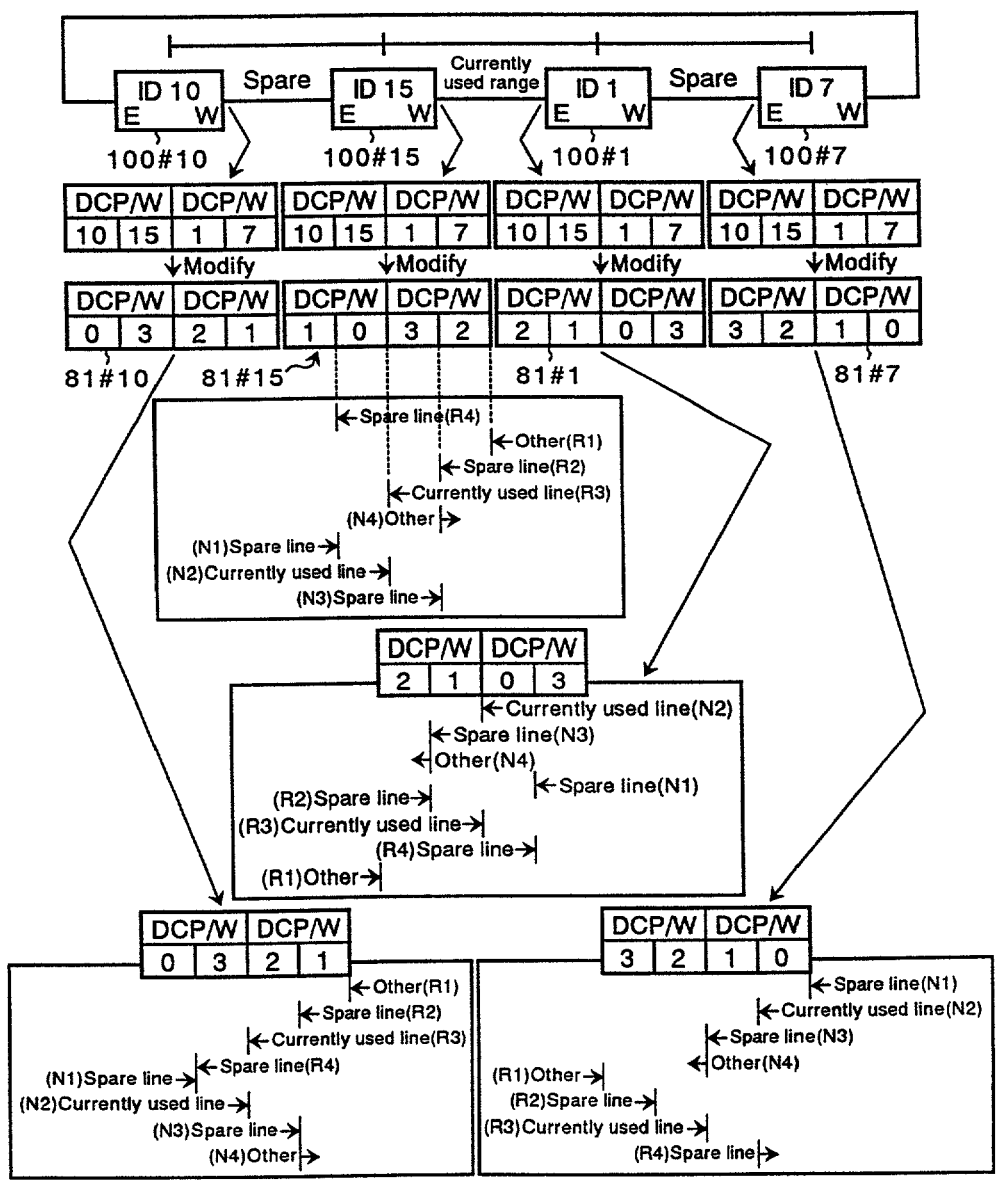
FIG. 46 is a diagram showing a definition of a line range.

FIG. 46 is a diagram showing a typical definition of a line range. FIG. 46 shows a definition for DCP/DCW both-side-end connections. Nodes 100#10 and 100#7 are each a secondary node whereas nodes 100#15 and 100#1 are primary/terminal nodes. A transmission line between the nodes 100#15 and 100#1 is in a currently used range (or a working line). A transmission line between the nodes 100#15 and 100#10 is a spare (or protection) line. Likewise, a transmission line between the nodes 100#7 and 100#1 is also a spare (or protection) line. A transmission line between the nodes 100#10 and 100#7 is another line. As shown in FIG. 46, for a channel assigned to the currently used range, RIP tables 81#10, 81#15, 81#1 and 81#7 exist on the west side of the node 100#10, the west side of the node 100#15, the east side of the node 100#7 and the east side of the node 100#1 respectively. For example, on the west side of the node 100#15, symbols R1, R2, R3 and R4 indicate that a signal propagates from the west direction to the east side of the node 100#7, the east side of the node 100#1, the east side of the node 100#15 and the east side of the node 100#10 respectively. On the other hand, symbols N1, N2, N3 and N4 indicate that a signal propagates from the east direction to the west side of the node 100#10, the west side of the node 100#15, the west side of the node 100#1 and the west side of the node 100#7 respectively.

On the east side of the node 100#1, symbols R1, R2, R3 and R4 indicate that a signal propagates from the east direction to the west side of the node 100#10, the west side of the node 100#15, the west side of the node 100#1 and the west side of the node 100#7 respectively. On the other hand, symbols N1, N2, N3 and N4 indicate that a signal propagates from the west direction to the east side of the node 100#1, the east side of the node 100#15, the east side of the node 100#10 and the east side of the node 100#7 respectively. A line range is defined by using R and N positions as described above so as to allow locations of failure occurrences to be determined in case a plurality of failures occur.

Figure 47:
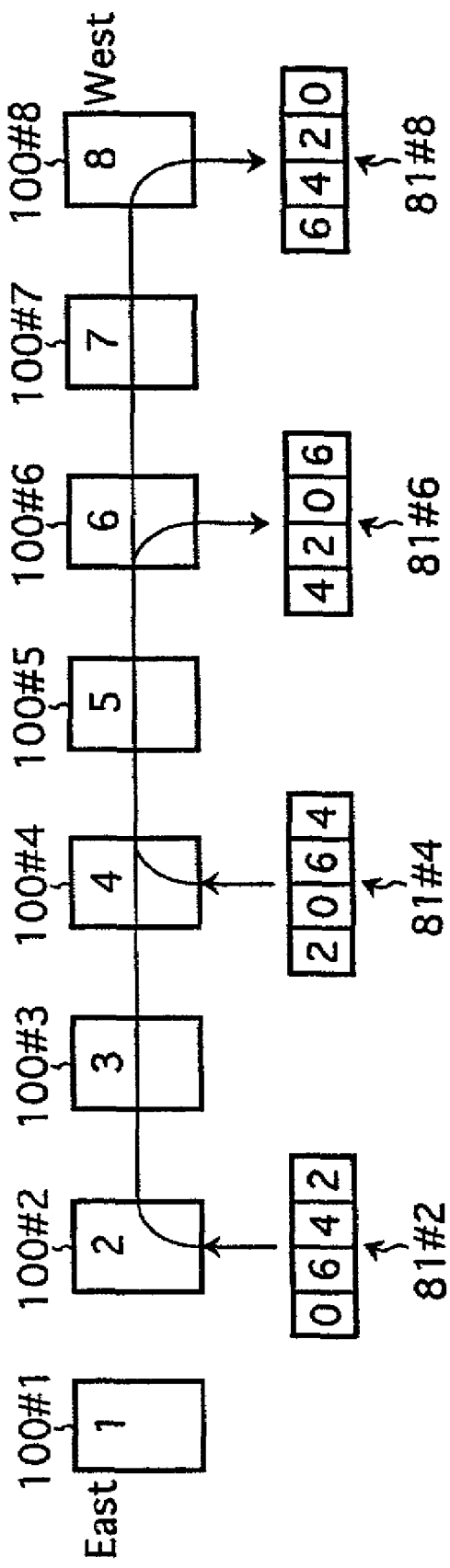
FIG. 47 is a diagram showing a technique to identify a place of occurrence of a failure.

FIG. 47 is a diagram showing a technique to identify a place of occurrence of a failure. The technique shown in FIG. 47 is adopted to identify a place of a failure occurrence in a ring network comprising 8 nodes 100#1 to 100#8. To be more specific, the technique is adopted to identify a place of a failure occurrence by using a RIP table 81#1 in a both-side-end DCP/DCW connection wherein a channel is assigned to transmission lines between the nodes 100#2 and 100#8. In this case, RIP tables 81#2, 81#4, 81#6 and 81#8 of the channel are created on the west side of the node 100#2, the west side of the node 100#4, the east side of the node 100#6 and the east side of the node 100#8 respectively. The node 100#1 is located on the east side of the node 100#2.

FIG. 48 is a diagram showing a technique to determine an east-side N position. An east-side N position is an N position of a failure occurring on a transmission line. The position is identified when information on the failure is received from the east side with the RIP table 81#i provided on the east side. The technique shown in FIG. 48 can be applied to the nodes 100#6 and 100#8 in FIG. 47, which are each a node with a RIP table 81#i provided on the east side thereof. To be more specific, a truth table shown on the left side of FIG. 48 is applied to the node 100#6 whereas a truth table shown on the right side of FIG. 48 is applied to the node 100#8. On the top row of the truth table, modified node IDs (RIPs) in the RIP table 81#i are described. On the left-most column of the truth table, on the other hand, modified reception IDs (east IDs) in the RIP table 81#i are described. Characters X-Y described above the modified node IDs on the top row, where the character X represents the character E or W and the character Y represents the character P or S, denote an east primary node, a west primary node, an east secondary node or a west secondary node. In this case, if East ID<RIP ID, the comparison results in a true (T) outcome. Otherwise, a false (F) comparison result is obtained. A location forming a line with true and false comparison results is a location at which a failure has occurred. If the comparisons result in all false outcomes, the location of a failure occurrence is between modified node IDs 0 to 7. Assume that a failure occurs between the nodes 100#4 and 100#5 for example. In this case, a modified node ID of 1 for the node ID of 5 of the node 100#5 becomes an east ID in the node 100#6. In accordance with the technique of determination shown in FIG. 48, the comparison results in the node 100#6 are T, T, F and T. Thus, by definition shown in FIG. 46, a failure is determined to have occurred at N2.

FIG. 49 is a diagram showing a technique to determine an east-side R position. An east-side R position is an R position of a failure occurring on a transmission line. The position is identified when information on the failure is received from the east side with the RIP table 81#i provided on the east side. The technique shown in FIG. 49 can be applied to the nodes 100#6 and 100#8 in FIG. 47. To be more specific, truth tables shown on the left and right sides of FIG. 49 are applied to the nodes 100#6 and 100#8 respectively. In this case, if East ID≦RIP, the comparison results in a true (T) outcome. Otherwise, a false (F) comparison result is obtained. A location forming a line with true and false comparison results is a location at which a failure has occurred. If the comparisons result in all false or true outcomes, the location of a failure occurrence is between modified node IDs 0 to 7. Assume that a failure occurs between the nodes 100#4 and 100#5 for example. In this case, a modified node ID of 2 for the node ID of 4 of the node 100#4 becomes a west ID in the node 100#6. In accordance with the technique of determination shown in FIG. 49, the comparison results in the node 100#6 are T, T, F and T. Thus, by definition shown in FIG. 46, a failure is determined to have occurred at R3. Thus, in the event of a failure between the nodes 100#4 and 100#5, results of identification of failure occurrence locations in the node 100#6 are N2 and R3.

FIG. 50 is a diagram showing a technique to determine a west-side N position. A west-side N position is an N position of a failure occurring on a transmission line. The position is identified when information on the failure is received from the west side with the RIP table 81#i provided on the west side. The technique shown in FIG. 50 can be applied to the nodes 100#2 and 100#4 in FIG. 47, which are each a node with a RIP table 81#i provided on the west side thereof. To be more specific, truth tables shown on the left and right sides of FIG. 50 are applied to the nodes 100#2 and 100#4 respectively. In this case, if West ID≦RIP, the comparison results in a true (T) outcome. Otherwise, a false (F) comparison result is obtained. A location forming a line with true and false comparison results is a location at which a failure has occurred. If the comparisons result in all false or true outcomes, the location of a failure occurrence is between modified node IDs 0 to 7. Assume that a failure occurs between the nodes 100#4 and 100#5 for example. In this case, a modified node ID of 6 for the node ID of 4 of the node 100#4 becomes a west ID in the node 100#2. In accordance with the technique of determination shown in FIG. 50, the comparison results in the node 100#2 are F, T, F and F. Thus, by definition shown in FIG. 46, a failure is determined to have occurred at N2.

FIG. 51 is a diagram showing a technique to determine a west-side R position. A west-side R position is an R position of a failure occurring on a transmission line. The position is identified when information on the failure is received from the east side with the RIP table 81#i provided on the west side. The technique shown in FIG. 51 can be applied to the nodes 100#2 and 100#4 in FIG. 47, which are each a node with a RIP table 81#i provided on the west side thereof. To be more specific, truth tables shown on the left and right sides of FIG. 51 are applied to the nodes 100#2 and 100#4 respectively. In this case, if East ID<RIP, the comparison results in a true (T) outcome. Otherwise, a false (F) comparison result is obtained. A location forming a line with true and false comparison results is a location at which a failure has occurred. If the comparisons result in all false outcomes, the location of a failure occurrence is between modified node IDs 0 to 7. Assume that a failure occurs between the nodes 100#4 and 100#5 for example. In this case, a modified node ID of 5 for the node ID of 5 of the node 100#5 becomes an east ID in the node 100#2. In accordance with the technique of determination shown in FIG. 51, the comparison results in the node 100#2 are F, T, F and F. Thus, by definition shown in FIG. 46, a failure is determined to have occurred at R3. Thus, in the event of a failure between the nodes 100#4 and 100#5, results of identification of failure occurrence locations in the node 100#2 are N2 and R3.

The above description explains a case in which 4 modified node IDs are set in the RIP table 81#i. It should be noted, however, that the number of modified node IDs set in the RIP table 81#i does not have to be 4. That is to say, even with the number of modified node IDs in the RIP table 81#i set at 2 or 3, it is obvious that the above techniques can be applied. The description also holds true of a case in which a squelch table 80#i is used. The techniques can also be applied to a case in which there is a plurality of failure occurrence locations instead of 1 location. Assume, for example, that the techniques are applicable to a case in which failures occur between the nodes 100#4 and 100#5 as well as between the nodes 100#6 and 100#7. In the node 100#6, a modified node ID of 1 for a node ID of 5 becomes an east ID whereas a modified node ID of 7 for a node ID of 7 becomes a west ID. Thus, results of identification of failure occurrence locations are N2 and R4. Since the failure-occurrence-location-identifying unit 86#i based on the squelch table 80#i or the RIP table 81#i indicates the N and R locations, the switching control unit 88#i executes switching control for each channel as follows:

1: For a case in which the squelch table 80#i is used

In the case of a normal BLSR multiplexing apparatus, for example, in a node other than the secondary node 100#i of the DCP/DTP connection, the switching control described below is executed by using the squelch table 80#i as follows:

1-1: If nodes indicated by a modified source ID and a modified destination ID, which are set in the squelch table 80#i, can be connected to each other by working lines by-passing the N and R locations of on the failing transmission lines, no switching operation is carried out.

1-2: If nodes indicated by a modified source ID and a modified destination ID, which are set in the squelch table 80#i, cannot be connected to each other by working lines, but can be connected by protection lines by-passing the N and R locations of on the failing transmission lines, the transmission is switched to the protection lines like the case of the failures shown in FIGS. 32A, 32C, 37A and 37B.

1-3: If nodes indicated by a modified source ID and a modified destination ID, which are set in the squelch table 80#i, cannot be connected to each other by lines by-passing the N and R locations of on the failing transmission lines, a squelching operation is carried out like the case of the failures shown in FIGS. 32B and 37C.

2: For a case in which the RIP table 81#i is used

In a secondary node serving as a normal BLSR multiplexing apparatus in a DCP/DTP connection and a node serving as a submarine BLSR multiplexing apparatus adding and dropping signals, for example, the switching control described below is executed by using the RIP table 81#i as follows:

2-1: The N and R locations of on the failing transmission lines as well as modified node IDs and path information, which are set in the RIP table 81#i, are used as a basis for forming a judgment as to whether or not the ring network can be rescued from a generated failure. If the ring network cannot be rescued from a generated failure, no switching control is executed.

2-2: The N and R locations of on the failing transmission lines as well as modified node IDS and path information, which are set in the RIP table 81#i, are used as a basis for forming a judgment as to whether or not a failure has occurred on a working line. If no failure has occurred on a working line, no switching control is executed.

2-3: The N and R locations of on the failing transmission lines as well as modified node IDs and path information, which are set in the RIP table 81#i, are used as a basis for forming a judgment as to whether or not a failure has occurred on a protection line even though the occurrence of a failure on a working line is determined. If failures have occurred on working and protection lines, switching operations are carried out in dependence on whether the path information indicates that the implementation of connection is a normal, DTW, DCP one-side-end, DCW one-side-end, DCP both-side-end, DCW both-side-end or DTP connection. As an example, switching control for the one-side-end DCP connection and for the one-side-end DCW connection is explained as follows.

Figure 52A:
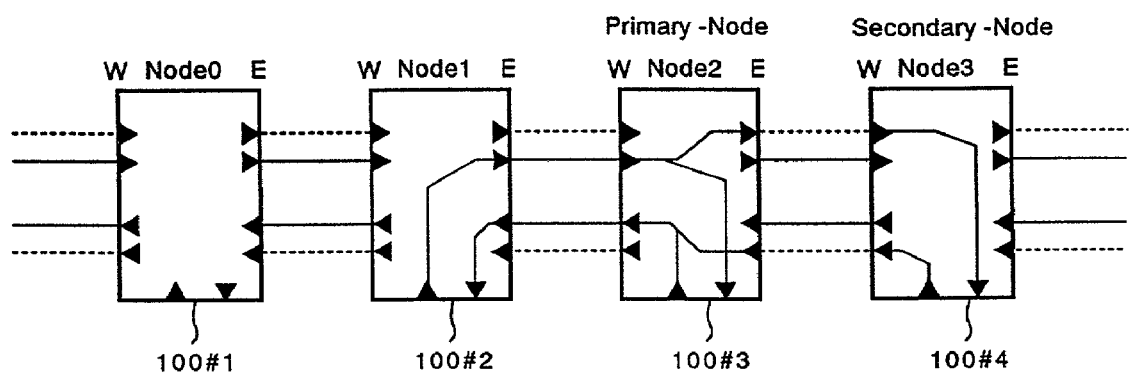
FIG. 52A is a diagram showing a case of no occurrence of a failure between primary and secondary nodes for a DCP connection.
Figure 52B:
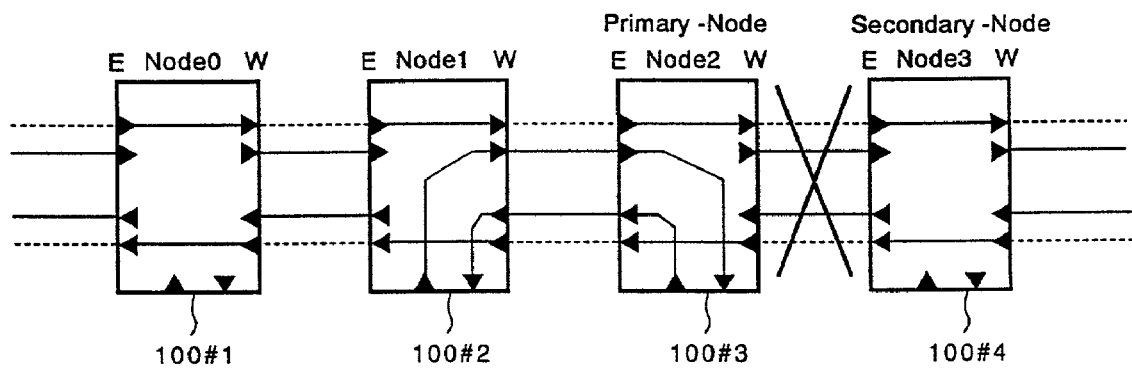
FIG. 52B is a diagram showing a case of occurrence of a failure between primary and secondary nodes for a DCP connection.

FIGS. 52A and 52B are diagrams showing switching control in the event of a failure between primary and secondary nodes for a one-side-end DCP connection. To be more specific, FIG. 52A is a diagram showing flows of signals with no failure occurring between the primary and secondary nodes. On the other hand, FIG. 52B is a diagram showing a switching operation carried out in the event of a failure between the primary and secondary nodes. In FIGS. 52A and 52B, a node 100#2 is a terminal node, a node 100#3 is a primary node and a terminal node 100#4 is a secondary node whereas symbols W and E denote the west and east directions respectively. As shown in FIG. 52A, when there is no failure on a transmission line between the primary node 100#3 and the secondary node 100#4, in the west direction, the terminal node 100#2 adds a channel signal to a working line, the primary node 100#3 drops the signal from the working line as well as continues the signal to a protection line and the secondary node 100#4 drops the signal from the protection line. In the east direction, on the other hand, the secondary node 100#4 adds a signal to protection line, the primary node 100#3 selects either the signal coming from the protection line or a signal received from an adjacent ring network, adding the selected signal to a working line, and the terminal node 100#2 drops the signal from the working line. When failures occur on transmission lines between the primary node 100#3 and the secondary node 100#4, switching operations are carried out as follows.

As shown in FIG. 52B, in the west direction, the terminal node 100#2 passes on a signal propagating through a protection line as well as adds a signal to a working line, the primary node 100#3 drops a signal from the working line as well as passes on the signal propagating through the protection line and the secondary node 100#4 passes on the signal propagating through the protection line. In the east direction, on the other hand, the secondary node 100#4 passes on a signal propagating through a protection line, the primary node 100#3 passes on the signal propagating through the protection line as well as adds a signal from the adjacent ring network to a working line and the terminal node 100#2 drops the signal from the working line.

Figure 53A:
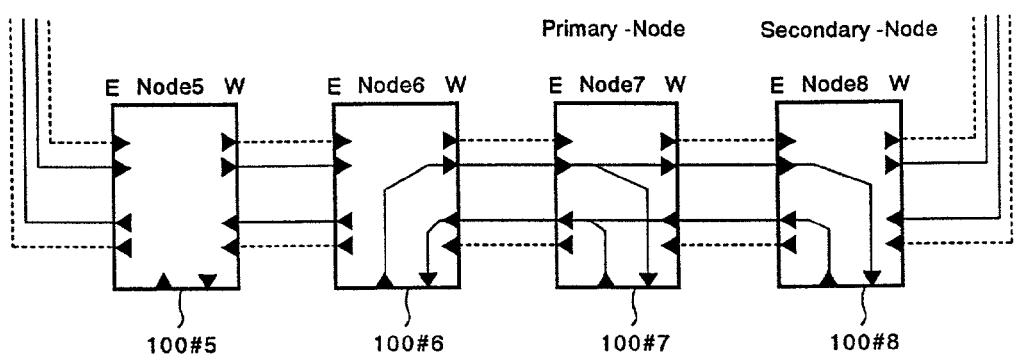
FIG. 53A is a diagram showing signal flows in a case of no occurrence of a failure between primary secondary nodes.
Figure 53B:
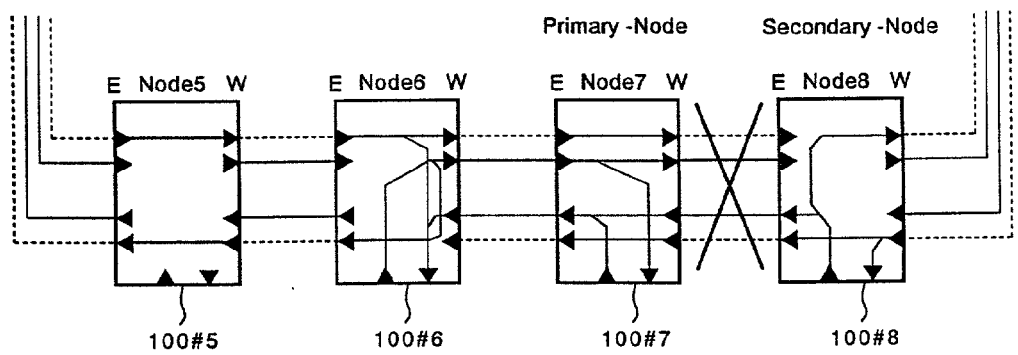
FIG. 53B is a diagram showing signal flows in a case of occurrence of a failure between primary secondary nodes.

FIGS. 53A and 53B are diagrams showing switching control in the event of a failure between primary and secondary nodes for a one-side-end DCW connection. To be more specific, FIG. 53A is a diagram showing flows of signals with no failure occurring between the primary and secondary nodes. On the other hand, FIG. 53B is a diagram showing a switching operation carried out in the event of a failure between the primary and secondary nodes. In FIGS. 53A and 53B, a node 100#6 is a terminal node, a node 100#7 is a primary node and a terminal node 100#8 is a secondary node whereas symbols W and E denote the west and east directions respectively.

As shown in FIG. 53A, when there is no failure on a transmission line between the primary node 100#7 and the secondary node 100#8, in the west direction, the terminal node 100#6 adds a channel signal to a working line, the primary node 100#7 drops the signal from the working line as well as continues the signal to a working line and the secondary node 100#8 drops the signal from the working line. In the east direction, on the other hand, the secondary node 100#8 adds a signal to working line, the primary node 100#7 selects either the signal coming from the working line or a signal received from an adjacent ring network, adding the selected signal to a working line, and the terminal signal 100#6 drops the signal from the working line. When failures occur on transmission lines between the primary node 100#7 and the secondary node 100#8, switching operations are carried out as follows.

As shown in FIG. 53B, in the west direction, the terminal node 100#6 adds a signal to a working line and provides a bridge between the working line and a protection line in the opposite direction. The primary node 100#7 drops the signal from the working line as well as continues this signal to a working line. The secondary node 100#8 adds a signal from the adjacent ring network to a protection line by way of a bridge. In the east direction, on the other hand, the secondary node 100#8 drops a signal from a protection line coming from the west direction and adds a signal to a protection line. The primary node 100#7 adds a signal obtained as a result of selection of either a signal propagating through a working line or a signal from the adjacent ring network to a working line. The terminal node 100#6 selects a signal from a protection line to the west direction or the signal from the working line to the east direction and drops the selected signal.

The operation of the transmission apparatus 56#i shown in FIG. 11 is explained as follows.

1: Classification of cross-connect information

Figure 54:
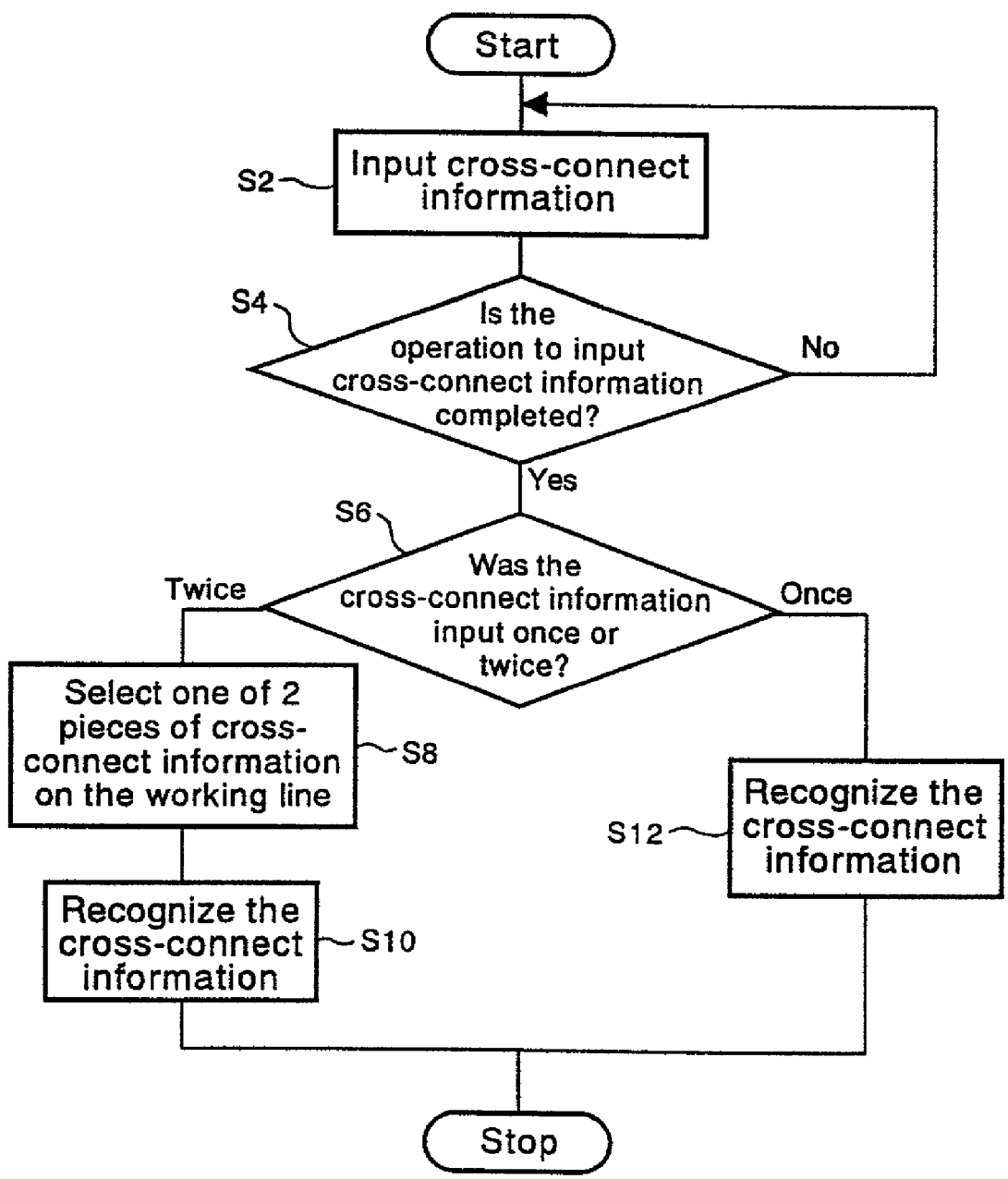
FIG. 54 is a flowchart of classification of cross-connect information.

FIG. 54 is a flowchart of classification of cross-connect information. As shown in FIG. 54, the flowchart begins with a step S2 at which the cross-connect-classifying unit 72#i inputs cross-connect information from the user interface unit 70#i. The cross-connect information includes information on a channel, a transmission, a direction and a line. The information on a transmission indicates whether the transmission adds, drops or passes through a signal. The information on a direction indicates whether a signal is transmitted in the east or west direction. The information on a line indicates whether the transmission line is a working or protection line. The flow in the flowchart then goes on to a step S4 to form a judgment as to whether or not the operation to input the cross-connect information has been completed. If the outcome of the judgment indicates that the operation to input the cross-connect information has been completed, the flow in the flowchart goes on to a step S6. If the outcome of the judgment indicates that the operation to input the cross-connect information has not been completed, on the other hand, the flow in the flowchart goes back to the step S2. At the step S6, the cross-connect-classifying unit 72#i forms a judgment as to whether the cross-connect information was input once or twice. If the outcome of the judgment indicates that the cross-connect information was input twice, the flow in the flowchart goes on to a step S8. If the outcome of the judgment indicates that the cross-connect information was input once, on the other hand, the flow in the flowchart goes on to a step S12. At the step S8, one of the 2 pieces of cross-connect information including information on a working line is selected. At the next step S10, the cross-connect information is determined to pertain to one of the categories shown in FIG. 13. Likewise, at the step S12, the cross-connect information is determined to pertain to one of the categories shown in FIG. 13.

2: Collection of cross-connect categories

FIG. 55 is a diagram showing the structure of transmitted data including a cross-connect category. As shown in FIG. 55, the transmitted data consists of typically 8 bits D0 to D7. The bits D7 and D6 are a code representing token control. Typically, D7 and D6 values of (0, 0), (0, 1), (1, 0) and (1, 1) indicate a UNEQ code, a ring establishment code, a token transfer code and a token code respectively. The UNEQ code is a code for triggering construction of a table. The ring establishment code is a code for establishing a token ring. The token transfer code is a code for transferring a token. The token code is a code for indicating transmission of a cross-connect category.

The bits D5 and D4 are a code representing a cross-connect category. Typically, D5 and D4 values of (0, 0), (0, 1), (1, 0) and (1, 1) indicate a category of adding a signal to a working line, adding a signal to a protection line, dropping a signal from a working line and dropping a signal from a protection line respectively.

The bits D3 to D0 are a node ID in the range 0 to 15. The cross-connect category of the bits D5 and D4 and the node ID of the bits D3 to D0 are transmitted along with one of the token control codes of the bits D7 and D6 except the UNEQ code and the token transfer code.

Figure 57:
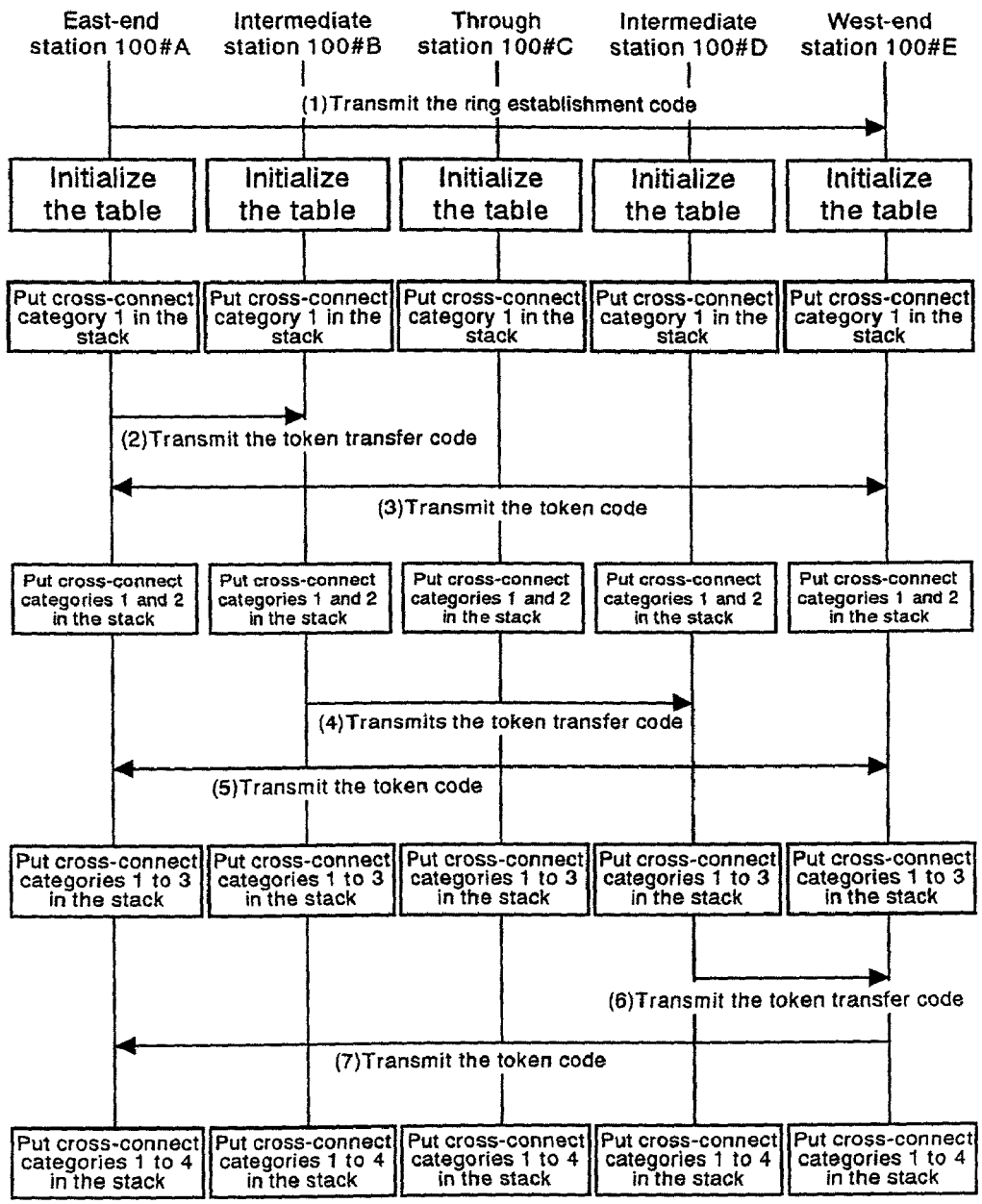
FIG. 57 is a diagram showing a sequence chart to construct a table.
Figure 58:
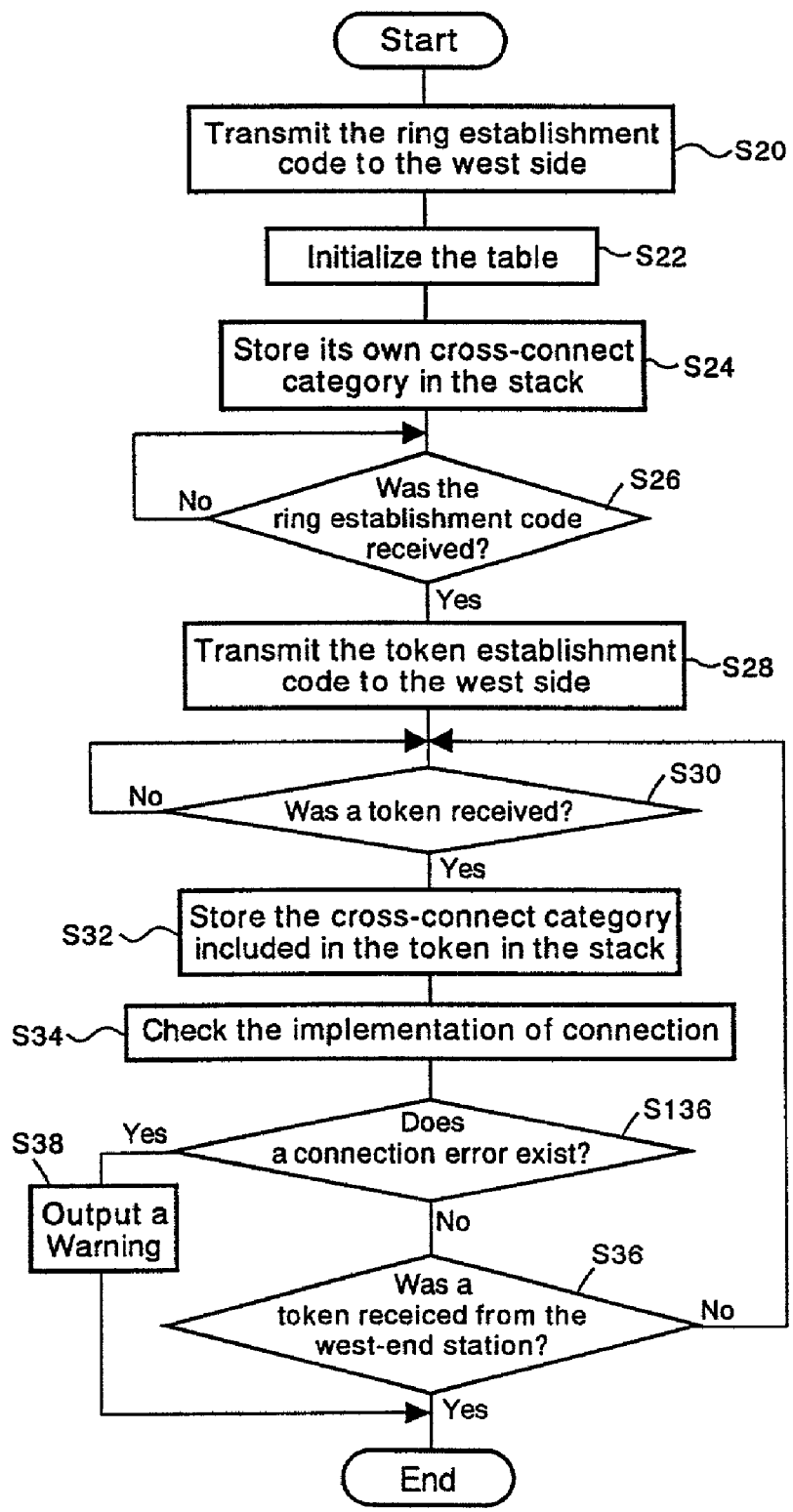
FIG. 58 shows a flowchart representing construction of a table for an east-end station.
Figure 59:
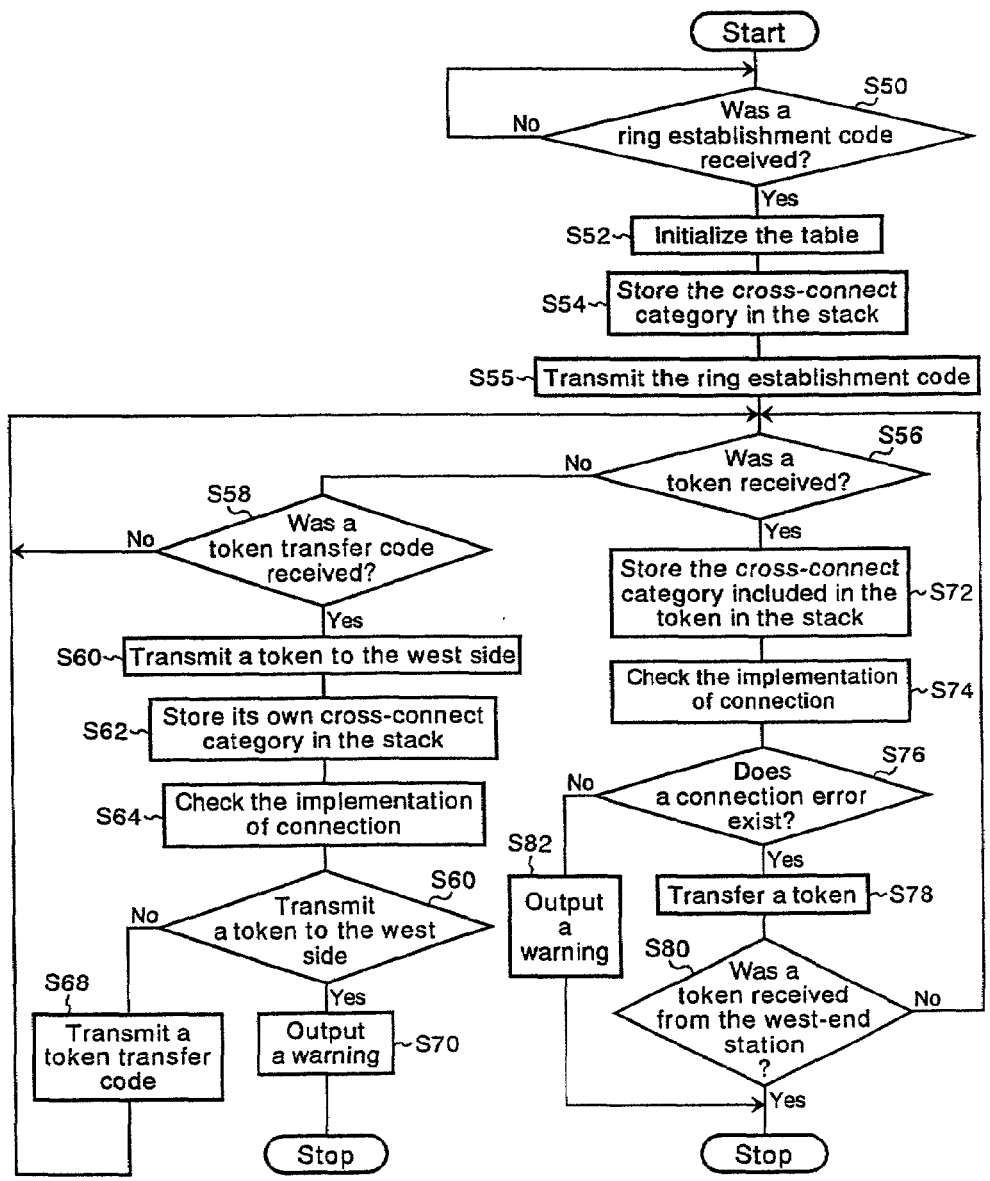
FIG. 59 shows a flowchart representing construction of a table for an intermediate station.
Figure 60:
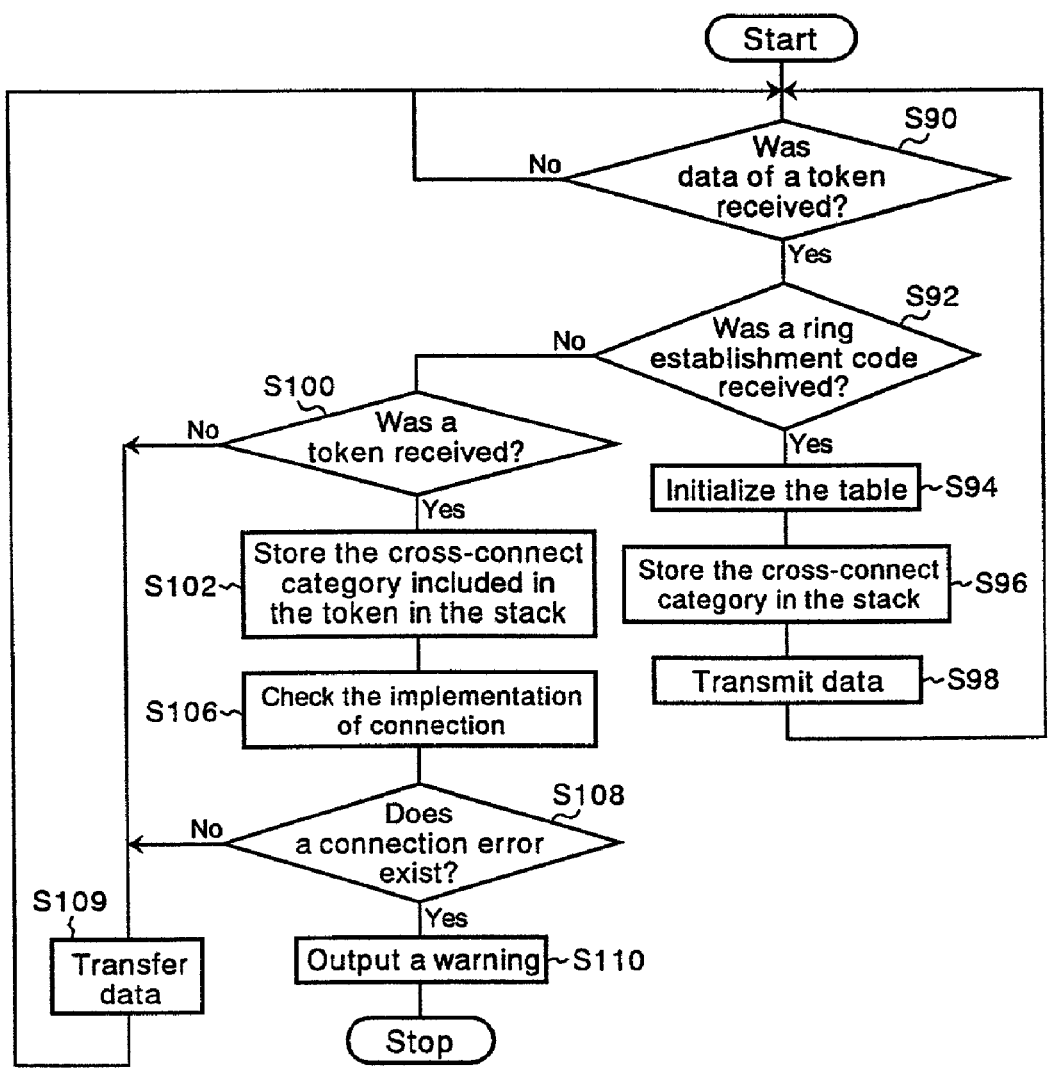
FIG. 60 shows a flowchart representing construction of a table for a through station.
Figure 61:
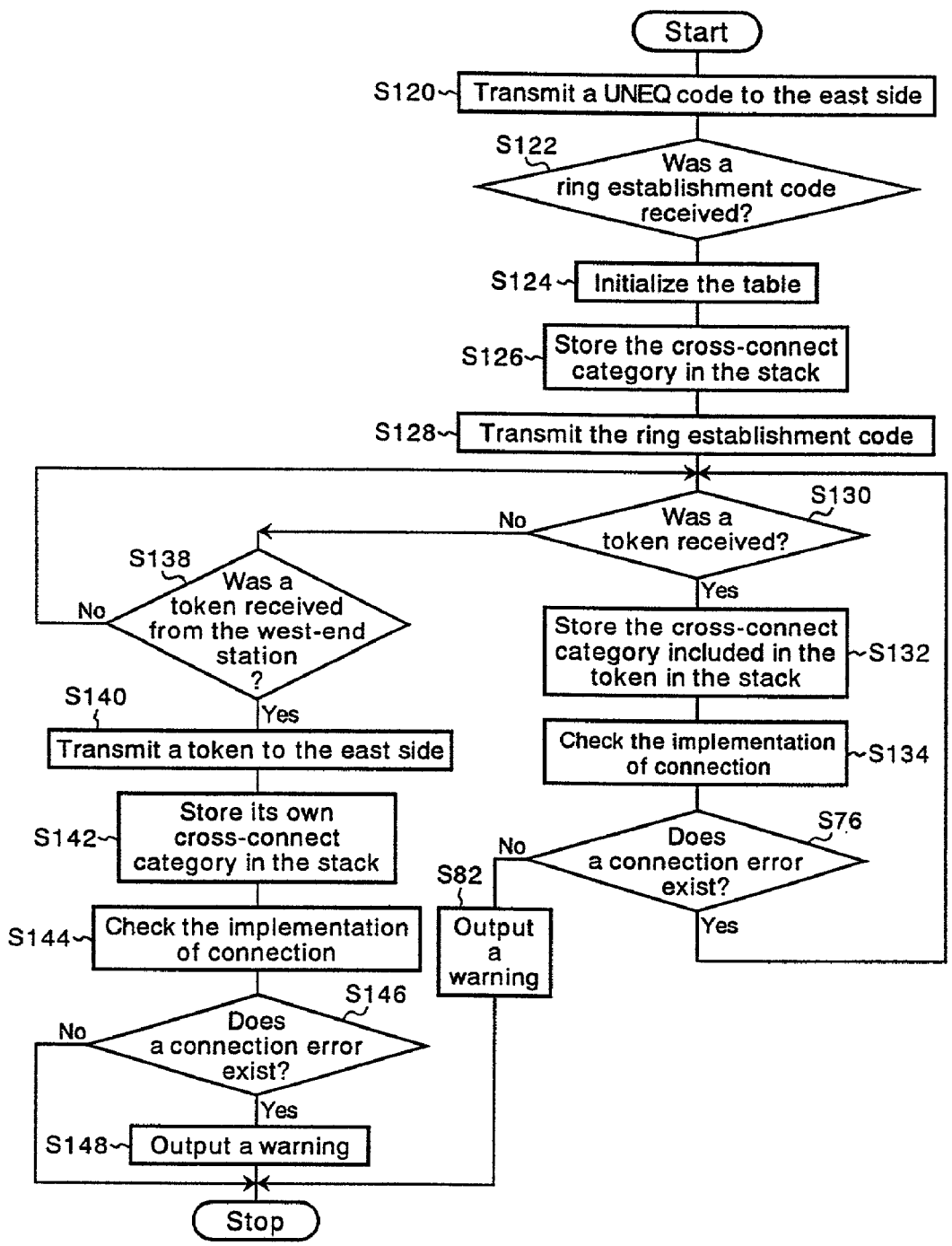
FIG. 61 shows a flowchart representing construction of a table for a west-end station.

FIG. 56 is a diagram showing a sequence to construct a table. FIG. 57 is a diagram showing a chart to construct a table. In FIGS. 56 and 57, nodes 100#A, 100#B, 100#C, 100#D and 100#E are an east-end station, an intermediate station, a through station, an intermediate station and a west-end station respectively. FIG. 58 shows a flowchart representing a procedure to construct a table for an east-end station. FIG. 59 shows a flowchart representing a procedure to construct a table for an intermediate station. FIG. 60 shows a flowchart representing a procedure to construct a table for a through station. FIG. 61 shows a flowchart representing a procedure to construct a table for a west-end station.

When the east-end station 100#A receives a UNEQ code from the west-end station 100#E, as shown in a diagram (1) of FIG. 56 and a diagram (1) of FIG. 57, at the first step S20 of the flowchart shown in FIG. 58, the east-end station 100#A sets a ring establishment code, a cross-connect category and a node ID in bits D0 to D7 of an overhead, which are shown in FIG. 55, and transmits the codes to the west side. At the next step S22, a table is initialized. At the next step S24, the cross-connect category is stored in a stack.

At the first step S50 of the flowchart shown in FIG. 59, the intermediate station 100#B forms a judgment as to whether or not a ring establishment code has been received. If the outcome of the judgment indicates that a ring establishment code has been received, the flow of the procedure goes on to a step S52. If the outcome of the judgment indicates that a ring establishment code has not been received, on the other hand, the intermediate station 100#B enters a wait state, repeating the formation of the judgment at the step S50. Since a ring establishment code has been received in this case, the flow of the procedure goes on to the step S52. At the step S52, a stack table is initialized. At the next step S54, the cross-connect category and the node ID are stored in the stack table. At the next step S55, the ring establishment code is transferred.

At the first step S90 of the flowchart shown in FIG. 60, the through station 100#C forms a judgment as to whether or not information on a token has been received. If the outcome of the judgment indicates that information on a token has been received, the flow of the procedure goes on to a step S92. If the outcome of the judgment indicates that information on a token has not been received, on the other hand, the through station 100#C enters a wait state, repeating the formation of the judgment at the step S90. Since the information on a token has been received in this case, the flow of the procedure goes on to the step S92 to form a judgment as to whether or not a ring establishment code has been received. If the outcome of the judgment indicates that a ring establishment code has been received, the flow of the procedure goes on to a step S94. Since a ring establishment code has been received in this case, the flow of the procedure goes on to the step S94 at which a stack table is initialized. At the next step S96, the cross-connect category and the node ID are stored in the stack table. At the next step S98, data is transferred.

Much like the intermediate station 100#B, the intermediate station 100#D receives the ring establishment code and stores the cross-connect category and the node ID in a stack, and then transfers the ring establishment code.

At the first step S120 of the flowchart shown in FIG. 61, the west-end station 100#E completes the operation to input cross-connect information, identifying a cross-connect category and transmits a UNEQ code for triggering construction of a table. After receiving the UNEQ code, at the next step S122, the east-end station 100#A forms a judgment as to whether or not the transmitted ring establishment code has been received. If the outcome of the judgment indicates that the transmitted ring establishment code has been received, the flow of the procedure goes on to a step S124. If the outcome of the judgment indicates that the transmitted ring establishment code has not been received, on the other hand, the west-end station 100#E enters a wait state, repeating the formation of the judgment at the step S120. Since the ring establishment code has been received in this case, the flow of the procedure goes on to the step S124 at which a stack table is initialized. At the next step S126, the cross-connect category and the node ID are stored in the stack table. At the next step S128, the ring establishment code is transmitted to the east side. This ring establishment code is received by the east-end station 100#A after passing through the intermediate station 100#D, a through station 100#C and the intermediate station 100#B.

At a step S26 of the flowchart shown in FIG. 58, the east-end station 1GO#A forms a judgment as to whether or not the transmitted ring establishment code has been received. If the outcome of the judgment indicates that the transmitted ring establishment code has been received, the flow of the procedure goes on to a step S28. If the outcome of the judgment indicates that the transmitted ring establishment code has not been received, on the other hand, the east-end station 100#A enters a wait state, repeating the formation of the judgment at the step S26. As shown in a diagram (2) of FIG. 56 and a diagram (2) of FIG. 57, at the step S28, the east-end station 100#A transmits a token transfer code.

At a step S56 of the flowchart shown in FIG. 59, the intermediate station 100#B forms a judgment as to whether or not a token has been received. If the outcome of the judgment indicates that a token has been received, the flow of the procedure goes on to a step S72. If the outcome of the judgment indicates that a token has not been received, on the other hand, the flow of the procedure goes on to a step S58. Since a token transfer code has been received in this case, the flow of the procedure goes on to the step S58 to form a judgment as to whether or not the token transfer code has been received. If the outcome of the judgment indicates that the token transfer code has been received, the flow of the procedure goes on to a step S60. Since the token transfer code has been received in this case, the flow of the procedure goes on to the step S60. As shown in a diagram (3) of FIG. 56 and a diagram (3) of FIG. 57, at the step S60, the token, namely, the token code, the cross-connect category and the node ID, is transmitted.

To put it in detail, the token is transmitted to the east-end station 100#A, the through station 100#C, the intermediate station 100#D and the west-end station 100#E. At a step S100 of the flowchart shown in FIG. 60, the through station 100#C forms a judgment as to whether or not a token has been received. If the outcome of the judgment indicates that a token has not been received, the flow of the procedure goes on to a step S109. If the outcome of the judgment indicates that a token has been received, on the other hand, the flow of the procedure goes on to a step S102. At the step S102, if the node of the cross-connect category stored in the stack immediately before is a broadcasting station, the received cross-connection category is stored in the stack, overwriting the cross-connect category stored in the stack immediately before. If the node of the cross-connect category stored in the stack immediately before is not a broadcasting station, on the other hand, the received cross-connection category is stored in the stack after the cross-connect category stored in the stack immediately before. At the next step S106, the implementation of connection is checked. The flow of the procedure then goes on to a step S108 to form a judgment as to whether or not a connection error exists. If the outcome of the judgment indicates that a connection error does not exist, the flow of the procedure goes on to the step S109 at which data is transferred. Then, the flow of the procedure goes back to the step S90. If the outcome of the judgment indicates that a connection error exists, on the other hand, the flow of the procedure goes on to a step S109 at which a warning is output. Then, the processing is ended.

At a step S56 of the flowchart shown in FIG. 59, the intermediate station 100#D forms a judgment as to whether or not a token has been received. If the outcome of the judgment indicates that a token has been received, the flow of the procedure goes on to a step S72. At the step S72, if the node of the cross-connect category stored in the stack immediately before is a broadcasting station, the received cross-connection category is stored in the stack, overwriting the cross-connect category stored in the stack immediately before. If the node of the cross-connect category stored in the stack immediately before is not a broadcasting station, on the other hand, the received cross-connection category is stored in the stack after the cross-connect category stored in the stack immediately before. At the next step S74, the implementation of connection is checked. The flow of the procedure then goes on to a step S76 to form a judgment as to whether or not a connection error exists. If the outcome of the judgment indicates that a connection error does not exist, the flow of the procedure goes on to a step S78 at which data is transferred. Then, the flow of the procedure goes on to a step S80 to form a judgment as to whether or not a token has been received from the west-end station 100#E. If the outcome of the judgment indicates that a token has been received from the west-end station 100#E, the processing is ended. If the outcome of the judgment indicates that a token has not been received from the west-end station 100#E, on the other hand, the flow of the procedure goes back to the step S56. If the outcome of the judgment formed at the step S76 indicates that a connection error exists, on the other hand, the flow of the procedure goes on to a step S82 at which a warning is output. Then, the processing is ended.

At a step S130 of the flowchart shown in FIG. 61, the intermediate station 100#E forms a judgment as to whether or not a token has been received. If the outcome of the judgment indicates that a token has been received, the flow of the procedure goes on to the step S132. At the step S132, if the node of the cross-connect category stored in the stack immediately before is a broadcasting station, the received cross-connection category is stored in the stack, overwriting the cross-connect category stored in the stack immediately before. If the node of the cross-connect category stored in the stack immediately before is not a broadcasting station, on the other hand, the received cross-connection category is stored in the stack after the cross-connect category stored in the stack immediately before. At the next step S134, the implementation of connection is checked. The flow of the procedure then goes on to a step S136 to form a judgment as to whether or not a connection error exists. If the outcome of the judgment indicates that a connection error does not exist, the flow of the procedure goes back to the step S130. If the outcome of the judgment indicates that a connection error exists, on the other hand, the flow of the procedure goes on to a step S137 at which a warning is output.

At the step S32 of the flowchart shown in FIG. 58, if the node of the cross-connect category stored in the stack immediately before is a broadcasting station, the east-end station 100#A does not stores the received cross-connection category in the stack but stores the cross-connect of its own in the stack, overwriting the cross-connect category stored in the stack immediately before. If the node of the cross-connect category stored in the stack immediately before is not a broadcasting station, on the other hand, the east-end station 100#A stores the received cross-connection category in the stack after the cross-connect category stored in the stack immediately before. At the next step S34, the implementation of connection is checked. The flow of the procedure then goes on to a step S136 to form a judgment as to whether or not a connection error exists. If the outcome of the judgment indicates that a connection error does not exist, the flow of the procedure goes on to a step S36 to form a judgment as to whether or not a token has been received from the west-end station. If the outcome of the judgment indicates that a token has been received from the west-end station, the processing is ended. If the outcome of the judgment indicates that a token has not been received from the west-end station, on the other hand, the flow of the procedure goes back to a step S30. If the outcome of the judgment formed at the step S136 indicates that a connection error exists, on the other hand, the flow of the procedure goes on to a step S38 at which a warning is output. Then, the processing is ended.

At a step S62 of the flowchart shown in FIG. 59, if the node of the cross-connect category stored in the stack immediately before is a broadcasting station, the intermediate station 100#B does not stores the received cross-connection category in the stack but stores the cross-connect of its own in the stack, overwriting the cross-connect category stored in the stack immediately before. If the node of the cross-connect category stored in the stack immediately before is not a broadcasting station, on the other hand, the east-end station 100#A stores the received cross-connection category in the stack after the cross-connect category stored in the stack immediately before. At the next step S64, the implementation of connection is checked. The flow of the procedure then goes on to a step S66 to form a judgment as to whether or not a connection error exists. If the outcome of the judgment indicates that a connection error does not exist, the flow of the procedure goes back to the step S56 by way of a step S68. If the outcome of the judgment indicates that a connection error exists, on the other hand, the flow of the procedure goes on to a step S70 at which a warning is output. Then, the processing is ended. At the step 68, a token transfer code is transmitted as shown in a diagram (3) of FIG. 56 and a diagram (4) of FIG. 57.

Thereafter, the intermediate station 100#D receives the token transfer code and transmits a token code as shown in a diagram (5) of FIG. 56 in the same way. The east-end station 100#A, the intermediate station 100#B, the through station 100#C, the intermediate station 100#D and the west-end station 100#E store a cross-connect category in the stack in the same way. The intermediate station 100#D transmits a token transfer code as shown in a diagram (6) of FIG. 56. The west-end station 100#E receives the token transfer code as shown in a diagram (4) of FIG. 55 and transmits the token transfer code as shown in a diagram (7) of FIG. 56. The east-end station 100#A, the intermediate station 100#B, the through station 100#C, the intermediate station 100#D and the west-end station 100#E store a cross-connect category and a node ID in the stack in the same way. As such, the operation to collect cross-connect categories is ended.

3: Creation of a squelch table 80#i

Figure 62:
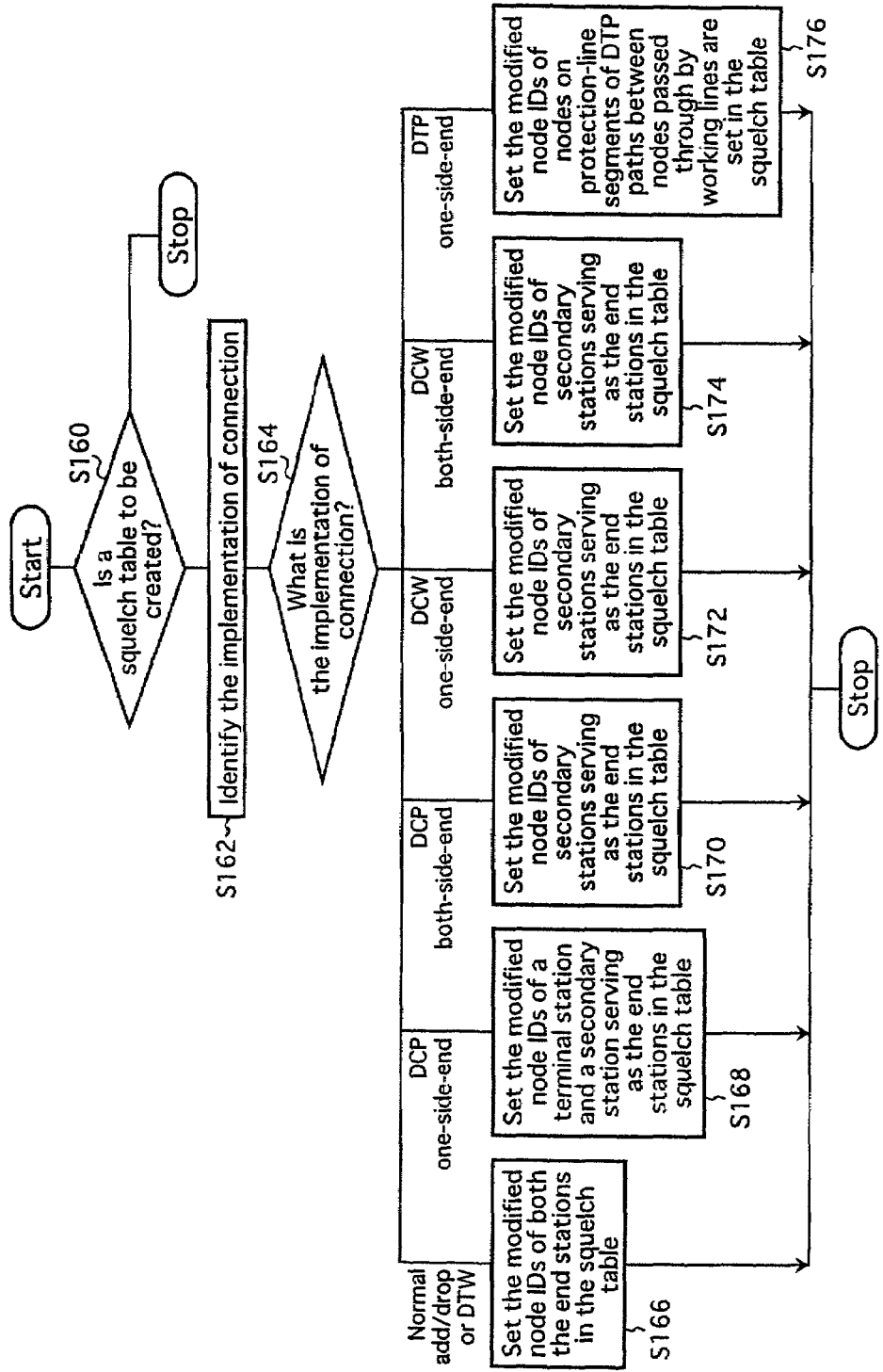
FIG. 62 shows a flowchart representing creation of a squelch table.

FIG. 62 shows a flowchart representing a procedure to create a squelch table 80#i. As shown in the figure, the flowchart begins with a step S160 to form a judgment as to whether or not to create a squelch table 80#i for a channel related to a cross-connect category stored in a stack. A squelch table 80#i is typically created in a node passed through by a normal BLSR working line and a primary node of the DTW implementation of connection. If the outcome of the judgment indicates that a squelch table 80#i is not to be created, the procedure is ended. If the outcome of the judgment indicates that a squelch table 80#i is to be created, on the other hand, the flow of the procedure goes on to a step S162 at which one of the implementations of connection of FIGS. 19 to 26 corresponding to a cross-connect category stored in the stack is identified. The flow of the procedure then goes on to a step S164 at which the identified implementation of connection is recognized. If the implementation of connection is a normal add and drop connection or a DTW connection, the flow of the procedure goes on to a step S166 at which modified node IDS of both the end stations are set in the squelch table 80#i. If the implementation of connection is a DCP one-side-end connection, the flow of the procedure goes on to a step S168 at which modified node IDs of the terminal stations at both ends and secondary stations are set in the squelch table 80#i. If the implementation of connection is a DCP both-side-end connection, the flow of the procedure goes on to a step S170 at which modified node IDs of the secondary stations at both ends are set in the squelch table 80#i. If the implementation of connection is a DCW one-side-end connection, the flow of the procedure goes on to a step S172 at which modified node IDs of the terminal stations at both ends and secondary stations are set in the squelch table 80#i. If the implementation of connection is a DCW both-side-end connection, the flow of the procedure goes on to a step S174 at which modified node IDs of the secondary stations at both ends are set in the squelch table 80#i. If the implementation of connection is a DTP one-side-end connection, the flow of the procedure goes on to a step S176 at which modified node IDs of nodes on protection-line segments of DTP paths between nodes passed through by working lines are set in the squelch table 80#i.

4: Creation of a RIP table 81#i

Figure 63:
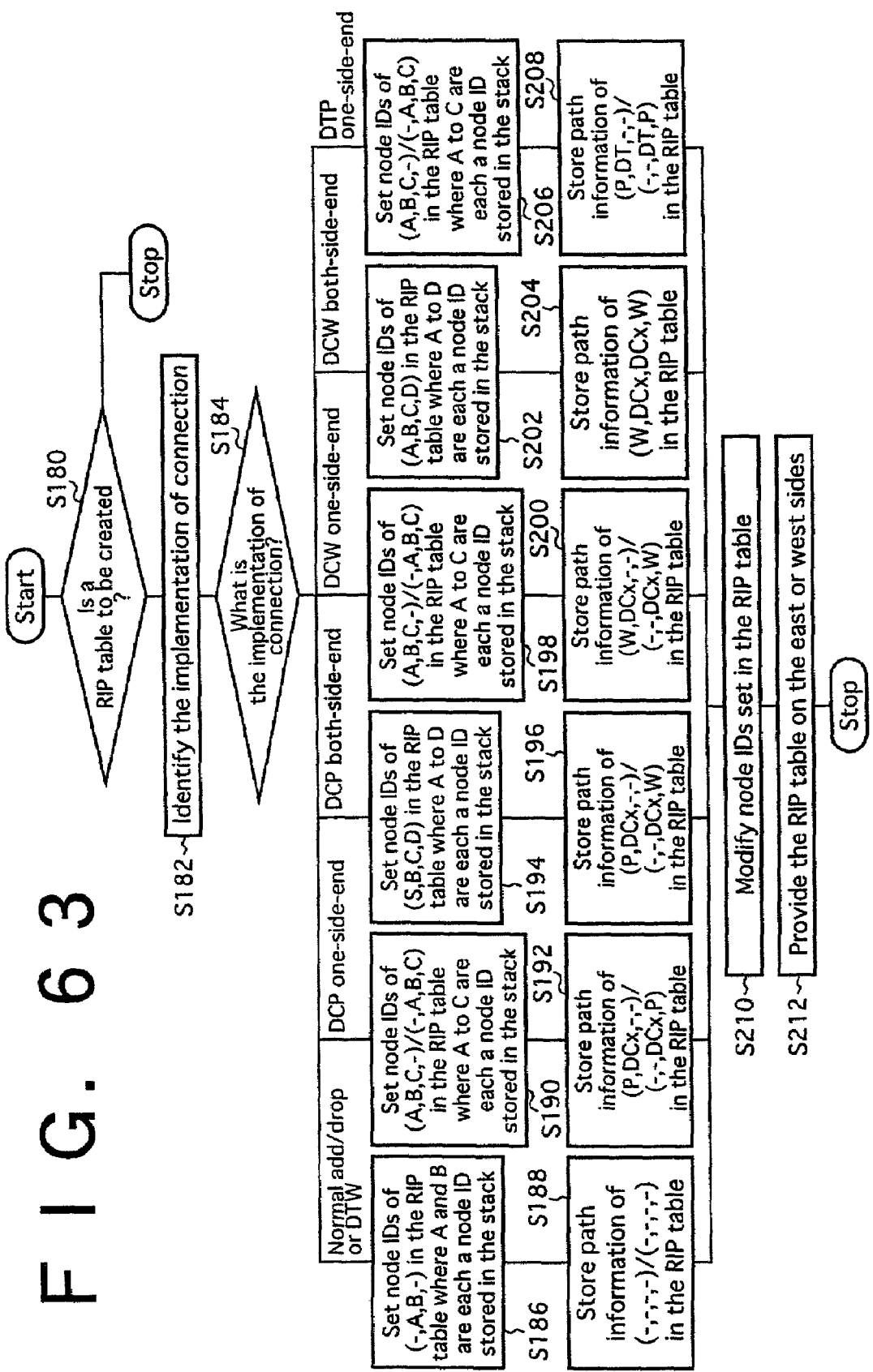
FIG. 63 shows a flowchart representing creation of a RIP table.

FIG. 63 shows a flowchart representing a procedure to create a RIP table 81#i. As shown in the figure, the flowchart begins with a step S180 to form a judgment as to whether or not to create a RIP table 81#i for a channel related to a cross-connect category stored in a stack. A RIP table 81#i is typically created in a secondary node of a normal BLSR DCP/DTP connection and a node including a submarine BLSR add/drop connection. If the outcome of the judgment indicates that a RIP table 81#i is not to be created, the procedure is ended. If the outcome of the judgment indicates that a RIP table 81#i is to be created, on the other hand, the flow of the procedure goes on to a step S182 at which one of the implementations of connection of FIGS. 19 to 26 corresponding to a cross-connect category stored in the stack is identified. The flow of the procedure then goes on to a step S184 at which the identified implementation of connection is recognized. If the implementation of connection is a normal add and drop connection or a DTW connection, the flow of the procedure goes on to a step S186 at which node IDs of (-, A, B, -) are set in the RIP table 81#i where the symbols A and B are each a node ID stored in a stack whereas the symbol - represents the aforementioned special value indicating no setting. Then, the flow of the procedure goes on to a step S188 at which path information of (-, -, -, -) is set in the RIP table 81#i.

If the implementation of connection is a DCP one-side-end connection, the flow of the procedure goes on to a step S190 at which node IDs of (A, B, C, -)/(-, A, B, C) are set in the RIP table 81#i where the symbols A, B and C are each a node ID stored in a stack whereas the symbol - represents no setting. Then, the flow of the procedure goes on to a step S192 at which path information of (P, DCx, -, -)/(-, -, DCx, P) is set in the RIP table 81#i.

If the implementation of connection is a DCP both-side-end connection, the flow of the procedure goes on to a step S194 at which node IDs of (A, B, C, D) are set in the RIP table 81#i where the symbols A, B, C and D are each a node ID stored in a stack whereas the symbol - represents no setting. Then, the flow of the procedure goes on to a step S196 at which path information of (P, DCx, DCx, P) is set in the RIP table 81#i.

If the implementation of connection is a DCW one-side-end connection, the flow of the procedure goes on to a step S198 at which node IDS of (A, B, C, -)/(-, A, B, C) are set in the RIP table 81#i where the symbols A, B and C are each a node ID stored in a stack whereas the symbol - represents no setting. Then, the flow of the procedure goes on to a step S200 at which path information of (W, DCx, -, -)/(-, -, DCx, W) is set in the RIP table 81#i.

If the implementation of connection is a DCW both-side-end connection, the flow of the procedure goes on to a step S202 at which node IDs of (A, B, C, D) are set in the RIP table 81#i where the symbols A, B, C and D are each a node ID stored in a stack whereas the symbol - represents no setting. Then, the flow of the procedure goes on to a step S204 at which path information of (W, DCX, DCX, W) is set in the RIP table 81#i.

If the implementation of connection is a DTP one-side-end connection, the flow of the procedure goes on to a step S206 at which node IDs of (A, B, C, -)/(-, A, B, C) are set in the RIP table 81#i where the symbols A, B and C are each a node ID stored in a stack whereas the symbol - represents no setting. Then, the flow of the procedure goes on to a step S208 at which path information of (P, DT, -, -)/(-, -, DT, P) is set in the RIP table 81#i.

At the next step S210, node IDs set in the RIP table 81#i are modified. At the next step S212, the RIP table 81#i is provided on the east side if a signal is added to the east side or dropped from the east side. On the other hand, the RIP table 81#i is provided on the west side if a signal is added to the west side or dropped from the west side.

5: Identification of the location of a failure occurrence

Figure 64:
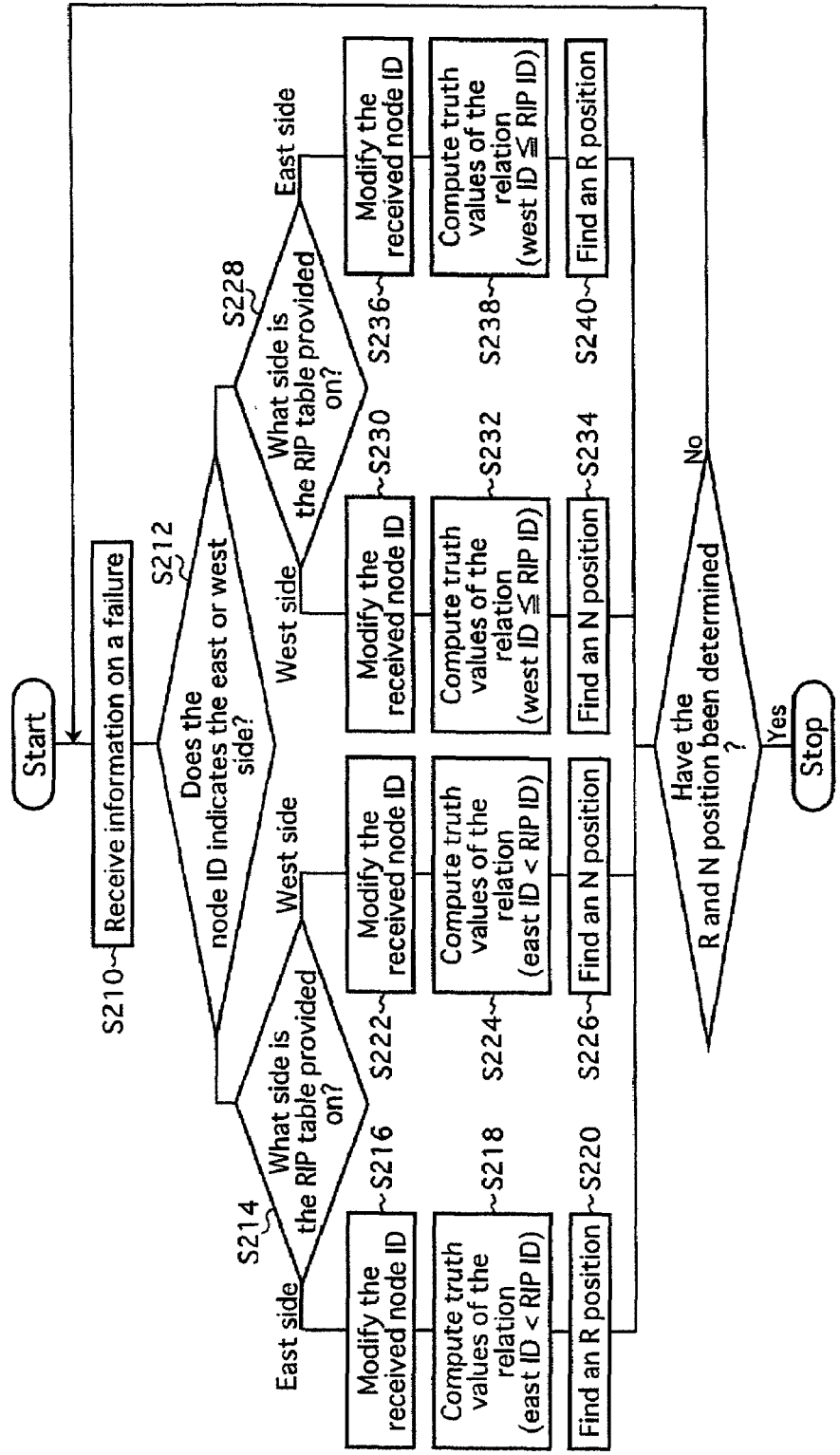
FIG. 64 shows a flowchart to identify the location of occurrence of a failure.

FIG. 64 shows a flowchart representing a procedure to identify the location of occurrence of a failure. In the event of a failure on a transmission line, both the nodes connected to the transmission line each transmits information on the failure including the node ID of the failing node by inserting the information into typically K1 and K2 bytes of an overhead. The nodes are each referred to each a span node. If failures occur on a plurality of transmission lines at the same time, information on a failure is transmitted from a plurality of nodes. As shown in the figure, the flowchart begins with a step S210 at which information on a failure is received. The flow of the procedure then goes on to a step S212 to form a judgment as to whether the node ID included in the information on the failure indicates that the information has been received from the east or west side. If the outcome of the judgment indicates that the node ID has been received from the west side, the flow of the procedure goes on to a step S228. If the outcome of the judgment indicates that the node ID has been received from the east side, on the other hand, the flow of the procedure goes on to a step S214 to form a judgment as to whether the RIP table 81#i is provided on the east or west side. If the outcome of the judgment indicates that the RIP table 81#i is provided on the west side, the flow of the procedure goes on to a step S216. If the outcome of the judgment indicates that the RIP table 81#i is provided on the east side, on the other hand, the flow of the procedure goes on to a step S222.

At the step S216, the received node ID is modified. The flow of the procedure then goes on to a step S218 to form a judgment as to whether or not the relation east ID<the modified node ID (RIP) set in the RIP table 81#i holds true, and sets a true (T) logic value indicating that the relation holds true or a false (F) logic value indicating otherwise. At the next step S220, a location forming a line with the truth values T and F or the location of a RIP IDO-n where the symbol n is the number of nodes composing the ring network is determined as a west-side R position.

At the step S222, the received node ID is modified. The flow of the procedure then goes on to a step S224 to form a judgment as to whether or not the relation east ID<the RIP holds true, and sets a true (T) logic value indicating that the relation holds true or a false (F) logic value indicating otherwise. At the next step S226, a location forming a line with the truth values T and F or the location of a RIP IDO-n where the symbol n is the number of nodes composing the ring network is determined as an east-side N position.

As described above, if the outcome of the judgment formed at the step S212 indicates that the node ID has been received from the west side, the flow of the procedure goes on to the step S228 to form a judgment as to whether the RIP table 81#i is provided on the east or west side. If the outcome of the judgment indicates that the RIP table 81#i is provided on the west side, the flow of the procedure goes on to a step S230. If the outcome of the judgment indicates that the RIP table 81#i is provided on the east side, on the other hand, the flow of the procedure goes on to a step S236.

At the step S230, the received node ID is modified. The flow of the procedure then goes on to a step S232 to form a judgment as to whether or not the relation west ID≦the RIP holds true, and sets a true (T) logic value indicating that the relation holds true or a false (F) logic value indicating otherwise. At the next step S234, a location forming a line with the truth values T and F or the location of a RIP IDO-n where the symbol n is the number of nodes composing the ring network is determined as a west-side N position.

At the step S236, the received node ID is modified. The flow of the procedure then goes on to a step S238 to form a judgment as to whether or not the relation west ID≦the RIP holds true, and sets a true (T) logic value indicating that the relation holds true or a false (F) logic value indicating otherwise. At the next step S240, a location forming a line with the truth values T and F or the location of a RIP IDO-n where the symbol n is the number of nodes composing the ring network is determined as a west-side R position.

Then, the flow of the procedure goes on from the step S220, S226, S234 or S240 to a step S252 to form a judgment as to whether or not the R or N position has been determined. If the outcome of the judgment indicates that the R or N position has not been determined, the flow of the procedure goes back to the step S210. If the outcome of the judgment indicates that the R or N position has been determined, on the other hand, the processing is ended.

6: Switching in the event of a failure

Figure 65:
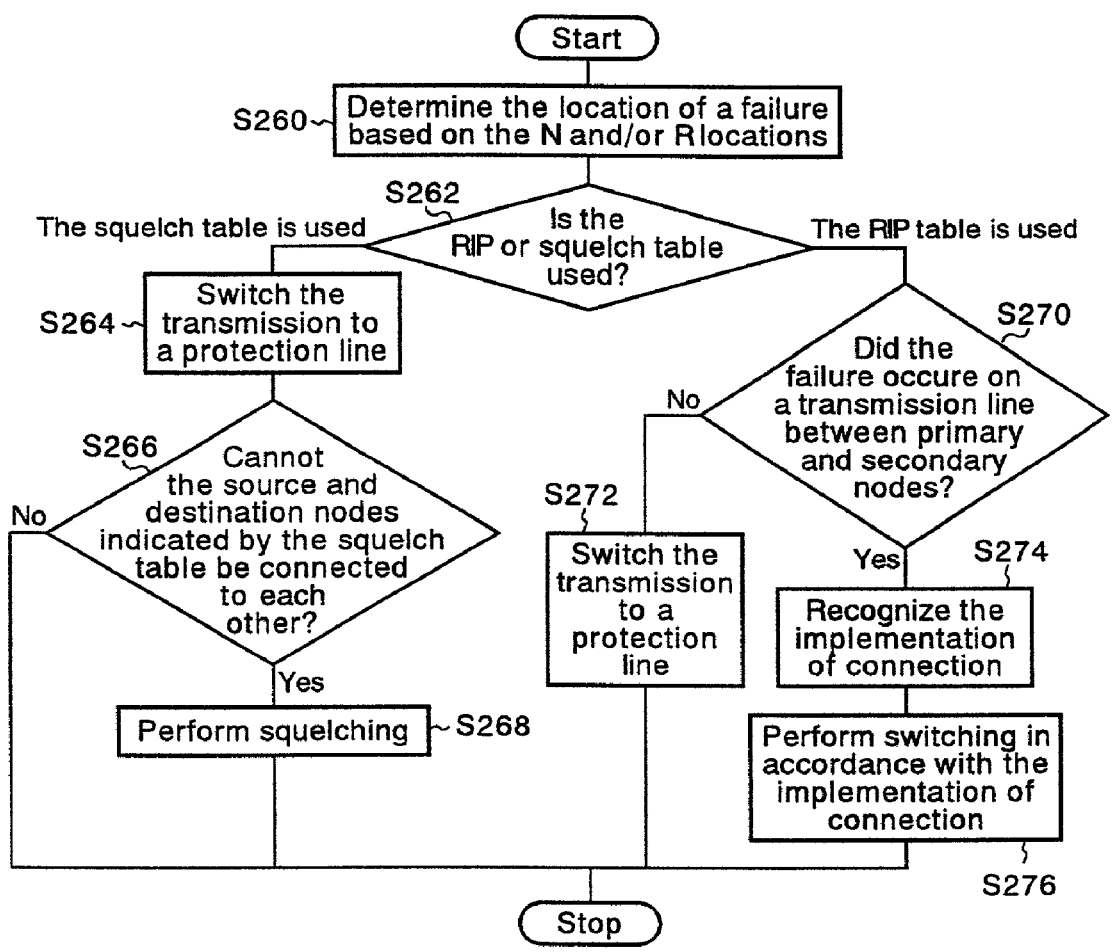
FIG. 65 shows a flowchart representing a switching operation carried out in the event of a failure.

FIG. 65 shows a flowchart representing a procedure of a switching operation carried out in the event of a failure. As shown in the figure, the flowchart begins with a step S260 at which the location of occurrence of a failure is determined from the N and R positions. Then, the flow of procedure goes on to a step S262 to form a judgment as to whether to use the squelch table 80#i or the RIP table 81#i. If the outcome of the judgment indicates that the squelch table 80#i is to be used, the flow of the procedure goes on to a step S264. If the outcome of the judgment indicates that the RIP table 81#i is to be used, on the other hand, the flow of the procedure goes on to a step S270. At the step S264, the transmission is switched to a protection line. The flow of the procedure then goes on to a step S266 to form a judgment as to whether or not it is possible to establish a connection between source and destination nodes, which are indicated by a modified source node ID and a modified destination node ID respectively. The modified source node ID and the modified destination node ID are set in the squelch table 80#i. If the outcome of the judgment indicates that it is possible to establish a connection between source and destination nodes, the processing is ended. If the outcome of the judgment indicates that it is not possible to establish a connection between source and destination nodes, on the other hand, the flow of the procedure goes on to a step S268 at which a squelching operation is carried out.

As described above, when the RIP table 81#i is to be used, the flow of the procedure goes on to a step S270 to form a judgment as to whether or not a failure has occurred on a transmission line between a terminal node or a primary node and a primary node. If the outcome of the judgment indicates that a failure has occurred on a transmission line between a terminal node or a primary node and a primary node, the flow of the procedure goes on to a step S272 at which the transmission is switched to a protection line. If the outcome of the judgment indicates that no failure has occurred on a transmission line between a terminal node or a primary node and a primary node, on the other hand, the flow of the procedure goes on to a step S274. At the step S274, the implementation of connection is recognized by referring to the RIP table 81#i. At the next step S276, a switching operation is carried out in accordance with the recognized implementation of connection. If the implementation of connection is a submarine DCP connection, for example, the switching operations shown in FIG. 52B are carried out. If the implementation of connection is a submarine DCW connection, on the other hand, the switching operations shown in FIG. 53B are carried out. As such, switching operations are carried out in accordance with a variety of implementations of connection including the DCP/DCW submarine BLSR and DTP connections and the normal BLSR connection.

7: Table reconstruction

FIGS. 66A to 66D are each a diagram showing typical reconstruction of a table. The configuration of a built network may be changed in some cases. Assume that squelch tables 80#i and RIP tables 81#i between a node 100#A and a node 100#E shown in FIG. 66A have been created in accordance with the procedures explained above, and assume that the configuration of the network is changed. The configuration of the network is changed by modifying cross-connect information. For example, a node 100#B, which has been operating as a through-only node so far, is changed to a DCW primary node having a cross connect for adding and dropping a signal as shown in FIG. 66B, or changed to an east-end, west-end or through station. In this case, the squelch tables 80#i and the RIP tables 81#i are reconstructed.

Figure 67:
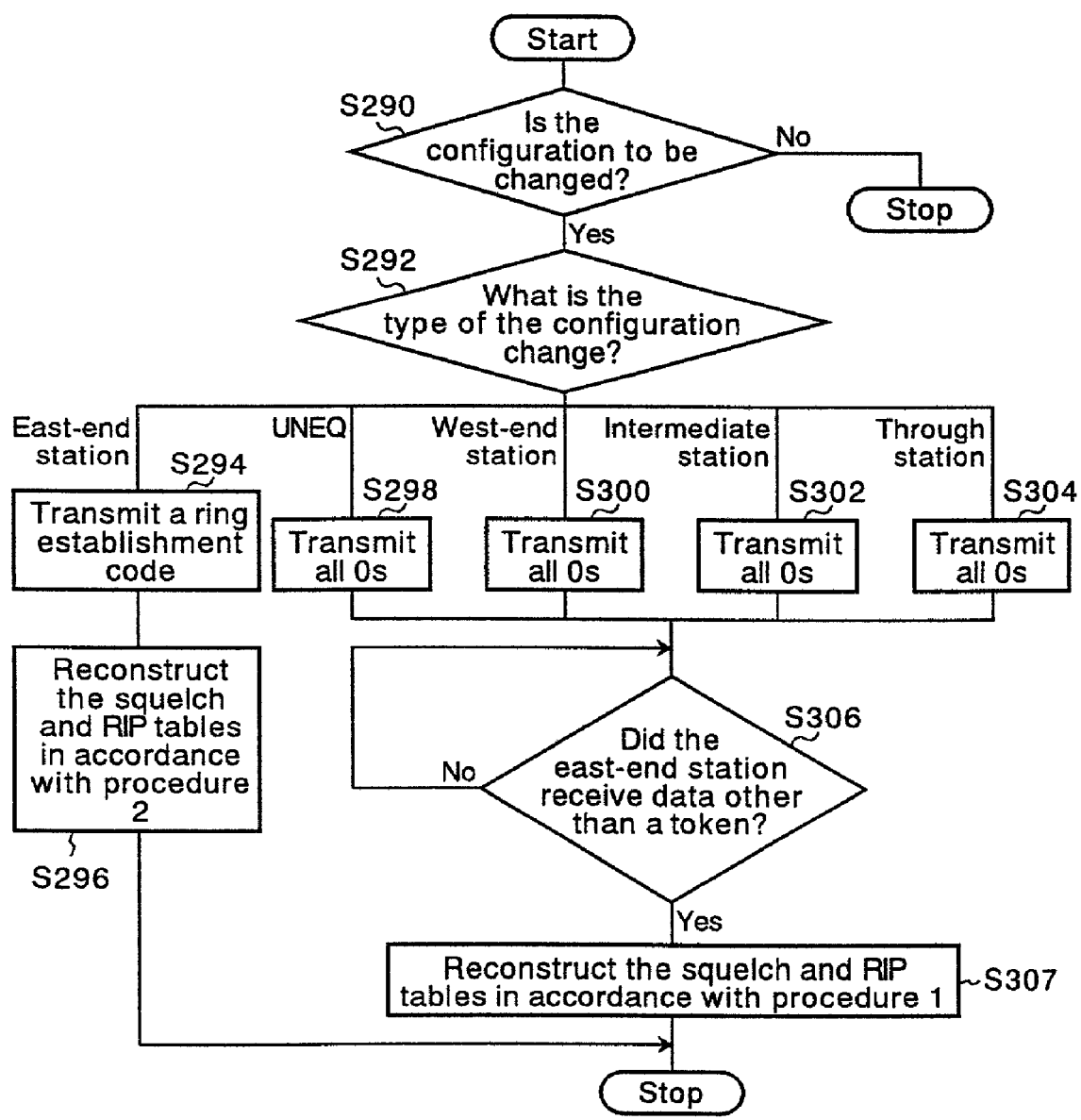
FIG. 67 shows a flowchart representing reconstruction of tables.

FIG. 67 shows a flowchart representing a procedure to reconstruct tables. The flowchart shown in FIG. 67 begins with a step S290 to form a judgment as to whether or not the configuration of the network has been changed. If the outcome of the judgment indicates that network has not been changed, the processing is just ended. If the outcome of the judgment indicates that network has been changed, on the other hand, the flow of the procedure goes on to a step S292 to identify the type of the change in configuration. If a node has been changed to an east-end station, the procedure goes on to a step S294 at which a ring establishment code is transmitted and, at the next step S296, processing according to procedure (2) shown in FIG. 56 is carried out. In addition, the squelch tables 80#i and the RIP tables 81#i related to the channel are reconstructed. If a node has been changed to a UNEQ station with no cross connect, the procedure goes on to a step S298 at which all 0s are transmitted. By the same token, if a node has been changed to a west-end station, the procedure goes on to a step S300 at which all 0s are transmitted. If a node has been changed to an intermediate station as shown in FIG. 66B, the procedure goes on to a step S302 at which, similarly, all 0s are transmitted. If a node has been changed to a through station, the procedure goes on to a step S304 at which, likewise, all 0s are transmitted.

The flow of the procedure then goes on from the step S298, S300, S302 and S304 to a step S306 form a judgment as to whether or not the east-end station has received data other than a token. If the outcome of the judgment indicates that the east-end station has received data other than a token, the flow of the procedure goes on to a step S307. If the outcome of the judgment indicates that the east-end station has not received data other than a token, on the other hand, the flow of the procedure goes back to the step S306, entering a wait state by repeating the formation of the judgment. At the step S307, processing according to procedure (1) shown in FIG. 56 is carried out and, in addition, the squelch tables 80#i and the RIP tables 81#i related to the channel are reconstructed as shown in FIGS. 66C and 66D.

In accordance with the embodiments described above, tables are created and switching control is executed in the event of a failure in dependence on the implementation of connection so that a switching operation based on the implementation of connection can be carried out. In addition, by formation of a proper judgment as to whether or not to carry out a squelching operation in accordance with the implementation of connection in the event of a failure, an appropriate operation to rescue the network from the failure can be performed. Furthermore, in accordance with the present invention, since connections of line definitions according to implementations of connection are checked, reliability is further improved.

As described above, tables are created and switching control is executed in the event of a failure in dependence on the implementation of connection so that a switching operation based on the implementation of connection can be carried out. In addition, by formation of a proper judgment as to whether or not to carry out a squelching operation in accordance with the implementation of connection in the event of a failure, an appropriate operation to rescue the network from the failure can be performed. Furthermore, in accordance with the present invention, since connections of line definitions according to implementations of connection are checked, reliability is further improved.

It should be noted that the present invention is not limited to the details of the preferred embodiments described above. The scope of the present invention is defined by the following appended claims, and all changes and modifications falling within the scope of the claims are therefore to be embraced by the invention.

What is claimed is:

1. A transmission apparatus having a function to switch a line with a redundant configuration comprising a working line and a protection line from said working line to said protection line in the event of a transmission line failure on said working line, said transmission apparatus comprising:

a cross-connect-classifying means for inputting cross-connect information from an external source and classifying said information into cross-connect categories wherein said cross-connect information includes a signal direction and information requesting a station employing said transmission apparatus to carry out one of the following pieces of processing:

addition of a signal to either said working line or said protection line;

addition of a signal to both said working line and said protection line;

dropping of a signal from either said working line or said protection line;

dropping of a signal from both said working line and said protection line;

passing through of a signal; and dropping of a signal from either said working line or said protection line and then relaying said signal to either said working line or said protection line;

a communication means for gathering the cross-connect category of each signal-adding or signal-dropping transmission apparatus of a channel and node information identifying said signal-adding or signal-dropping transmission apparatus by communications with an adjacent transmission apparatus for each channel;

a connection-implementation-classifying means for classifying an implementation of a connection between terminals into a corresponding connection category from connection categories corresponding to a variety of implementations of connection in accordance with said gathered cross-connect categories of other transmission apparatuses and the cross-connect category of said transmission apparatus employed in said station to create a table for executing control to switch a line in the event of a failure for each channel;

a failure-reporting means for transmitting information on a failure including node information of said station in the event of said failure on a transmission line between said station and an adjacent station;

a failure-occurrence-location-identifying means for identifying a location of occurrence of a failure from received information on said failure; and a switching control means for executing control to switch said line based on the location of occurrence of the failure identified by said failure-occurrence-location-identifying means and said table according to said implementation of the connection; and said implementation of connection between terminals is path-sequence of working lines or protection lines of a signal which is added until the signal is dropped; and said implementation of connection between terminals is prescribed by cross-connects which are through, drop-and-continue and service selector.

2. A transmission apparatus according to claim 1 wherein said cross-connect-classifying means determines said cross-connect information to pertain to one of cross-connect categories of:

addition of a signal to said working line;

addition of a signal to said protection line;

dropping of a signal from said working line; and dropping of a signal from said protection line.

3. A transmission apparatus according to claim 1 wherein, for each channel, said communication means recollects a cross-connect category of another transmission apparatus adding or dropping a signal related to said channel and node information identifying said other transmission apparatus when said cross-connect information is re-input.

4. A transmission apparatus according to claim 1, wherein said pieces of processing further include addition of a signal to first and second working lines, and dropping of a signal from either said first working line or said second working line.

5. A transmission apparatus according to claim 4, wherein said cross-connect-classifying means classifies said addition of a signal to first and second working lines into two cross-connect categories, and said dropping of a signal from either said first working line or said second working line into said dropping of a signal from a working line, each of said two cross-connect categories being an addition of a signal to a working line.

6. A transmission apparatus having a function to switch a line with a redundant configuration comprising a working line and a protection line from said working line to said protection line in the event of a transmission line failure on said working line, said transmission apparatus comprising:

a cross-connect-classifying means for inputting cross-connect information from an external source and classifying said information into cross-connect categories wherein said cross-connect information includes a signal direction and information requesting a station employing said transmission apparatus to carry out one of the following pieces of processing:

addition of a signal to either said working line or said protection line;

addition of a signal to both said working line and said protection line;

dropping of a signal from either said working line or said protection line;

dropping of a signal from both said working line and said protection line;

passing through of a signal; and dropping of a signal from either said working line or said protection line and then relaying said signal to either said working line or said protection line;

a communication means for gathering, the cross-connect category of each signal-adding or signal-dropping transmission apparatus of a channel and node information identifying said signal-adding or signal-dropping transmission apparatus by communications with an adjacent transmission apparatus for each channel;

a connection-implementation-classifying means for classifying an implementation of a connection between terminals into a corresponding connection category from connection categories corresponding to a variety of connection implementations in accordance with said gathered cross-connect categories of other transmission apparatuses and the cross-connect category of said transmission apparatus employed in said station to create a table for executing control to switch a line in the event of a failure for each channel;

a failure-reporting means for transmitting information on a failure including node information of said station in the event of said failure on a transmission line between said station and an adjacent station;

a failure-occurrence-location-identifying means for identifying a location of occurrence of a failure from received information on said failure; and a switching control means for executing control to switch said line based on the location of occurrence of the failure identified by said failure-occurrence-locationidentifying means and said table according to said implementation of the connection;

wherein said communication means comprising:

a first station-determining means for determining that said station is an end station for only adding or dropping a signal, a through station for relaying a signal or an intermediate station for dropping a signal as well as relaying said signal for each channel on the basis of said cross-connect information;

a first transfer means for receiving a cross-connect category and node information, storing said cross-connect category and said node information in a stack and transferring said cross-connect category and said node information;

a second station-judging means, which is used for forming a judgment as to whether said station is a transmitting station transmitting said cross-connect category first or a receiving station transmitting said cross-connect category last on the basis of the direction of said signal when said station is determined to be said end station;

a first transmission means, which is used for acquiring a transmission right first, transmitting said cross-connect category and said node information of said station to an adjacent station and handing over said transmission right to said adjacent station when said station is judged to be said transmitting station;

a second transfer means, which is used for transferring said transmission right to be handed over to said adjacent station when said station is determined to be said through station;

a second transmission means, which is used for acquiring a transmission right handed over to said station, transmitting said cross-connect category and said node information of said station to an adjacent station and handing over said transmission right to said adjacent station when said station is determined to be said intermediate station; and a third transmission means, which is used for acquiring a transmission right handed over to said station and transmitting said cross-connect category as well as said node information of said station to an adjacent station when said station is judged to be said receiving station.

7. A transmission apparatus according to claim 6 wherein said communication means transmits a signal for triggering collection of cross-connect information when said station is determined to be said transmitting station and transmits said cross-connect category upon reception of said triggering signal when said station is determined to be said receiving station.

8. A transmission apparatus according to claim 6 wherein said communication means does not store a received cross-connect category in said stack if said cross-connect category stored in said stack indicates a broadcasting station located between a first station and a last station, which drop said received cross-connect category, but said communication means stores said cross-connect category of said station in said stack over said cross-connect category stored immediately before in said stack if:

said station is determined to be said intermediate station or said receiving station;

said transmission right has been acquired; and said cross-connect category stored immediately before in said stack indicates a broadcasting station.

9. A transmission apparatus according to claim 6 wherein said connection-implementation-classifying means determines the connection category of an implementation of connection in accordance with a cross-connect category stored in said stack.

10. A transmission apparatus according to claim 7 wherein said connection-implementation-classifying means detects incorrect setting from an order of cross-connect categories are stored in said stack.

11. A transmission apparatus according to claim 10 wherein said connection-implementation-classifying means detects successive drop and add cross-connect categories or successive add and drop cross-connect categories as incorrect setting.

12. A transmission apparatus according to claim 10 wherein said connection-implementation-classifying means detects successive add and add cross-connect categories as incorrect setting.

13. A transmission apparatus according to claim 10 wherein said connection-implementation-classifying means detects successive add, drop, add and drop cross-connect categories or successive drop, add, drop and add cross-connect categories as incorrect setting.

14. A transmission apparatus according to claim 10 wherein, for each channel, said connection-implementation classifying means creates a squelch table composed of node information of 2 stations and, in the case of a DCP (Drop and Continue on Protection) connection of dropping a signal from a line and then relaying said signal to said protection line, said connection-implementation classifying means set node information of a station dropping said signal relayed to said protection line in said squelch table.

15. A transmission apparatus according to claim 10 wherein, for each channel, said connection-implementation-classifying means creates a squelch table composed of node information of 2 stations and, in the case of a DTP (Dual Terminal transmit on Protection) connection of adding a signal to both said working and protection lines, said connection-implementation-classifying means sets node information of a first station adding said signal to both said working and protection lines and node information of a second station dropping said signal added to said protection line in said squelch table.

16. A transmission apparatus having a function to switch a line with a redundant configuration comprising a working line and a protection line from said working line to said protection line in the event of a transmission line failure on said working line, said transmission apparatus comprising:

a cross-connect-classifying means for inputting cross-connect information from an external source and classifying said information into cross-connect categories wherein said cross-connect information includes a signal direction and information requesting a station employing said transmission apparatus to carry out one of the following pieces of processing:

addition of a signal to either said working line or said protection line;

addition of a signal to both said working line and said protection line;

dropping of a signal from either said working line or said protection line;

dropping of a signal from both said working line and said protection line;

passing through of a signal; and dropping of a signal from either said working line or said protection line and then relaying said signal to either said working line or said protection line;

a communication means for gathering the cross-connect category of each signal-adding or signal-dropping transmission apparatus of a channel and node information identifying said signal-adding or signal-dropping transmission apparatus by communications with an adjacent transmission apparatus for each channel;

a connection-implementation-classifying means for classifying an implementation of a connection between terminals into a corresponding connection category from connection categories corresponding to a variety of connection implementations in accordance with said gathered cross-connect categories of other transmission apparatuses and the cross-connect category of said transmission apparatus employed in said station to create a table for executing control to switch a line in the event of a failure for each channel;

a failure-reporting means for transmitting information on a failure including node information of said station in the event of said failure on a transmission line between said station and an adjacent station;

a failure-occurrence-location-identifying means for identifying a location of occurrence of a failure from received information on said failure; and a switching control means for executing control to switch said line based on the location of occurrence of the failure identified by said failure-occurrence-location-identifying means and said table according to said implementation of the connection;

wherein, for each channel, said connection implementation-classifying means creates a RIP (Routing Interworking Protection) table including node information of a station adding a signal, dropping a signal or relaying after dropping a signal, and path information for an implementation of connection.

17. A transmission apparatus according to claim 16 wherein:

said connection-implementation-classifying means sets node information in said RIP table to represent a fast distance in a predetermined direction from said station to a station indicated by said node information;

said failure-occurrence-location-identifying means computes a second distance in said predetermined direction from said station to a station indicated by said node information included in received information on a failure; and said failure-occurrence-location-identifying means determines a location of occurrence of said failure by comparison of the magnitude of said second distance with the magnitude of said first distance set in said RIP table.

18. A transmission apparatus according to claim 16 wherein said switching control means executes switching control for an implementation of connection based on path information and node information which are set in said RIP table.

* * * * *